US009663017B2

(12) United States Patent
Ellis et al.

(10) Patent No.: US 9,663,017 B2
(45) Date of Patent: May 30, 2017

(54) VERTICAL TANK TRANSPORT SYSTEMS AND RELATED METHODS

(71) Applicant: Vertical Tank, Inc., Bakersfield, CA (US)

(72) Inventors: Stanley Ellis, Bakersfield, CA (US); Travis Ellis, Bakersfield, CA (US); Lynn Gudmundson, Bakersfield, CA (US)

(73) Assignee: Vertical Tank, Inc., Bakersfield, CA (US)

( * ) Notice: Subject to any disclaimer, the term of this patent is extended or adjusted under 35 U.S.C. 154(b) by 0 days.

(21) Appl. No.: 14/754,463

(22) Filed: Jun. 29, 2015

(65) Prior Publication Data

US 2016/0016500 A1  Jan. 21, 2016

Related U.S. Application Data

(62) Division of application No. 14/171,144, filed on Feb. 3, 2014, now Pat. No. 9,168,799.

(51) Int. Cl.
| | | |
|---|---|---|
| *B60P 3/22* | (2006.01) | |
| *B60D 1/24* | (2006.01) | |
| *B60D 1/01* | (2006.01) | |
| *B60D 1/58* | (2006.01) | |
| *B60P 1/16* | (2006.01) | |
| *B60P 3/40* | (2006.01) | |
| *B62D 53/08* | (2006.01) | |

(52) U.S. Cl.
CPC ............ *B60P 3/2215* (2013.01); *B60D 1/015* (2013.01); *B60D 1/24* (2013.01); *B60D 1/58* (2013.01); *B60P 1/16* (2013.01); *B60P 3/224* (2013.01); *B60P 3/40* (2013.01); *B62D 53/08* (2013.01)

(58) Field of Classification Search
CPC .................................. B60P 3/41; B60P 3/125
See application file for complete search history.

(56) References Cited

U.S. PATENT DOCUMENTS

| | | | | |
|---|---|---|---|---|
| 4,231,709 A | * | 11/1980 | Corsetti | B60P 3/40 |
| | | | | 280/404 |
| 4,378,052 A | * | 3/1983 | Anderson | A01B 59/04 |
| | | | | 172/250 |
| 4,452,555 A | * | 6/1984 | Calabro | B60P 1/6445 |
| | | | | 280/43.23 |

(Continued)

*Primary Examiner* — Tony Winner
(74) *Attorney, Agent, or Firm* — Matthew C. McCartney, Esq; Eastman & McCartney LLP

(57) ABSTRACT

An industrial tank transport system used to transport an industrial tank without the use of a trailer. The industrial tank transport system is comprised of four components; a semi-tractor truck, a removable lift system, a dolly, and a tank. When these four components are combined together, the tank can be transported without the use of a conventional semi-tractor trailer. Various combinations of these four components are used to practice the various methods of raising and lowering the tank between a horizontal position and vertical position using the semi-tractor truck, transporting the dolly using the removable lift system and semi-tractor truck, attaching and removing the removable lift system to the semi-tractor truck, and attaching and removing the dolly to and from the tank using the removable lift system and semi-tractor truck.

19 Claims, 38 Drawing Sheets

(56) References Cited

U.S. PATENT DOCUMENTS

| | | | | |
|---|---|---|---|---|
| 4,819,955 A * | 4/1989 | Cobb | ............... | E21B 43/34 |
| | | | | 220/1.5 |
| 4,869,521 A * | 9/1989 | Johnson | ............... | B60D 1/54 |
| | | | | 280/491.1 |
| 4,878,544 A * | 11/1989 | Barnhart | ............... | E01C 19/281 |
| | | | | 172/125 |
| 5,516,136 A * | 5/1996 | Matthews | ............... | B60D 1/62 |
| | | | | 280/422 |
| 5,725,233 A * | 3/1998 | Gee | ............... | B60D 1/143 |
| | | | | 280/406.2 |
| 6,168,348 B1 * | 1/2001 | Meyer | ............... | E02F 3/7663 |
| | | | | 404/84.1 |
| 7,661,692 B1 * | 2/2010 | Sink | ............... | B60P 3/122 |
| | | | | 280/402 |

* cited by examiner

VERTICAL TANK TRANSPORT SYSTEMS AND RELATED METHODS

RELATED APPLICATION

The present application is a Divisional of, and claims the benefit of priority to, the U.S. patent application for "VERTICAL TANK TRANSPORT SYSTEMS AND RELATED METHODS Ser. No. 14/171,144, filed on Feb. 3, 2014, currently co-pending.

FIELD OF THE INVENTION

The present invention relates generally to an industrial tank transport system to transport a tank without the use of a trailer. The present invention is more particularly, though not exclusively, related to a combination of a semi-tractor truck, a removable lift system, a tank, and a dolly along with methods for transporting an industrial tank without need for a tractor trailer, raising and lowering a tank with the removable lift system to attach and remove the dolly, and raising and lowering tank using semi-tractor truck between a horizontal and vertical position.

BACKGROUND OF THE INVENTION

The use of fluids to facilitate drilling and extraction is well known in the oil and gas industry. Fluid storage facilities are needed on-site to provide a store of fluid for applications such as hydraulic drilling and tracking. Steel industrial tanks are often used to store drilling fluid or mud because they are robust with long life spans. These storage tanks can be horizontal or vertical. However, whether horizontal or vertical, these steel industrial storage tanks are large and are difficult to transport. In addition, the popularity of vertical tanks is increasing because they occupy less land space compared to a horizontal tank of identical interior volume.

Ordinarily, large steel industrial tanks are transported by loading them onto a large tractor trailer through the use of a crane or similar lifting device. The tank then needs to be carefully secured to the trailer and transported to the destination. Often height, clearance on freeways and roads is limited, and tanks loaded onto conventional flatbed trailers exceed allowable height limits. In order to obtain the required clearance, these industrial tanks are loaded onto dropdeck or even double dropdeck trailers having flatbeds lower than the axels of the trailer and semi-tractor truck. Unloading steel industrial tanks from a dropdeck or double dropdeck trailer is challenging and requires either using a crane to lift the tank off the trailer or using a winch to drag the tank off of the trailer, causing needless wear and tear on both the tank and the trailer.

Further, often the tanks are delivered to remote sites that do not have a crane available to lift the tanks from the trailer. Thus, suppliers of tanks are required to haul the trailer with a semi-tractor truck equipped with a crane. The requirement for such a specialized tractor truck that is equipped with a crane increases the weight of the semi rig, lowers fuel efficiency, and therefore increases the cost of tank delivery.

Additionally, dropdeck and double dropdeck trailers have longer wheelbases and lower ground clearance than traditional flatbed trailers and are inherently more difficult to maneuver. The low ground clearance of dropdeck and double dropdeck trailers is also particularly challenging in the off road conditions typically encountered in oil and gas fields, where large steel storage containers are needed. Often, such trailers can bottom out on and strike the uneven ground causing damage to the underside of the trailers.

Many businesses rent these tanks as opposed to purchasing them outright. The tanks are stored in a central location. Then when rented, the tanks are transported from the central location to a work site for a particular drilling operation and then collected upon completion of drilling operations and transported back to the central location. Thus, there is a need to deliver and collect the tanks as quickly and efficiently as possible.

When tanks are delivered to a remote drilling location the rental company faces large fuel costs for a variety of reasons. First, the delivery company incurs a loss of fuel economy by transporting a heavy dropdeck trailer in addition to the weight of the tank itself. Second the delivery company incurs a loss of fuel economy by either separately delivering a crane system, or utilizing a semi-tractor truck equipped with a crane system. Third, the delivery company incurs a loss of fuel economy upon the return trip for hauling a heavy unloaded trailer and crane (either on the truck itself or by way of a separate vehicle).

Collecting a tank suffers from similar efficiency problems for a rental company. First, the rental company has to haul an empty trailer to the particular location of the tank. In addition, the rental company has to deliver a crane to the tank location in order to place the tank on the trailer. Finally, the rental company has to make the return trip to the central location including both the trailer and the crane.

In light of the above, it would be advantageous to provide a tank transport system and method for transporting industrial tanks in such a way to not use a trailer or a crane, and allow for lifting a tank into a vertical position upon delivery and lowering a tank to a vertical transportation position upon collection. It would further be advantageous to provide a tank transport system and method to transport and deliver a storage tank without the use of a trailer. It would be further advantageous to provide a tank transport system and method to transport and deliver a storage tank without the need for a crane. It would be further advantageous to provide a tank transport system and method to transport and deliver a storage tank which provides ample ground clearance to travel on unpaved roads. It would be further advantageous to provide a tank transport system that is low weight. It would be further advantageous to provide a tank transport system and method that has a minimal amount of moving parts to provide for quick assembly and disassembly of components of the system to allow the practice of the various methods. It would be further advantageous to provide a tank transport system allowing the tank dimensions to be maximized for interior volume while still meeting the dimensional requirements for transportation. It would be further advantageous to provide a tank transport system which is easy to use, and relatively cost efficient.

SUMMARY OF THE INVENTION

The present invention satisfies this need and is directed to an industrial tank transport system to transport a tank without the use of a trailer.

(1) Tank Transport System

The industrial tank transport system is comprised of four primary components; a semi-tractor truck, a removable lift system, a dolly, and a tank. When these four components are combined together, the tank can be transported and positioned for use without the use of a conventional semi-tractor trailer. The semi-tractor truck is used to transport the removable lift system, tank, and dolly to and from the field where the tank is to be used without the use of a trailer.

The removable lift system is generally attached to the semi-tractor truck and is used to raise and lower the tank in order to install or remove the dolly to the tank. Once the dolly is installed on the tank, the lift system is connected to the tank, at the opposite end of the installed dolly, effectively converting the semi-tractor truck, removable lift system, tank and dolly into a semi-tractor trailer rig without the use of a semi-tractor trailer.

Alternatively, once the dolly is removed from a tank through using a combination of the truck and removable lift system, the removable lift system can be removed from the semi-tractor truck. Once so removed, the semi-tractor truck can then be used to raise the tank from a horizontal position to a vertical position.

(2) Semi-Tractor Truck

The semi-tractor truck of the present invention has a truck chassis with a front, rear, left, right and a top and bottom. The truck chassis is also has a cab portion and a utility portion.

The cab portion of the truck chassis is generally located near the front of the truck chassis and has a cab, engine bay, front axle and a pair of front wheels. Semi-tractor truck cabs, engine bays and the respective interiors and engines located within are well known in the art.

The utility portion of the truck chassis is generally located behind the cab portion and has one or more rear axles wherein each said rear axle is attached to one or more pairs of rear wheels. It is appreciated that multi-axle equipped semi-tractor trucks are well known in the art, as are dual wheels connected to each axle, for a total of four wheels per axle. It is to be appreciated that the present invention is not limited to any particular axle or wheel configuration.

A fifth wheel is attached the top of the utility portion of the truck chassis. Fifth wheels are also well known in the art and typically contain a fifth wheel slot and fifth wheel opening sized to receive and secure a kingpin. Kingpins are typically found on semi-tractor trailers and are mounted to a kingpin plate. The kingpin plate is ordinarily capable of rotation with respect to the fifth wheel about the kingpin.

A winch is attached to the top of the utility portion of the truck chassis and in one embodiment, is located between the truck cab and the fifth wheel. The winch is capable of winding and unwinding a winch cable, which terminates in a winch cable end loop.

The semi-tractor truck has a lift system lock designed to prevent a removable lift system from rotating about the fifth wheel when installed on the semi-tractor winch truck. The lift system lock also provides an additional means for securing a removable lift system to the semi-tractor truck. The lift system lock is attached to the top of the utility portion of the truck chassis.

In a preferred embodiment, the lift system lock includes a left stay collar and a right stay collar attached to a left stay bracket and a right stay bracket. The left stay bracket and the right stay bracket are attached to a transverse stay beam fixedly attached to the truck chassis such that the left stay collar and the right stay collar are a fixed distance from one another. The right stay collar and left stay collar are sized to receive right and left alignment rails of a removable lift system. The right and left stay collars have stay collar holes such that fasteners may be passed through the left and right stay collars and the left and right alignment rails respectively in order to secure the same to the semi-tractor truck.

Finally, the semi-tractor truck has an adjustable tail roller attached to the rear of the utility portion of the truck chassis.

The adjustable tail roller extends across the rear of the truck chassis and is attached to a left tail roller bracket and a right tail roller bracket. The adjustable tail roller is capable of 360 degree rotation with respect to the left tail roller bracket and the right tail roller bracket. The left and right adjustable tail roller brackets are rotatably attached to the left and right chassis by way of a tail roller pin such that the adjustable tail roller is capable of movement between a flush position level with the truck chassis and an angled position where the tail roller is above the truck chassis. It is necessary to move the adjustable tail roller to the flush position when either attaching or removing the removable lift system as set out in more detail below. It is preferable to move the adjustable tail roller to the angled position when either raising a tank from a horizontal position to a vertical position or when lowering a tank from a vertical position to a horizontal position. When in the angled position, it is easier for a user to control the raising or lowering of the tank because the adjustable tail roller is higher off of the ground and therefore makes contact with the tank in a more controllable tipping position.

(3) Removable Lift System

The removable lift system is designed to be quickly and easily removed from the semi-tractor truck. When attached to the semi-tractor truck, the removable lift system is meant to serve several purposes. First, the removable lift system connects the tank to the semi-tractor truck when the tank is being transported as part of the tank transport system without the use of a trailer. Second, the removable lift system is used to raise and lower the tank sufficiently to connect or remove the dolly. Third, the removable lift system is used to transport the dolly without a tank. Fourth, the removable lift system is used in combination with the dolly in order to allow the semi-tractor truck to easily attach or remove the removable lift system.

The removable lift system includes a boom lift base frame with a left frame rail, a right frame rail, a transverse stay beam and a kingpin plate. The left frame rail and the right frame rail are parallel to each other and held a fixed distance apart by the transverse stay beam mounted to a top of the left frame rail and the right frame rail. The fixed distance between the left frame rail and the right frame rail is also maintained by the kingpin plate mounted to the bottom of the left frame rail and said right frame rail. A kingpin is attached to the kingpin plate and is designed to slidably insert into the fifth wheel of the semi-tractor truck. A boom lift pivot base is also attached to the boom lift base frame behind the transverse stay beam.

The removable lift system also includes a boom lift having a boom lift main arm, a boom lift support arm, and extendable boom lift arm each having a front and a rear and a top and a bottom and a left side and right side. The front of the boom lift main arm is rotatably attached to the boom lift base frame at the boom lift pivot base. The front of the boom lift support arm is rotatably attached to the rear of the boom lift main arm. The front of the extendable boom lift is rotatably attached to the rear of the boom lift support arm.

The removable lift system also includes an extendable boom lift with a front and a rear and partially housed within the extendable boom lift arm such that the rear of the extendable boom lift can extend and contract from the extendable boom lift arm. A turning coupling is coupled between the front of the extendable boom lift and a transverse lifting bar.

The removable lift system also includes one or more adjustable boom lift stands, each having a boom lift stand base, boom lift stand foot and boom lift stand collar. The boom lift stand foot is slidably inserted into one end of the boom lift stand base. The other end of the boom lift stand base is attached to the boom lift collar. The boom lift collar is capable of being slidably inserted onto the transverse lifting bar.

The transverse lifting bar can be used to connect to a tank in order to raise or lower the tank to either attach or remove a dolly from the tank. In an embodiment, the transverse lifting bar is connected to a tank by way of tank grapplers which are connected to bar coupling collars slidably inserted onto the transverse lifting bar.

Actuators are used to operate the boom lift main arm, boom lift support arm, extendable boom lift arm, and extendable boom lift such that the transverse lifting bar can be moved in a an upward direction, a downward direction, a retract direction and an extend direction or any combination of such directions.

(4) Tank

The present invention includes a tank that is sufficiently reinforced to be raised and lowered between a horizontal position and a vertical position and to be transported by way of the semi-tractor truck, removable lift system and dolly as described herein without the use of a trailer.

The tank includes a hollow body, a sled frame, a base frame, and a number of support members. The sled frame is connected to the side of the hollow body and is also connected to the base frame. The base frame is also connected to the hollow body by way of support members. The base frame also includes tank base upper brackets and tank base lower brackets to interface and connect with dolly upper brackets and dolly lower brackets when connecting the dolly to the tank in order to transport the tank.

The tank also includes a tank lifting bar mounted to the sled frame, opposite the base frame. The tank lifting bar is meant to be the primary member that interacts with the removable lift system. The removable lift system raises and lowers the tank by way of the tank lifting bar in order to facilitate the removal or attachment of the dolly from or to the tank, and for coupling the tank to the removable lift system for transporting the tank.

A tank lifting panel is rotatably attached to the tank lifting bar and has a lifting line panel hole with a lifting line connected to the tank lifting panel by way of the lifting line panel hole. The tank lifting line is of a sufficient length to enable a user to connect the tank lifting line to the winch cable of the semi-tractor truck when either raising or lowering a tank between a horizontal or vertical position.

(5) Dolly

The present invention includes a dolly designed to be easily connected and disconnected from the tank in order to transport the same. The use of the dolly in combination with the tank and removable lift system of the present invention allows the semi-tractor truck to transport the tank without use of a semi-tractor trailer. It is advantageous to use a dolly in combination with the removable lift system rather than a conventional semi-tractor trailer because the dolly is substantially smaller and lighter than a conventional semi-tractor trailer. Additionally, a larger size tank can be easily transported without exceeding the maximum clearance on U.S. roadways because the additional height added by the trailer is avoided.

In its most basic form, the dolly has a frame, suspension, axle and wheels and a means for connecting the dolly to the tank. In one embodiment, the dolly frame is made up of a top frame, a tank connector frame, and reservoir frame. The top frame and tank connector frame are connected at an upper tank connector frame rail and by the reservoir frame and together form a rigid frame assembly.

Upper dolly brackets and lower dolly brackets are mounted to the front of the tank connector frame of the dolly. The dolly upper brackets and dolly lower brackets are meant to interface with the tank base upper brackets and tank base lower brackets when connecting the dolly to the base frame of the tank. Through holes in the dolly upper and dolly lower brackets corresponding to through holes in the tank base upper and lower brackets allow fasteners to secure the dolly upper brackets and dolly lower brackets to the tank base upper brackets and lower brackets respectively.

The dolly is equipped with an air brake system and front and rear signal lights. When connected to the tank for transport supply lines can be connected between the rear service panel of the removable lift system and a dolly service line panel, providing air and electrical power for the dolly air brake system and rear signal lights. Once so connected, the tank can be effectively transported using the combination of the semi-tractor truck, removable lift system and dolly.

When the dolly is not in use for transporting the tank, it can be easily be stowed on the removable lift system. Boom lift guides mounted under the axle of the dolly allow the operator of the removable lift system to guide the boom lift support arm such that the dolly will be centered on the boom lift support arm. Tank grapplers on the transverse lifting bar may then be used to secure the tank connector frame to the removable lift system. Supply lines can then be connected between the rear service panel of the removable lift system and the dolly service line panel such that the electrical power is provided to the front signal lights.

(6) Method of Removing Dolly from Tank Using Removable Lift System

When a tank is delivered to its intended location by the tank transport system of the present invention, it is necessary to remove the dolly from the tank before the tank can be lifted into a vertical position. When a tank is connected to the dolly and the removable lift system, the tank is generally oriented in a transport position such that the sled frame of the tank is substantially parallel to and above the ground. In such a position, it is impossible to simply disconnect the dolly from the tank because of the weight of the tank on the fasteners connecting the tank to the dolly. To overcome this problem, the lift system is used in combination with a pivot block to eliminate the weight on the fasteners such that the fasteners can easily be removed from the upper and lower dolly brackets and upper and lower tank base brackets.

First, the removable lift system lifts the tank in an upward direction from the transport position to a first inclined position. Second, a pivot block is placed underneath the sled frame near the center of the tank. Third, the removable lift system lowers the tank from a first inclined position to a first declined position such that the sled frame of the tank comes into contact with the pivot block and begins to pivot about the pivot block. Once the tank has been fully lowered to the first declined position, the weight of the tank rests on the pivot block instead of the fasteners connecting the upper and lower dolly brackets to the upper and lower tank base brackets. Fourth, once in the first declined position, the fasteners are removed from the lower dolly brackets and the lower tank base brackets. Fifth; the tank is raised by the removable lift system from the first declined position to a second inclined position. As the tank is raised to the second inclined position, the tank base frame moves towards the ground and the dolly lower brackets begin to separate from the tank base lower brackets. Once the tank base is in the second inclined position, the tank base is in contact with the ground at a point of contact. Sixth, the fasteners are removed from the upper dolly brackets and upper tank base brackets.

The dolly is then fully disconnected from the tank and can easily be rolled from the tank in an away direction. Seventh, the tank is lowered from the second inclined position to a resting position such that the sled frame of the tank rests on the ground.

In order for the tank to be ready to be lifted by the semi-tractor truck, the tank must also be disconnected from the removable lift system. To remove, the tank grapplers are moved from the closed position to the open position. Once in the open position, the transverse lifting bar of the removable lift system is lowered in a downward direction and then moved away from the tank in a retract direction until the tank grapplers are fully clear of the tank lifting bar. The tank is now resting in a horizontal position on the ground and is ready to be lifted into a vertical position for use.

(7) Method of Mounting the Dolly to the Removable Lift System for Transportation Once the tank has been delivered and positioned in place for use, the dolly is then attached to the removable lift system for transport. The dolly is designed to easily be transported by the semi-tractor truck and removable lift system according to the following method: First, the semi-tractor truck connected to the removable lift system moves in a reverse direction with the tank grapplers in an open position until the tank grapplers are directly underneath the tank connector frame of the dolly. As the semi-tractor truck moves underneath the dolly, the left and right adjustable boom lift guides ensure that the extendable boom lift will be centered on the axle of the dolly. Second, a supply line is connected from the rear service panel of the removable lift system to the dolly service panel such that the front signal lights of the dolly are operational. Third, the tank grapplers are then moved from the open position to the closed position such that the tank grapplers secure the tank base frame. Fourth, the dolly is raised in an upward direction 601 such that the dolly can be transported without coming into contact with the ground.

(8) Method of Removing the Removable Lift System from the Semi Tractor Truck

In order to use the semi-tractor truck to raise or lower a tank between a horizontal position and a vertical position, the removable lift system must be removed from the semi-tractor truck. Ordinarily, when on the truck, the removable lift system is in a transportation position. In order to remove the removable lift system from the semi-tractor truck, the removable lift system must be placed in a storage position by removing the boom lift stands from the transverse stay beam, rotated 180 degrees such that boom lift stand feet face the ground, and then the boom lift stands are reattached to the transverse stay beam.

Once the boom lift stands are in the storage position and the wheels of the dolly are in contact with the ground, stay collar pins are pulled from the stay collar holes which had secured the left and right frame rails of the removable lift system. Next the supply lines, electrical signal lines and hydraulic lines are disconnected from the front service panel of the removable lift system, and the disengages the locking mechanism to release the kingpin from the fifth wheel.

Finally, the semi-tractor truck moves in a forward direction and away from the removable lift system. Once the truck has disconnected with the removable lift system and the stay collars and the fifth wheel, the removable lift system is free standing on the boom lift stands and the dolly wheels. The semi-tractor truck is now ready to be used to raise or lower a tank between a horizontal and vertical position.

(9) Method of Raising a Vertical Tank from a Horizontal Position to a Vertical Position Using the Semi-Tractor Truck Once a tank is delivered to a work site, it is desired to move the tank from a horizontal position to a vertical position. When in a vertical position, the tank occupies less space in the field. The vertical transport system can be used to raise a tank from a vertical position to a horizontal position by first removing the dolly as set forth above. Next, the removable lift system is removed from the semi-tractor truck, as set forth above. Only the semi-tractor truck is needed to lift the tank from a horizontal position to a vertical position. First, the winch cable is connected to the lifting line of the tank. Second, the adjustable tail roller is moved from the flush position to the angled position so that the tank will be easier to control as it lifted. Third, the winch cable and lifting line are wound in a winding direction which pulls the tank up and over the adjustable tail roller such that the tank sled frame is in contact with the adjustable tail roller of the semi-tractor truck. Fourth, the semi-tractor truck then moves in a reverse direction where the adjustable tail roller moves along the tank sled frame and the winch cable continues to be wound in the winding direction to remove slack in the cable until the tank reaches a controllable tipping position. As the semi-tractor truck moves in a reverse direction, the winch cable and lifting line are moved in an unwinding position to maintain tension in the lifting line, but still allow the tank to continue to rise to the controllable tipping position. Fifth, once the controllable tipping position is reached, the winch cable and lifting line are moved in an unwinding position to allow gravity to act on the tank to pull it to a vertical position. Sixth, the winch cable and the lifting line are disconnected and the tank is free standing and ready for use.

(10) Method of Lowering a Vertical Tank from a Vertical Position to a Horizontal Position Using the Semi-Tractor Truck The semi-tractor truck can also be used to lower a tank from a vertical position to a horizontal position. First, the removable lift system must be removed from the truck as set forth above and in the detailed specification below and the adjustable tail roller be placed in the angled position. Second, the winch cable of the semi-tractor truck is unwound sufficiently and connected to the lifting line of the tank. Third, the truck is positioned with its tail roller against the sled frame of the tank. Fourth, the winch cable and lifting line are moved in winding direction causing the base frame of the tank to rotate off the ground about the point of contact of the base frame and the sled frame. Fifth, the semi-tractor truck begins to move in a forward direction while the lifting line is continued to be moved in winding direction. Sixth, the truck continues to move in a forward direction until it reaches the controlled tipping position, then the lifting line is then moved in an unwinding direction allowing the adjustable tail roller to continue to roll along the sled frame until the tank lifting bar has passed over the adjustable tail roller. Seventh, the truck stops and the lifting line and winch cable are moved in an unwinding direction until the tank sled frame is in contact with the ground. The winch cable is then disconnected from the tank lifting line.

(11) Method of Attaching the Removable Lift System to the Semi-Tractor Truck.

When a tank has been delivered to its destination, it is necessary to reattach the semi-tractor truck to the removable lift system and dolly. Or if collecting a tank that has recently been placed in a horizontal position from a vertical position, in order to transport the tank using the tank transportation system, the removable lift system must first be attached to the semi-tractor truck. Installing the removable lift system onto the semi-tractor truck is best performed with the removable lift system and dolly in the storage position.

First, the adjustable tail roller of the semi-tractor truck is positioned to the flush position. Second, the semi-tractor truck is oriented with the removable lift system such that the left and right stay collars of the semi-tractor truck are generally oriented with the left and right aligning rails of the removable lift system. Second, the truck moves in a reverse direction in order to slidably insert the left and right alignment rails in the left and right stay collars as well as the kingpin into the fifth wheel. The truck stops moving in a reverse direction when the kingpin is properly seated in the fifth wheel and the left and right aligning rails are within the left and right stay collars and the kingpin is secured and the locking pins are inserted through the stay collars. Third, the adjustable boom lift stands are moved from the storage position to the transportation position. Fourth, the supply lines and hydraulic lines of the semi-tractor truck are connected to the front service panel of the removable lift system.

If a tank has been recently delivered, then the dolly is raised by the removable lift system until the wheels of the dolly are sufficiently off the ground in order to allow the semi-tractor truck to transport the dolly. If a tank has just been lowered from a vertical position to a horizontal position, then the dolly is removed from the removable lift system and connected to the tank as set forth more fully below.

(12) Method of Attaching Dolly to Tank Using Removable Lift System.

Once a tank has been lowered from a vertical position to a horizontal position and the removable lift system has been attached to the semi-tractor truck, the dolly must be connected to the tank. First, the dolly is manually rolled toward the base of the tank such that the upper and lower dolly brackets face the upper and lower tank base brackets. Second, the first and second dolly upper brackets are connected to the first and second upper tank base brackets. Third, the semi-tractor truck moves in a reverse direction towards the tank lifting bar of the tank and with the tank grapplers in the open position. Once directly underneath the tank lifting bar, the grapplers are moved from the open position to the closed position securely around the tank lifting bar. Fourth, the upper end of the tank is lifted by the removable lift system such that the tank pivots about the base frame sufficiently to enable a pivot block to be placed underneath the sled frame. Fifth, the tank is then lowered by the removable lift system such that the tank pivots about the pivot block, causing the first and second lower dolly brackets to come into contact and alignment with the first and second lower tank base brackets. Sixth, the first and second lower dolly brackets are fastened to the first and such lower tank base brackets. Seventh, the tank is raised by the removable lift system sufficiently to allow the removal of the pivot blocks. Eighth, supply lines are connected between the rear service panel of the removable lift system and the dolly service line panel in order to enable the braking system and electrical signals of the dolly. Once so connected, the tank is ready for transportation by the semi-tractor truck without the use of a conventional semi-tractor trailer.

BRIEF DESCRIPTION OF THE DRAWING

The nature, objects, and advantages of the present invention will become more apparent to those skilled in the art after considering the following detailed description in connection with the accompanying drawings, in which like reference numerals designate like parts throughout, and wherein:

FIG. 13-1 is a side isometric view of the dolly top frame, tank connector frame and reservoir frame with the remaining components removed from this view for clarity;

FIG. 14-1 is a close up isometric view of the first dolly upper bracket extending from the tank connector frame;

FIG. 14-2 is a close up isometric view of the first dolly upper bracket connected with the tank base upper bracket and secured with a pin thereby connecting the dolly to the tank;

FIG. 14-3 is a close up isometric view of the first dolly lower bracket extending from the tank connector frame;

FIG. 14-4 is a close up isometric view of the first dolly lower bracket connected with the tank base lower bracket and secured with a pin thereby further connecting the dolly to the tank;

DETAILED DESCRIPTION

Figure 1:
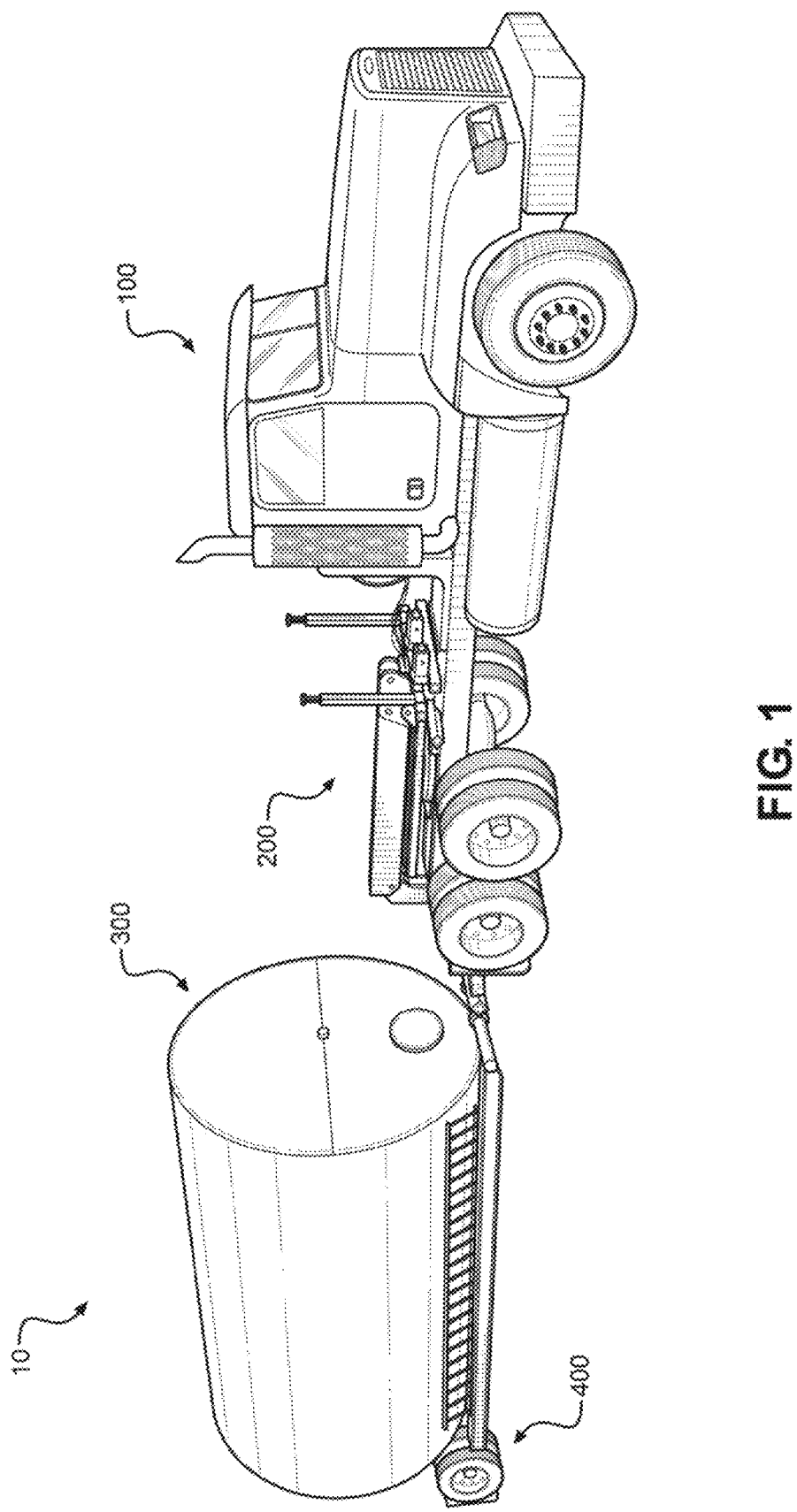
FIG. 1 is an isometric view of the tank transport system, including a truck, a removable lift system, a tank and a dolly.

Referring initially to FIG. 1, a tank transport system 10 is generally disclosed and includes a semi-tractor truck 100, a removable lift system 200, a vertical tank 300 and a dolly 400. The removable lift system 200 couples the semi-tractor truck 100 to the vertical tank 300. The dolly 400 connected to the opposite end of the vertical tank 300 such that the semi-tractor truck 100 can transport the vertical tank 300 without the use of a trailer.

Truck

Figure 2:
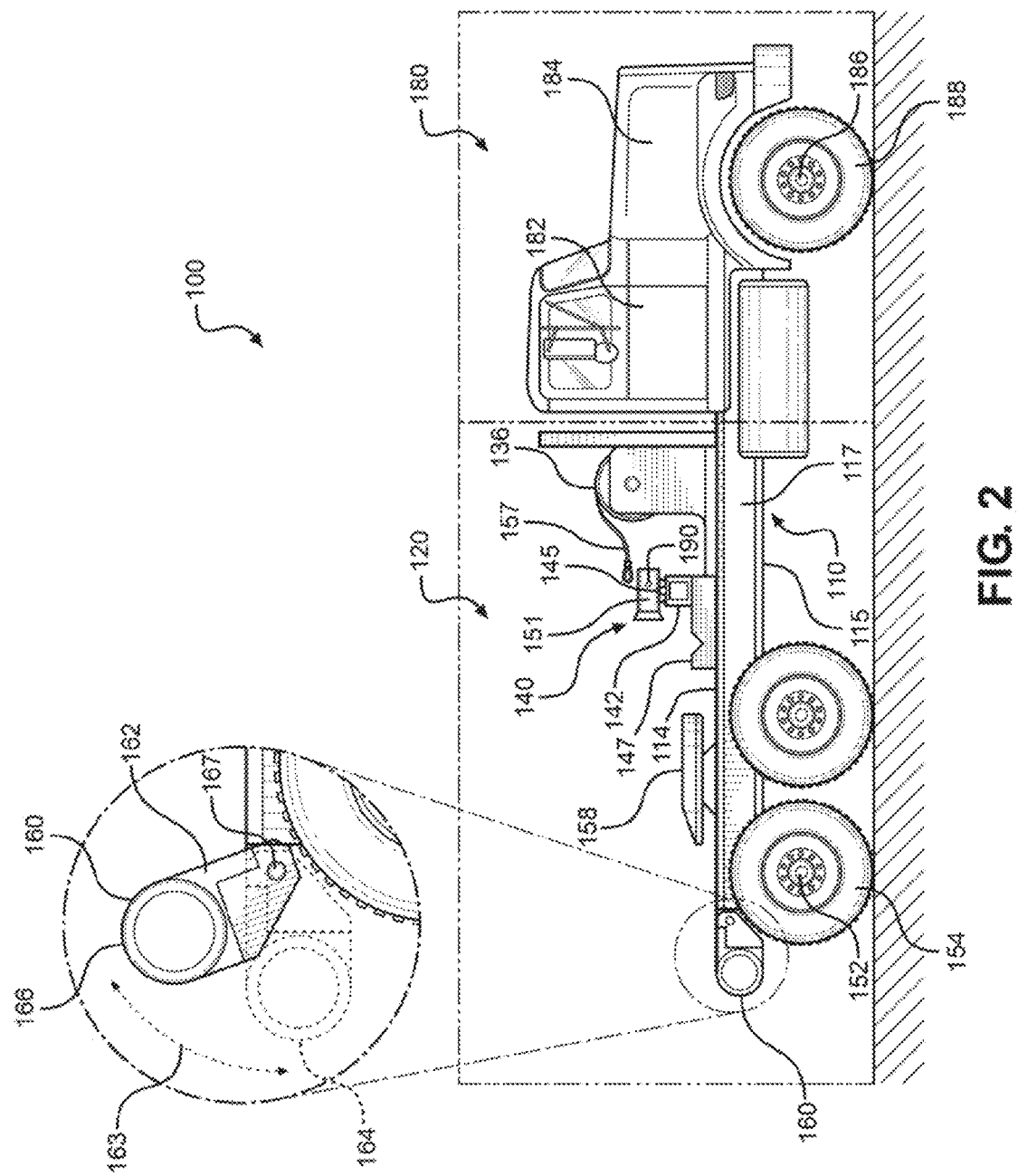
FIG. 2 is a side view of the semi-tractor winch truck having an adjustable tail roller, and a detailed view of the adjustable tail roller configured in the flush position.

Referring next to FIG. 2, a right side view of a semi-tractor truck 100 is generally disclosed and includes a truck chassis 110 with a utility portion 120 and a cab portion 180. The truck chassis 110 also has a front 112, a rear 113, a top 114, a bottom 115 and a left frame rail 116 (not shown) and a right frame rail 117.

The cab portion 180 of the semi-tractor winch truck includes a cab 182 that encloses a conventional truck interior used by an operator (not shown) and an engine bay 184 that houses an engine (not shown).

The utility portion 120 of the semi-tractor winch truck chassis 110 begins immediately behind the cab portion 180 of the chassis and continues to the rear 113 of the truck chassis 110. Typically, the truck chassis 110 will have a front axle 186 having a pair of front wheels 188 below the engine bay 184 and dual rear axles 152 below the utility portion 120. In a preferred embodiment, each rear axle 152 is equipped with two rear wheels 154 on each side. Thus the utility portion of the chassis is supported by eight total wheels. In an alternative embodiment, each rear axle 152 is equipped with only one rear wheel 154 on each side. It is to be appreciated that the present invention is not limited to any particular configuration of rear axles or rear wheels.

The utility portion 120 of the truck chassis 110 is equipped with a winch 156, a fifth wheel 158, lift system lock 140 and an adjustable tail roller 160. As can be more fully seen in conjunction with FIGS. 22-23, the winch 156 and adjustable tail roller 160 are used in combination to raise and lower a vertical tank 300 (not shown). In a preferred embodiment, the winch 156 is placed adjacent to the cab 182 of the truck 100. The winch 156 can be operated by way of an electrical system or hydraulic system, or any other winch operating system known in the art. The winch 156 has a spool of winch cable 157 which can be extended or wound based upon operation of the winch 156.

The fifth wheel 158 is located on top 114 of the utility portion 120 of the truck chassis 110 and between the rear axles 152 of the semi-tractor truck chassis 110. Fifth wheels 158 are known in the art, and are generally horse shoe or semi-wheel shaped devices mounted horizontally over the rear axles of a semi-tractor to serve as a coupling for a semitrailer. In conventional semi-tractor trailers, a kingpin 242 (see generally FIGS. 5 through 9) is slidably inserted into a fifthwheel slot 159 (shown in FIG. 4) until secured by a fifthwheel locking mechanism (not shown), allowing the trailer to rate about the top of the fifthwheel 158.

Figure 3:
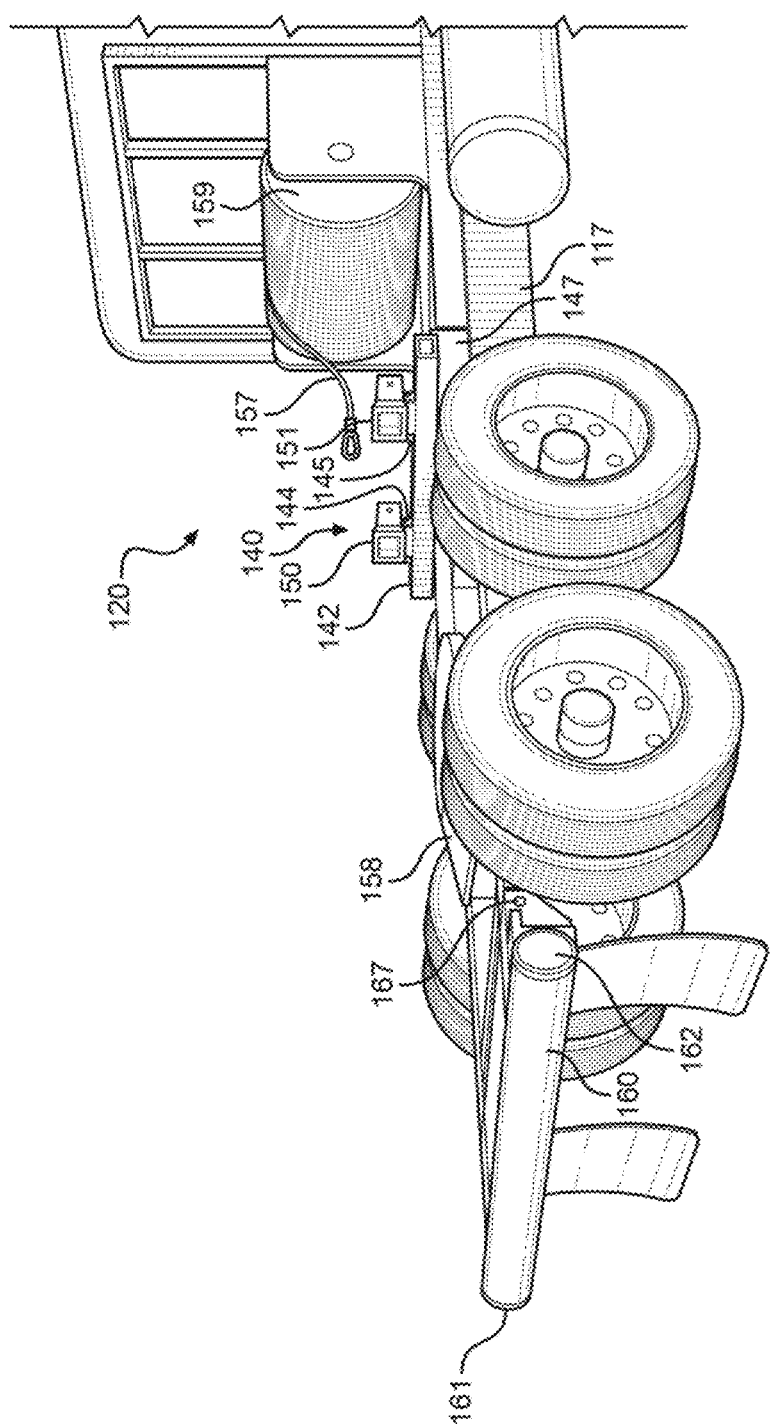
FIG. 3 is a rear isometric view of the utility portion of the truck chassis showing the adjustable tail roller extending across the rear of the utility portion of the truck chassis and the lift system lock.

Referring next to FIG. 3, a rear isometric view of the semi-tractor truck 100 is generally shown. As can be seen in FIG. 3, the adjustable tail roller 160 extends across the width of the rear of the truck chassis 110, terminating on each side of the semi-tractor truck 100 in a left tail roller bracket 161 (not shown) and a right tail roller bracket 162. The adjustable tail roller is capable of 360 degree axial rotation within the left and right roller brackets 161 and 162.

Returning to FIG. 2, the left and right roller brackets 161 and 162 are rotatably connected to left chassis frame 116 and right chassis frame 117. In a preferred embodiment, the left and right roller brackets 161 and 162 are attached to the left and right chassis frame 116 and 117 by tail roller pin 167. The left and right tail roller brackets 161 and 162 are capable of pivoting with respect to the truck chassis 110 such that the adjustable tail roller 160 can be move in direction 163 from a flush position 164 to an angled position 166.

As seen in FIG. 2, when the adjustable tail roller 160 is moved to the flush position 164, the adjustable tail roller is flush with the top 114 of utility portion 120 of the chassis 110. As seen in FIG. 2, When the adjustable tail roller is moved to the angled position 166, the adjustable tail roller 160 is located a higher distance 20 from the ground 30 compared to when the adjustable tail roller 160 is in the flush position 164.

Returning to FIG. 3, the utility portion of the truck chassis includes a lift system lock 140 for locking the removable lift system 200 (not shown) to the semi-tractor truck 100. The lift system lock 140 includes a transverse stay beam 142 rigidly mounted to a left frame reinforcement 146 (not shown) and a right frame reinforcement 147. The left frame reinforcement 146 is attached to the left chassis frame 116 of the truck chassis between the winch 156 and the fifth wheel 158. Similarly, the right frame reinforcement 147 is attached to the right chassis frame 117 of the truck chassis 110 between the winch 156 and the fifth wheel 158. The transverse stay beam 142 is roughly the same height as the top of the fifth wheel 158.

Figure 4:
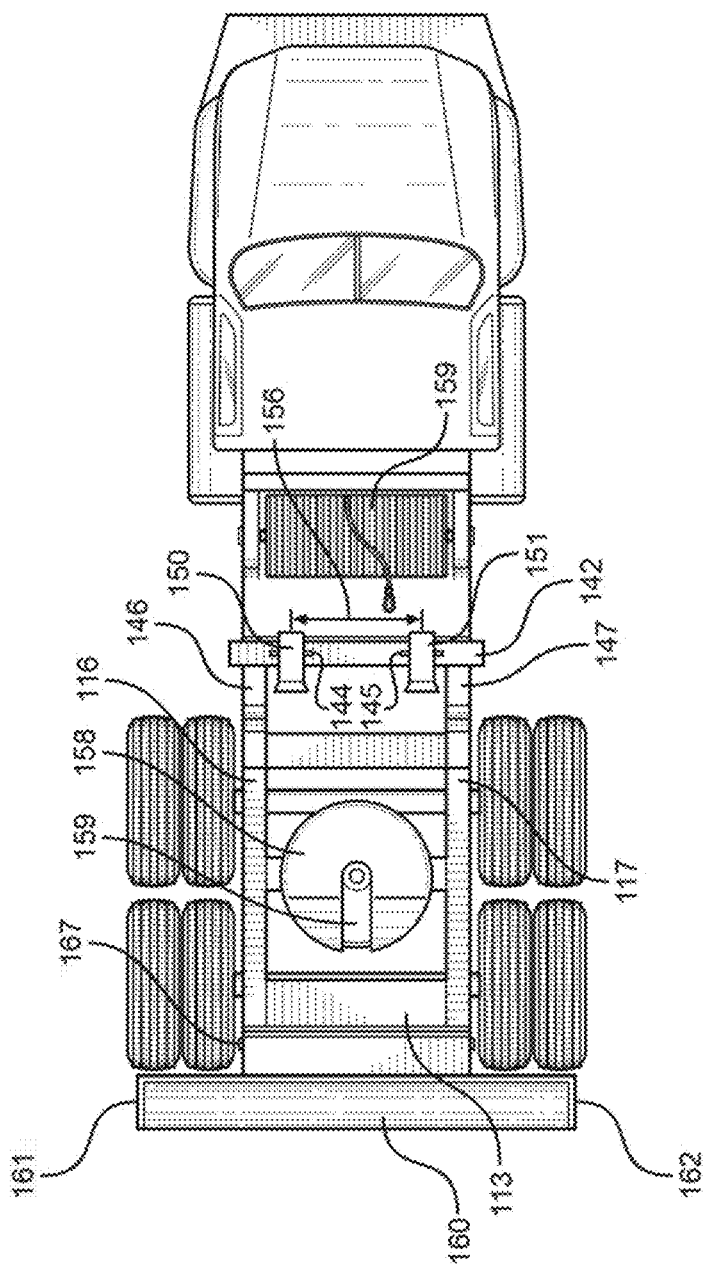
FIG. 4 is a top view of the semi-tractor winch truck showing the winch system, a fifth wheel, a removable lift system frame and an adjustable tail roller.

Referring now to FIG. 4, a top view of the semi-tractor truck 100 is generally shown. As can be seen in FIG. 4, a left stay bracket 144 and a right stay bracket 145 are each attached to the top of the transverse stay beam 142, a fixed distance 156 apart from one another. Similarly, a left stay collar 150 and a right stay collar 151 are each attached to the left stay bracket 144 and the right stay bracket 145 respectively, such that the left stay collar 150 and the right stay collar 151 are also a fixed distance 156 apart from one another. The adjustable tail roller 160 is seen next to the rear 113 of the semi-tractor truck 100

Removable Lift System

Figure 5:
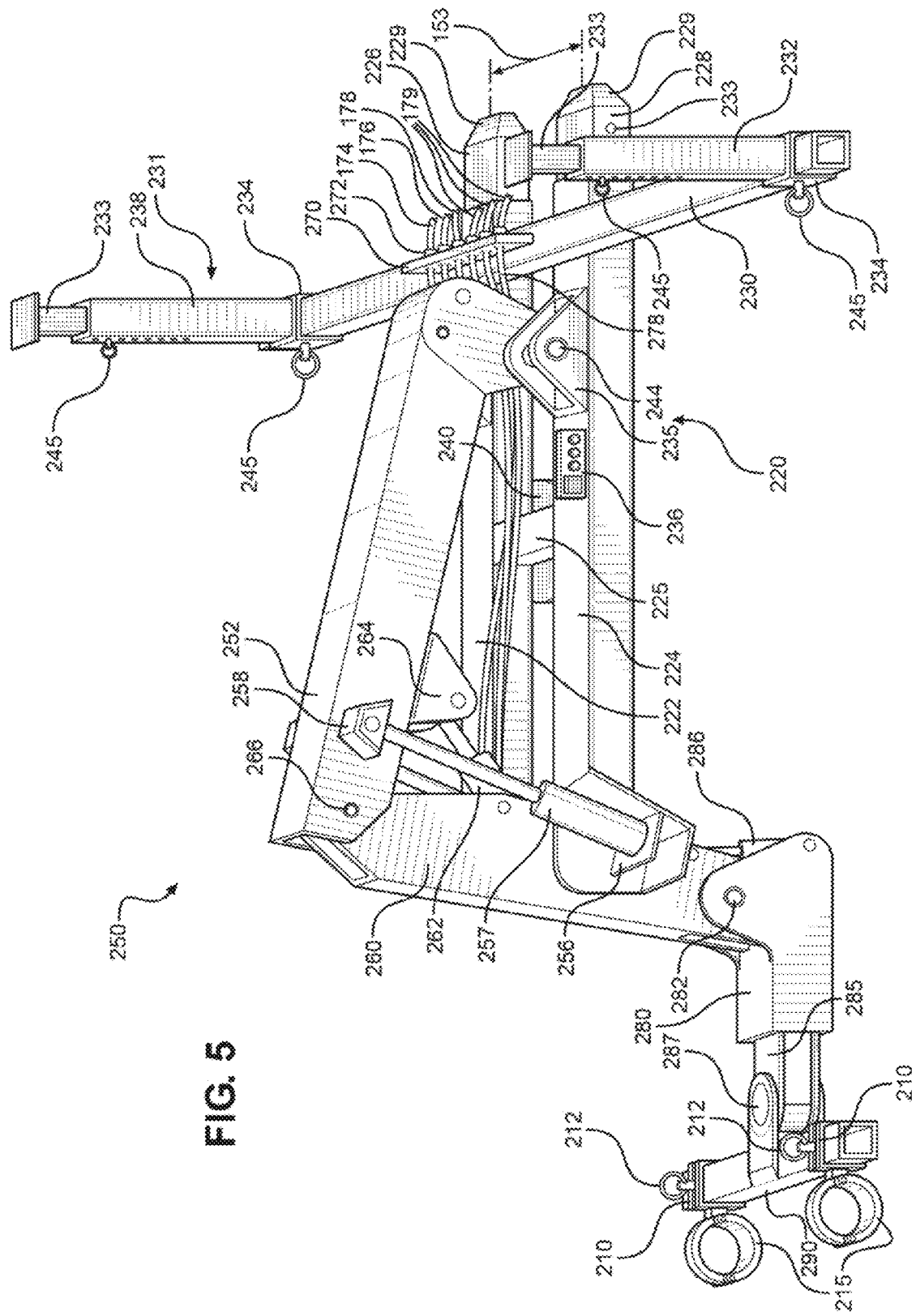
FIG. 5 is an isometric view of a removable lift system in a transportation position showing the boom lift main arm, boom lift support arm, extendable boom lift arm, transverse lift arm, and bar coupling collars.

The removable lift system 200 is designed to be removably attached to the semi-tractor truck 100 described above. Referring now to FIG. 5, the removable lift system of the present invention is generally shown with a boom lift base frame 220 and a boom lift 250.

The boom lift base frame 220 has a left frame rail 222, a right frame rail 224, a transverse stay beam 230 and a kingpin plate 240. The left frame rail 222 and the right frame rail 224 are parallel and spaced apart by distance 153 which is the same fixed distance as the left stay collar 150 from the right stay collar 151 on the utility portion 120 of the 110 chassis of the truck 100. At the end of the left frame rail 222, a left aligning rail 226 is rigidly attached, and at the end of the right frame rail 224 a right aligning rail 228 is rigidly attached. The left and right aligning rails 226 and 228 extend longitudinally from the left and right frame rails 222 and 224 respectively, and each terminate in a pyramidal tip 229. The aligning rails 226 and 228 are dimensioned to have a clearance fit with the left and right stay collars 150 and 151 of the transverse lock system 140 of the semi-tractor truck 100. When attaching the removable lift system 200, if the alignment between the aligning rails and the stay collars is slightly off, the pyramidal tips 229 serve to guide the aligning rails 226 and 228 through the stay collars 150 and 151.

The transverse stay beam 230 is connected to the top surface of the left frame rail 222 and the right frame rail 224 near the front of the left frame rail 222 and the right frame rail 224 and behind the location where the aligning rails 226 and 228 are rigidly attached to the left and right frame rails 222 and 224. A front service panel 270 is mounted on top of the transverse stay beam 230. The front service panel 270 contains service line connectors 272 for connecting to the truck air supply line 174, the truck air control line 176, the truck electrical signal line 178, and the truck hydraulic lines 179, all of which originate from the truck 100 (not shown). Hydraulic control lines then extend from the front service panel 270 to various hydraulic actuators of the boom lift 250 identified more fully below. Along the right frame rail 224, directly aft of the boom lift pivot base 235, are user controls 236 for the boom lift 250.

The kingpin plate 240 is connected to the bottom surface of the left frame rail 222 and right frame rail 224 near the middle of the left frame rail 222 and the right frame rail 224. The kingpin plate 240 is sized to rest on the surface of the fifth wheel 158 of the truck 100. An optional middle frame rail 225 is shown mounted transverse to and in between the left frame rail 222 and the right frame rail 224. The middle frame rail 225 adds structural rigidity to the boom lift base frame 220 and to reinforce the kingpin plate 240.

The kingpin plate 240 and the transverse stay beam 230 ensure that the distance 153 between the left frame rail 222 and the right frame rail 240 is maintained such that the left frame rail 222 and the right frame rail 224 are substantially parallel to one another. When equipped with a middle frame rail 225, the middle frame rail 225 also ensures that the distance between the left frame rail 222 and the right frame rail 240 is maintained such the left frame rail 222 and the right frame rail 224 are parallel to one another.

Immediately aft of the transverse stay beam 230 is a boom lift pivot base 235. The boom lift 250 is rotatably attached to the boom lift pivot base 235 as set forth more fully below.

Finally, a left main arm actuator support plate 254 (not shown) and right main arm actuator support plate 256 is connected to the rear end of the left frame rail 222 and the right frame rail 224 respectively. As can best be seen in FIG. 7, the left main arm actuator support plate 254 also is connected to a rear service panel 295. A supply line 274, control line 275 and signal line 276 run from the front service panel 250 to a rear service panel 295.

The boom lift includes a boom lift main arm 252, a boom lift support arm 260, and a boom lift extendable arm 280, each having a front and a rear and a top and a bottom and a left side and right side.

The front of the boom lift main arm 252 is rotatably attached to the boom lift pivot base 235 with boom lift pivot pins 244 such that the boom lift main arm 252 can rotate with respect to the boom lift pivot base 235 about boom lift pivot pins 244.

A right main arm actuator 257 is attached to the right main arm actuator support plate 256 and to the right side of the boom lift main arm 252. As can be better seen in FIG. 7, a left main arm actuator 255 is attached to the left main arm actuator support plate 254 and to the left side of the boom lift main arm 252. The left and right boom lift main arm actuators 255 and 257 raise and lower the boom lift main arm 252 about the boom lift pivot base 235. In a preferred embodiment, the left and right boom lift main arm actuators 255 and 257 are operated by hydraulic fluid supplied by the semi-tractor truck 100, which passes through the front service panel 270 and through the hydraulic control lines 278 to the actuators 255 and 257. Those actuators 255 and 257 are controlled with the controls 236.

The front of the boom lift support arm 260 is rotatably attached to the rear of boom lift main arm 252 at pivot point 266. A boom lift support arm actuator 262 is attached to the bottom of the boom lift main arm 252 at support arm brackets 264 and to boom lift support arm 260 such that the boom lift support arm can rotated about its connection with the boom lift main arm at pivot point 266 when the boom lift support arm actuator 262 is extended or contracted. In a preferred embodiment, the boom lift support arm actuator 262 is operated by hydraulic fluid supplied by the semi-tractor truck 100, which passes through the front service panel 270 and through the hydraulic control lines 278 to the actuator 262. The boom lift support arm actuator 262 is controlled with the controls 236.

The extendable boom lift arm 280 partially houses an extendable boom lift 285. The extendable boom lift arm 280 is rotatably connected to the rear of the boom lift support arm 260 at a connection point 282. A boom lift extendable arm actuator 286 is connected to the bottom of the boom lift support arm 260 and to the top of the rear of the boom lift extendable arm 280. In a preferred embodiment, the boom lift extendable arm actuator 286 is hydraulically actuated in the same manner described for actuators 255, 257, and 262.

The extendable boom lift 285 has a front and a rear. As seen in FIG. 5, the rear of extendable boom lift 285 is capable of movement in an extend direction 615 and a retract direction 614. When moved in the extend direction 615, the extendable boom lift 285 extends outward from the front of the boom lift extendable arm 280. When moved in the contract direction 614, the extendable boom lift 285 retracts into the front of the boom lift extendable arm 280. The front of the extendable boom lift 285 is connected to a turning coupling 287. The turning coupling 287 is then connected to a transverse lifting bar 290.

As seen in FIG. 5, when actuated, the boom lift main arm 252, boom lift support arm 260, extendable boom lift arm 280 and extendable boom lift 285 cooperatively work together to move the transverse lifting bar 290 an upward direction 601, a downward direction 602, a retract direction 614 and an extend direction 615 or any combination of said directions.

Bar coupling collars 210 are slidably placed over each end of the transverse lifting bar 290. The bar coupling collars are each held in place by a retaining pin 212 placed through the transverse lifting bar 290. The bar coupling collars 210 attach to the tank for installation of the dolly, transportation of the tank, or other various purposes. Terminating at one end of each of the bar coupling collars 210 are tank grapplers 215. The tank grapplers 215 are used to attach to the tank 300 or to the dolly 400 as set forth in more detail below. In FIG. 5, the tank grapplers 215 are shown in a closed position 216. As set forth in more detail in FIG. 6, the tank grapplers 215 are shown in partial dashed lines to depict an open position 217.

Figure 6:
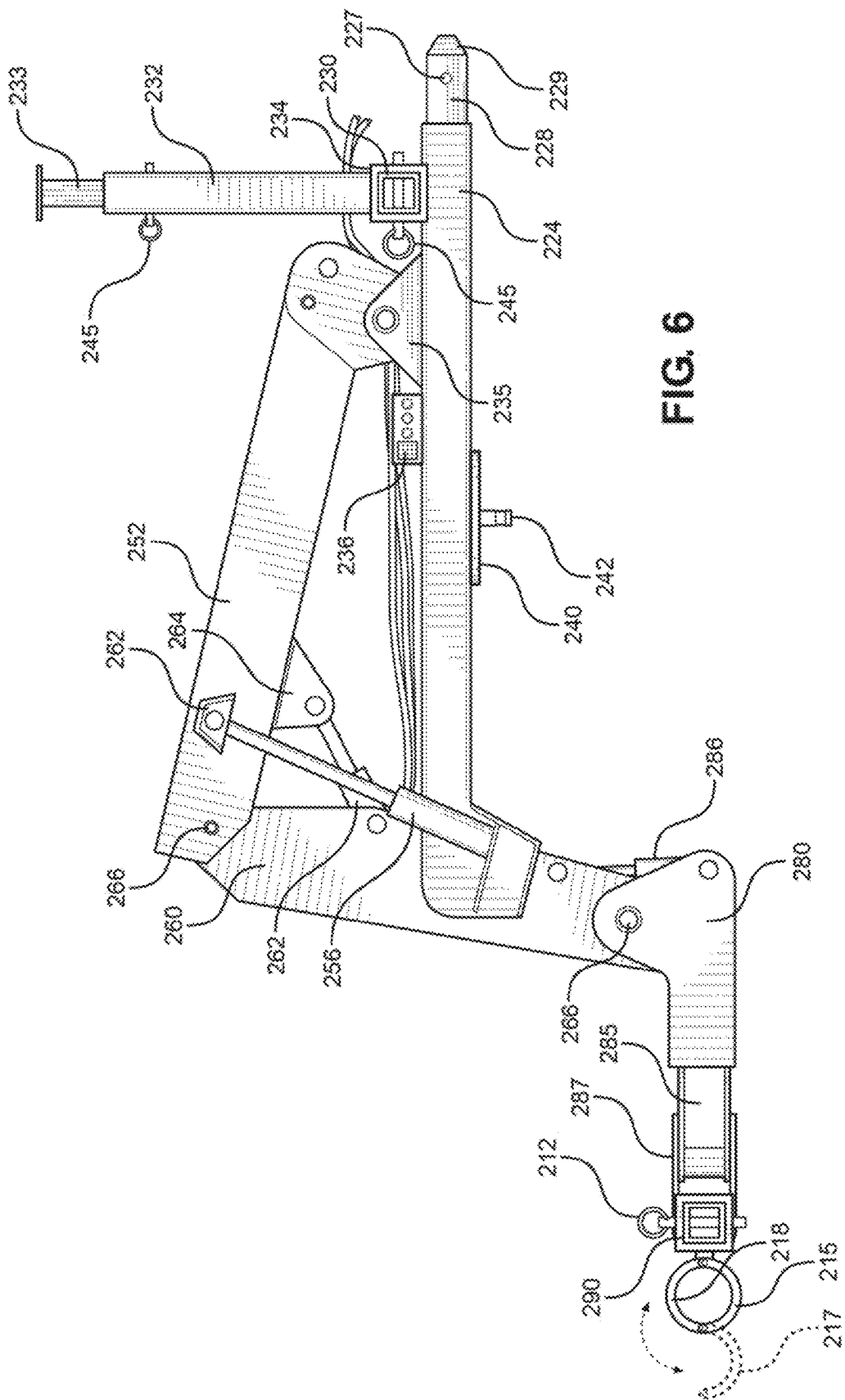
FIG. 6 is a side view of a removable lift system in a transportation position.

Referring now to FIG. 6, a right side view of the removable lift system is generally shown. A kingpin 242 is rigidly attached and extends from the bottom center of the kingpin plate 240. The kingpin 242 is sized to be slidably inserted into the fifth wheel slot 159 and latch into the fifth wheel opening 155 of the fifth wheel 158 of the semi tractor truck 100.

Figure 7:
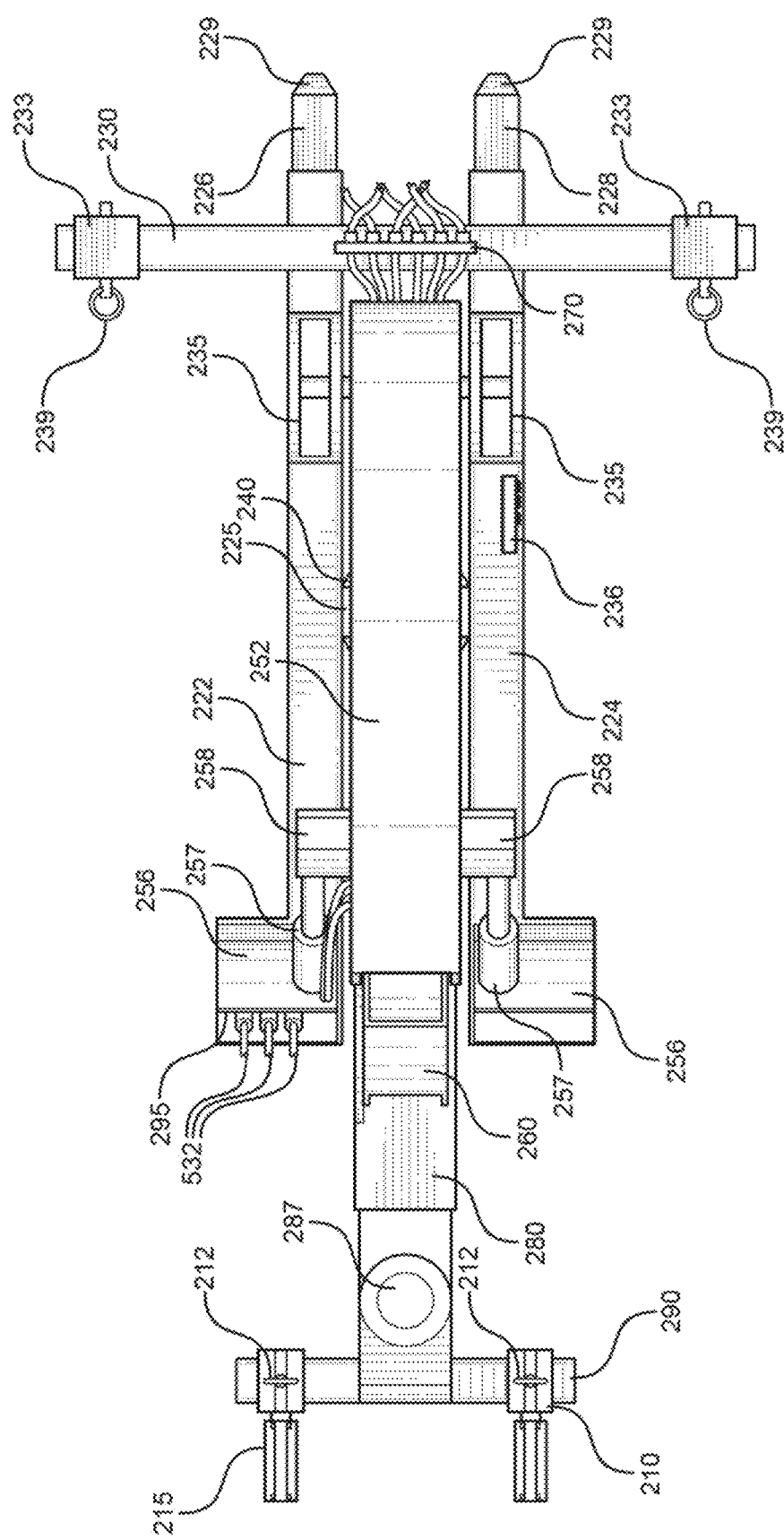
FIG. 7 is a top view of a removable lift system in a transportation position.

Referring now to FIG. 7, a top view of the removable lift system 200 is generally shown. The transverse lifting bar 290 is capable of rotation with respect to the boom lift extendable arm 280 via the turning coupling 287.

Figure 8:
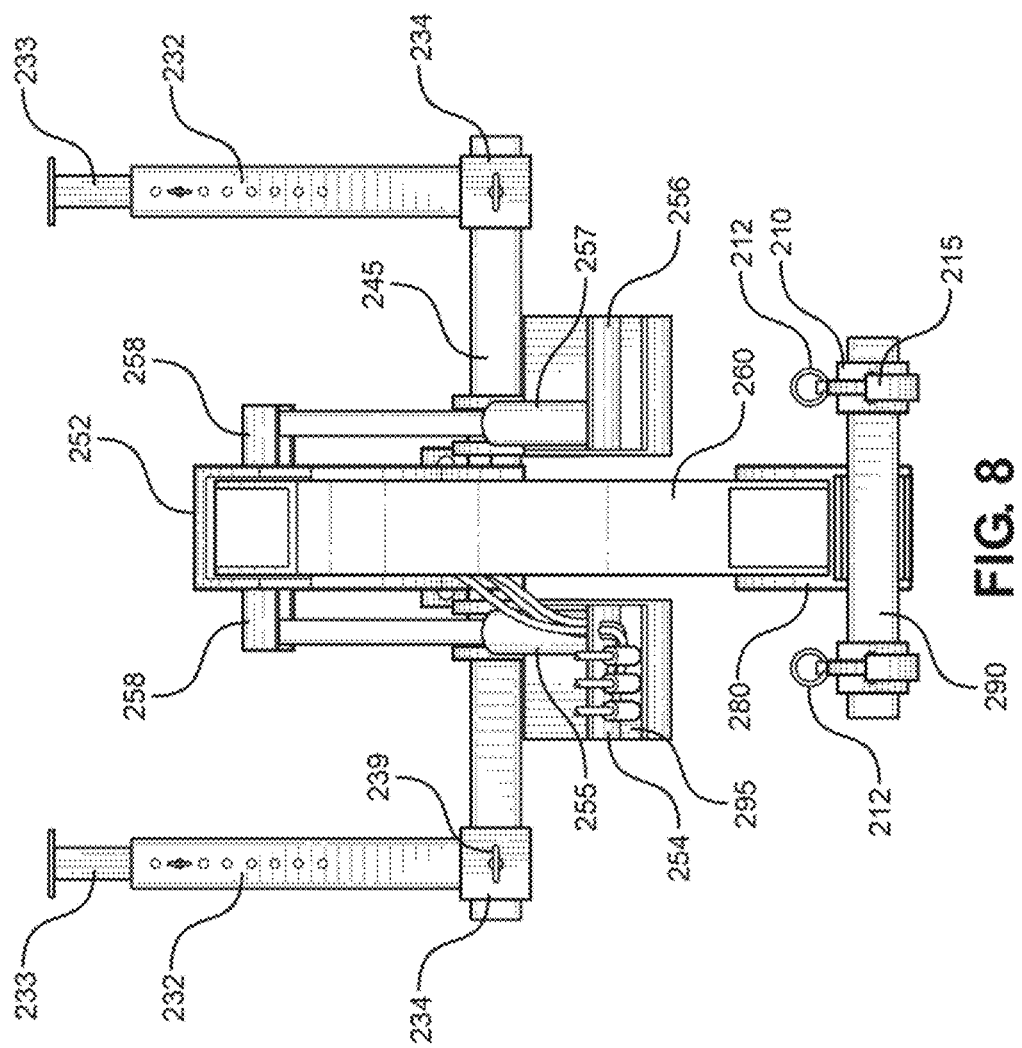
FIG. 8 is a back view of a removable lift system in a transportation position showing the boom lift main arm, boom lift support arm, extendable boom lift arm, transverse lift arm, and bar coupling collars.

Referring now to FIG. 8, a back view of the removable lift system 200 is generally shown. In a preferred embodiment, the removable lift system 200 is equipped with two identical adjustable boom lift stands 231. The adjustable boom lift stands 231 have an adjustable boom lift stand base 232, an adjustable boom lift stand foot 233, and an adjustable boom lift stand collar 234. One end of the adjustable boom lift stand base 232 is sized to slidably receive the adjustable boom lift stand foot 233. The opposite end of the adjustable boom lift stand base 232 terminates in a boom lift stand collar 234. The boom lift stand collar 234 is sized to slidably fit over either end of the transverse stay beam 230. The boom lift stand collar 234 is equipped with a boom lift stand hole 238. Similarly, the transverse stay beam 230 is equipped with a matching boom lift hole 244 (Best seen in FIG. 21D) such that when a boom lift stand collar is slid over the transverse stay beam 230 such that the boom lift stand holes 238 of the boom lift stand collar and the boom lift holes 244 of the transverse stay beam 230 are in alignment, a boom lift stand pin 245 can be used to secure the boom lift stand 231 in place.

Figure 9:
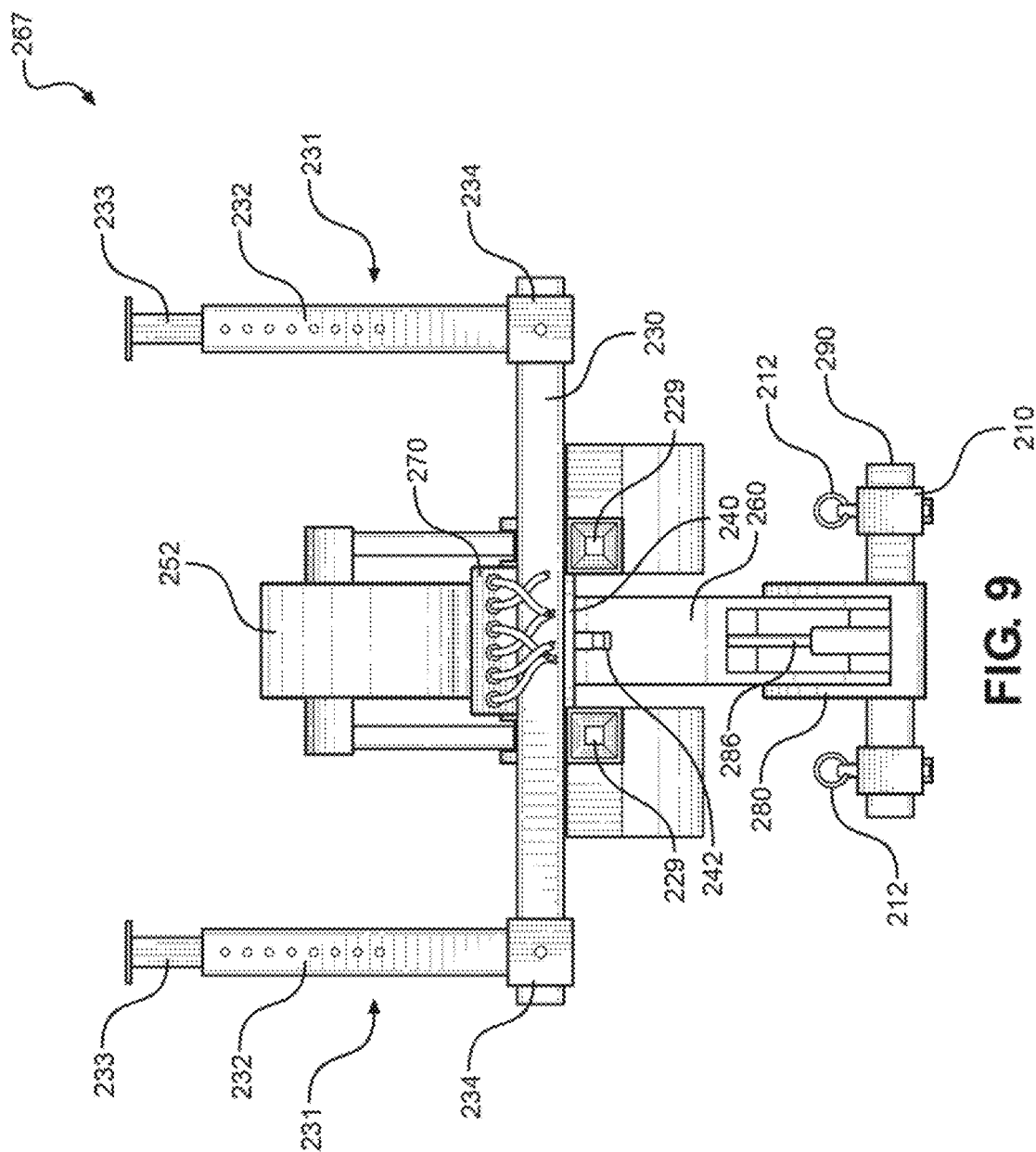
FIG. 9 is a front view of a removable lift system in a transportation position showing the left and right aligning rails and the kingpin.

Referring now to FIG. 9, a front view of the removable lift system 200 is generally shown. FIG. 9 depicts the adjustable boom lift stands 231 in a transportation position 267. The adjustable boom lift stands 231 are in a transportation position 267 when the adjustable boom lift stand feet 233 are faced opposite the ground (see FIGS. 21A, C and D). When the adjustable boom lift stand feet 233 face the ground, the adjustable boom lift stands 231 are in a storage position 268 (see FIGS. 21B, E and F).

Tank

Figure 10:
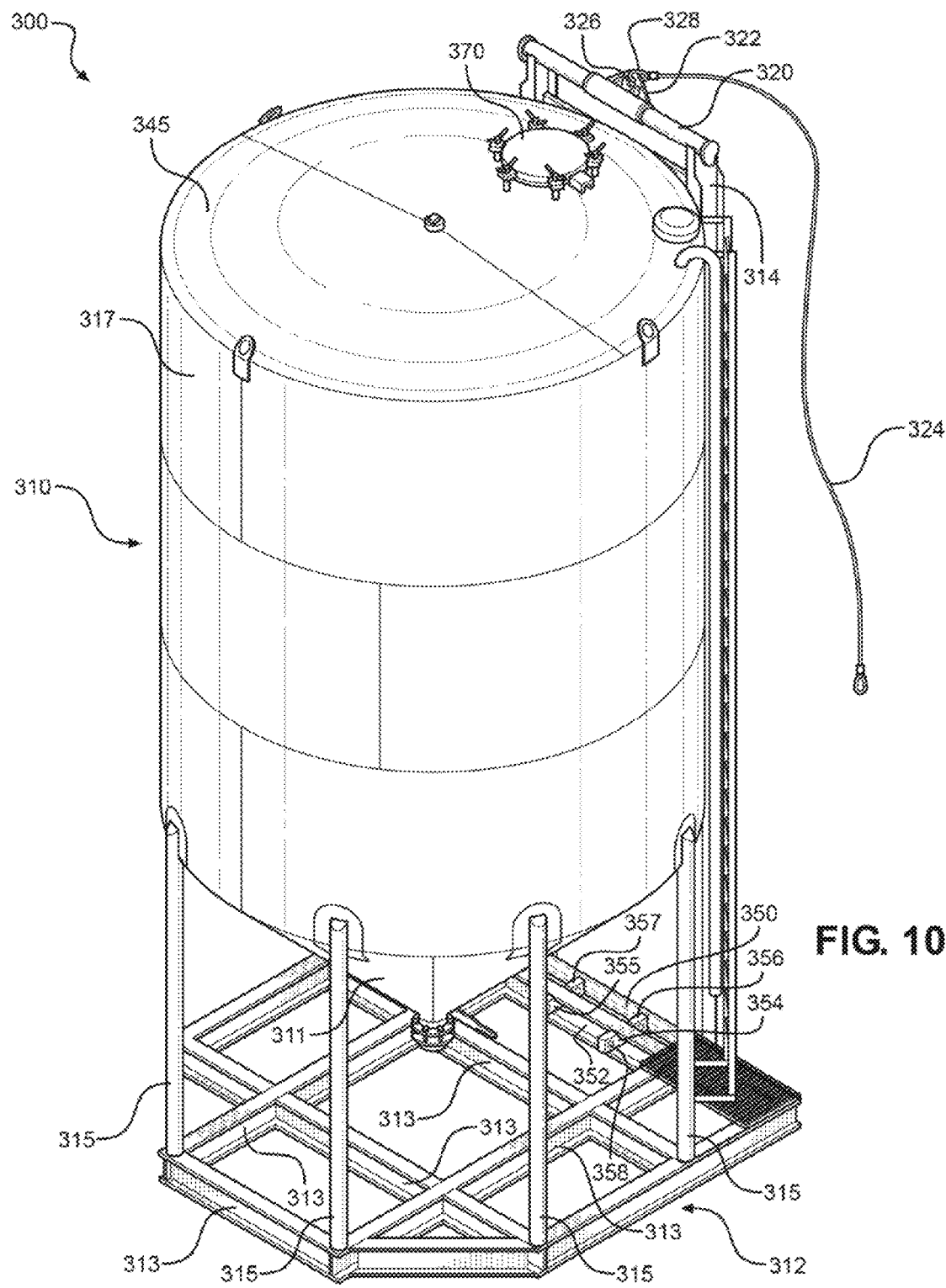
FIG. 10 is an isometric view of a vertical tank having a generally cylindrical shape and having a sled frame and a base frame.

Referring next to FIG. 10, an isometric view of the vertical tank 100 is shown. The tank 300 includes a large hollow body 310 for holding materials such as water, drilling mud, or drilling wastes.

In a preferred embodiment, the hollow body 310 consists of a cylindrical wall 317, a conical bottom 311, a top panel 345 and a lower valve 316. The cylindrical wall has a top 341, a bottom 343 and a circumference 342. The top panel 345 is connected with and encloses the top 341 of the cylindrical wall 317. A top access door 370 allows for access through the top panel 345 to examine the contents held within tank 300.

Figure 11:
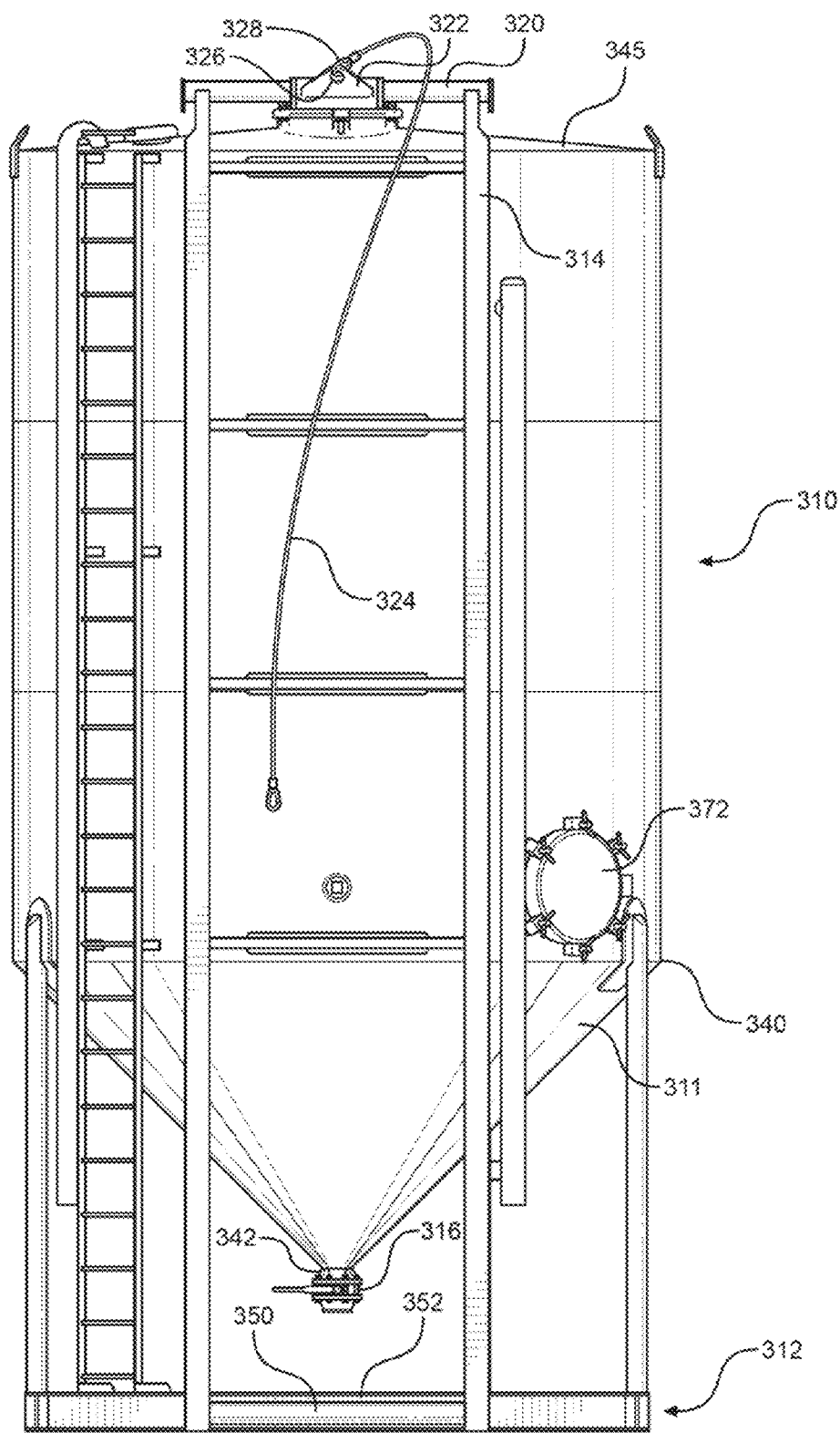
FIG. 11 is a back view of a vertical tank in the vertical and upright position showing the attached sled frame.

As shown in FIG. 11, the conical bottom 311 tapers from a top portion 340 to a bottom portion. The top portion 340 of the conical bottom 311 is generally the same circumference 342 as the circumference 342 of the cylindrical wall 317 and is connected to the bottom 343 of the cylindrical wall 317. The bottom portion 342 of the conical bottom is enclosed by the lower valve 316.

The conical bottom 311 facilitates the flow of materials out of the tank 300 through the lower valve 316. The lower valve 316 is connected to the bottom portion 342 of the conical bottom 311 such that the lower valve 316 can be opened to allow fluid or other materials stored in the tank 300 to pass out of the tank 300 through the lower valve 316. When in a vertical position, the lower valve 316 is above the base frame 312 to allow for ease of connecting various plumbing fixtures to the lower valve 316 when the tank 300 is in use.

In a preferred embodiment, the tank 300 has a base frame 312 and a sled frame 314. For a vertical tank 310, the base frame 312 is located on the bottom of the tank 300 and the sled frame 314 runs along the cylindrical wall 317 of the tank 300, terminating in a tank lifting bar 320 opposite the base frame 312.

The base frame 312 includes base frame members 313. In a preferred embodiment, the base frame members 313 are made of steel members configured with i-beam cross sections. The i-beam cross sections increase the structural rigidity of the base frame members 313 to allow the base frame 312 to support the entire weight of the tank 300.

The sled frame 314 is sufficiently rigid to serve as the primary structure support for the tank 300 when the tank 300 is connected to the lifting device 200 and the dolly 400 in order to be transported by the truck 100. The sled frame 314 serves as the primary frame members that would ordinarily be present in a conventional semi-tractor trailer.

Support members 315 are secured between the bottom 343 of the cylindrical wall 317 and the base frame members 313 of the base frame 312. The support members 315 hold the tank 300 in place above the base frame 312 and serve to further increase the structural rigidity of the base frame 312 when the tank 300 is connected to the lifting device 200 and the dolly 400 in order to be transported by the truck 100.

In a preferred embodiment, as set out more fully in FIG. 19A below the tank lifting bar 320 is cylindrical to allow the tank lifting bar 320 to easily be connected to the bar tank grapplers 215 of the removable lift system 200. As can be more easily seen in FIGS. 18A through 18F, as the tank grapplers 215 are attached to the tank lifting bar 320 and used to lift the tank 300, the tank lifting bar 320 can rotate with respect to the tank grapplers 215 to accommodate the change in angle as the tank lifting bar 320 is lifted off of the ground and the opposite end with the base frame 312 remains on the ground.

The tank lifting bar 320 holds a lifting line panel 322 that can rotate with respect to the tank lifting bar 320. As can be seen in FIG. 11, a lifting line 324 is connected to the lifting line panel 322 via a lifting line panel hole 326 on the lifting line panel 322 by any means known in the art. In a preferred embodiment, one end of the lifting line 324 is passed through the lifting line panel hole 326 and formed into a loop 328 and secured against itself by any means known in the art, including clamp, hook, clasp or other temporary fastener or a permanent bond such as welding. A side access door 372 is connected to the cylindrical wall 317 of the tank 300 in order to allow access to the interior of the tank 300 to facilitate cleaning or debris removal.

Figure 12:
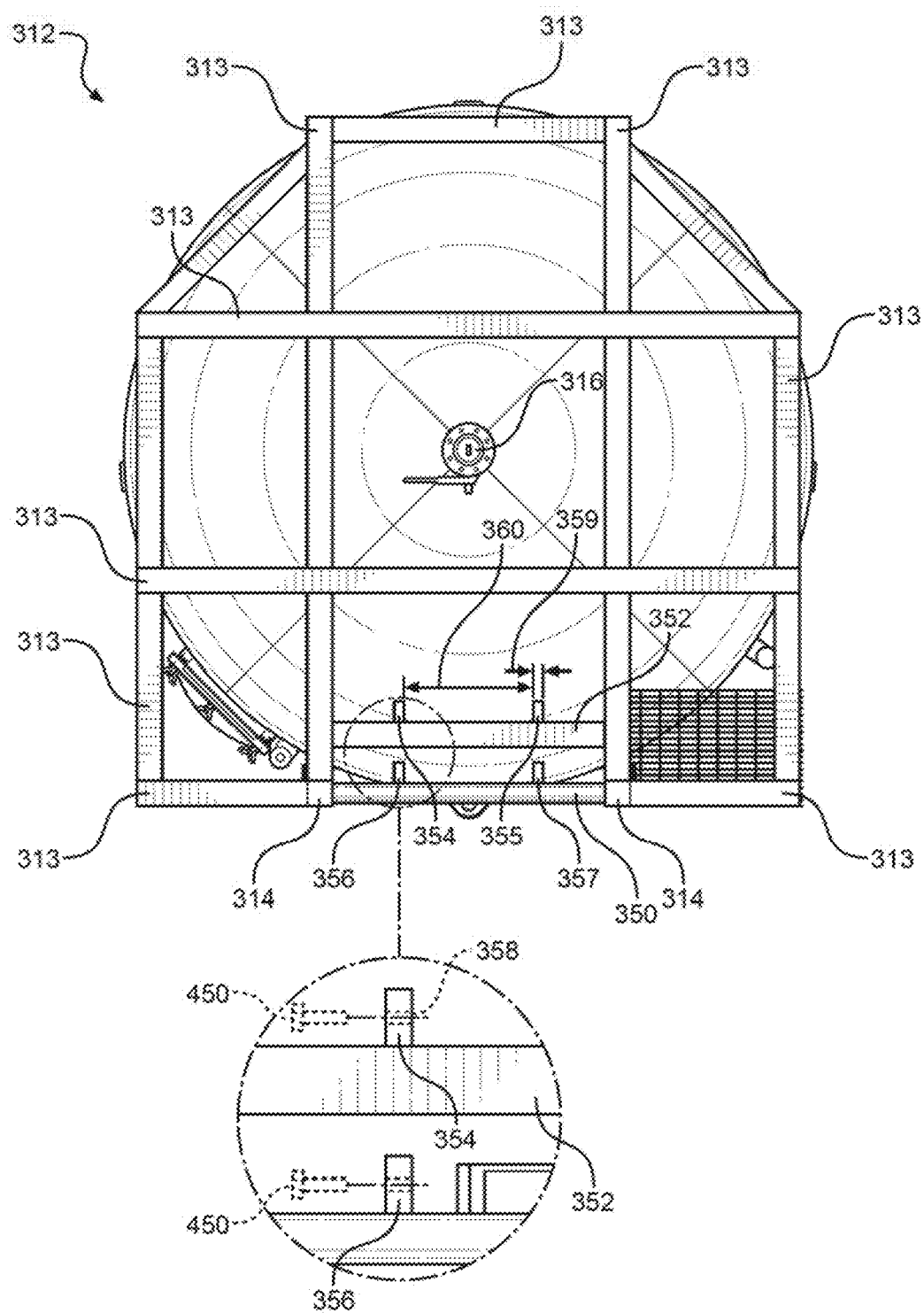
FIG. 12 is a bottom view of a vertical tank in the horizontal position showing the attached base frame.

FIG. 12 is a bottom view of the vertical tank 300 showing the attached base frame 312. The tank base frame 312 includes a plurality of rigid structural members, including a tank base first bar 350 and a tank base second bar 352. In a preferred embodiment, the tank base first bar 350, made of cylindrical tubing, is parallel to the tank base second bar 352, made of square tubing, and both the tank base first bar 350 and the tank base second bar 352 are rigidly incorporated into the tank base frame 312. In an alternative embodiment, the tank base second bar 352 can also be made of cylindrical tubing. A tank base first lower bracket 356 and a tank base second lower bracket 357 are attached to the tank base first bar 350 a fixed distance 360 apart from one another. The tank base first lower bracket 356 and the tank base second lower bracket 357 each have a through hole 358 (shown in dashed lines) sized to receive a fastener 450 (shown in dashed lines) such as a bolt or pin. The tank base first lower bracket 356 and tank base second lower bracket 357 have a thickness 359. The thickness 359 is thick enough to ensure that the brackets 356 and 357 can be connected to a dolly 400 as set forth more fully below.

A tank base first upper bracket 354 and a second tank base upper bracket 355 are rigidly attached to the tank base second bar 352 a fixed distance 360 apart from one another. The tank base first upper bracket 354 and the tank base second upper bracket 356 each have a through hole 358 (shown in dashed lines) sized to receive a fastener 450 (shown in dashed lines) such as a bolt or pin. The tank base first upper bracket 354 and second tank base upper bracket 355 each also has a thickness 359.

In a preferred embodiment, the fixed distance 360 between the first and second tank base lower brackets is identical to the fixed distance 360 between the first and second tank base upper brackets. However, these distances may vary depending on the corresponding of the spacing between brackets located on a removable dolly 400 as set forth more fully below, or on other design considerations.

In a preferred embodiment, the thickness 359 of the tank base first lower bracket 356 and second tank base lower bracket 357 is the same as the thickness 359 of the tank base first upper bracket 354 and the second tank base upper bracket 355. However, these thicknesses may also vary depending on the geometry of the brackets of the removable dolly 400 set forth below, or based on other design considerations.

Dolly

Figure 13:
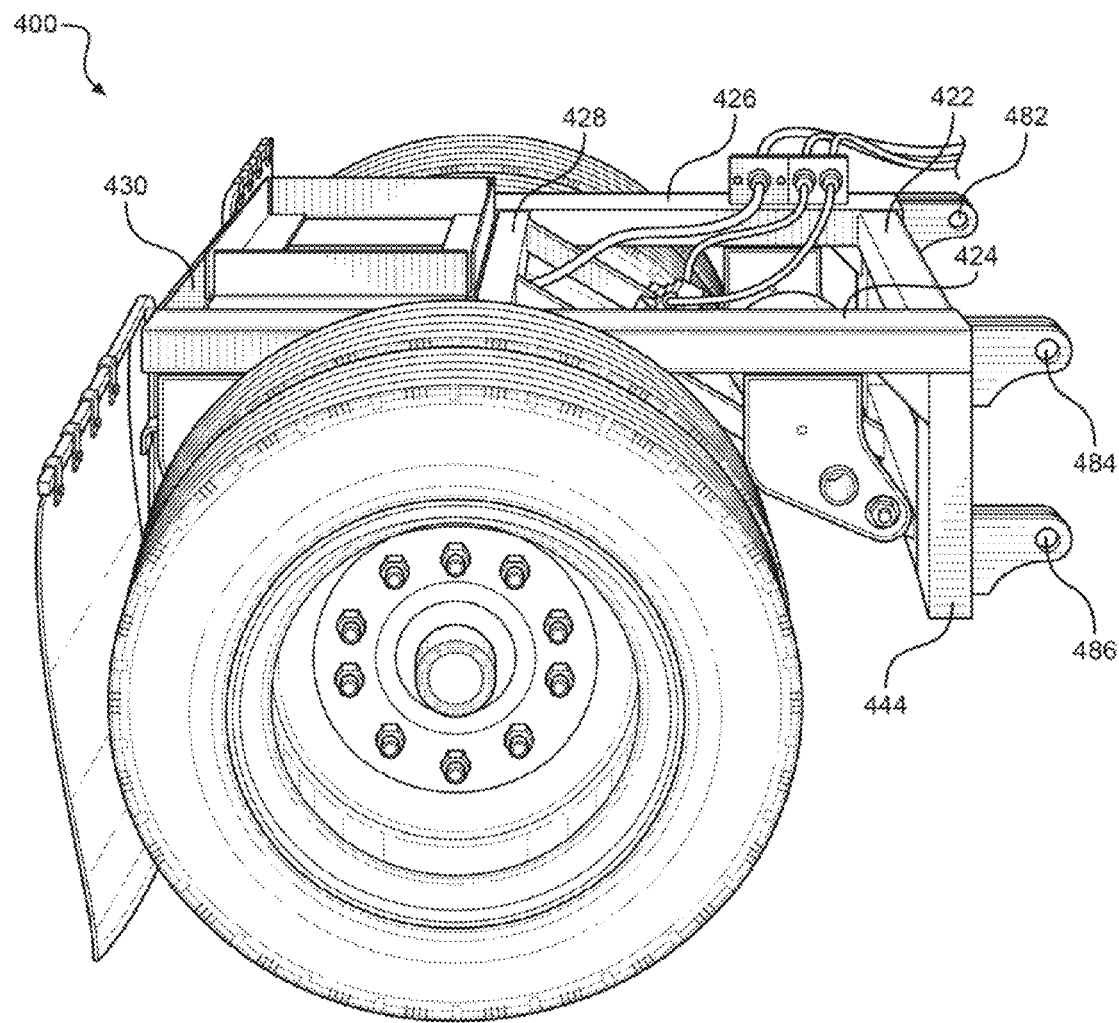
FIG. 13 is a side isometric view of the dolly showing the top frame, a tank connector frame, and reservoir frame.
Figures 1, 13:
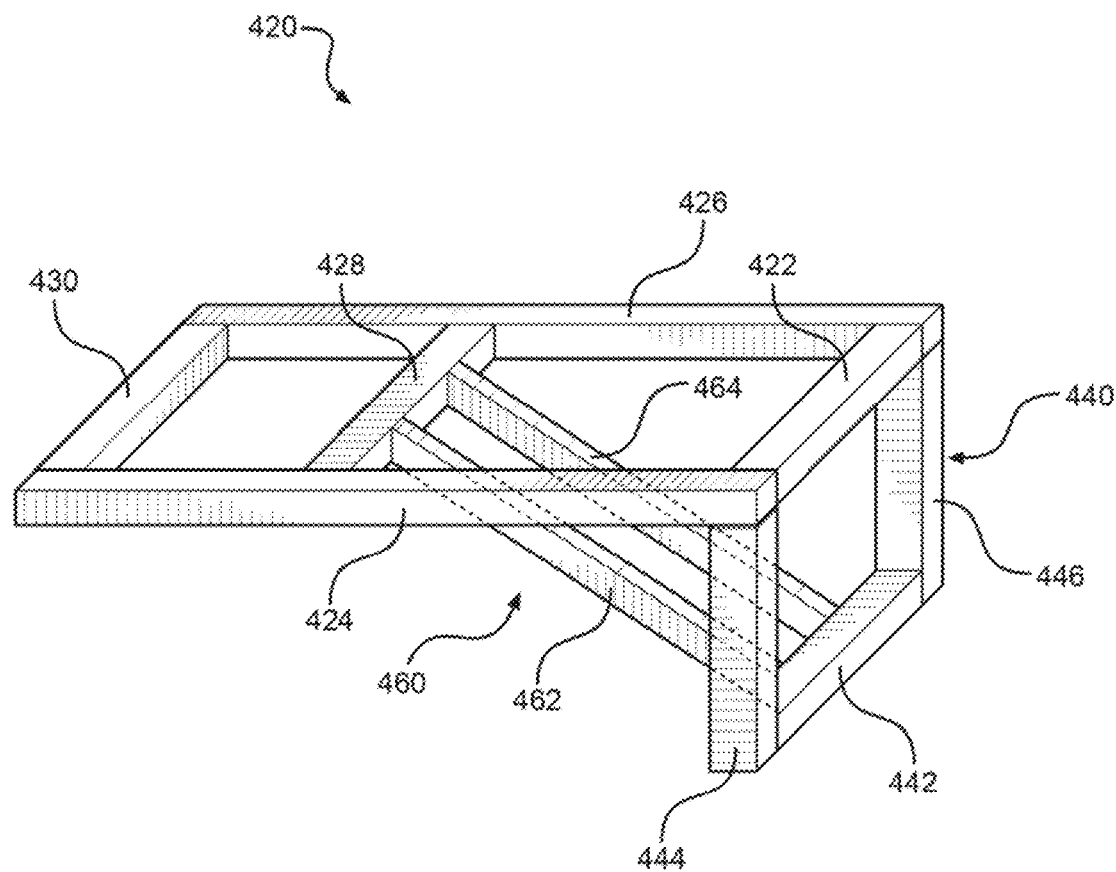

Referring next to FIG. 13, an isometric view of a dolly 400 is generally disclosed. In its most basic form, the dolly 400 consists of a chassis 410, axle 470, and at least one wheel 495 on each side of the axle 470 and a plurality of dolly brackets 480. The chassis 410 includes a top frame 420 and a tank connector frame 440. For increased rigidity, the dolly 400 can have a reservoir frame 460. In a preferred embodiment, the top frame 420 and tank connector frame 440 are made of square steel stock.

Referring next to FIG. 13-1, the dolly frame of dolly 400 is generally shown and made up of the top frame 420, tank connector frame 440, and reservoir frame 460. The top frame 420 is shown with an upper tank connector frame rail 422, a right side frame rail 424, a left side frame rail 426, a middle frame rail 428, and a rear frame rail 430. The upper tank connector frame rail 422, the right side frame rail 424, the left side frame rail 426, the middle frame rail 428, and the rear frame rail 430 each have a front, a back, a top, a bottom, and a first end and a second end.

The first end of the upper tank connector frame rail 422 is attached the back of the left side frame rail 426 such that the front of the upper tank connector frame rail 422 is flush with the first end of the left side frame rail 426. The second end of the upper tank connector frame rail 422 is attached the back of the right side frame rail 424 such that the front of the upper tank connector frame rail 422 is flush with the first end of the right side frame rail 424.

The first end of the middle frame rail 428 is attached to the back of the left side frame rail 426 approximately midway between the first end and the second end of the left side frame rail 426. The second end of the middle frame rail 428 is attached to the back of the right side frame rail 424 approximately midway between the first end and the second end of the right side frame rail 424.

The first end of the rear frame rail 430 is attached to the back of the left side frame rail 426 such the back of the rear frame rail 430 is flush with the second end of the left side frame rail 426. The second end of the rear frame rail 430 is attached to the back of the right side frame rail 424 such the back of the rear frame rail 430 is flush with the second end of the right side frame rail 424.

In a preferred embodiment, the upper tank connector frame rail 422, right side frame rail 424, left side frame rail 426, middle frame rail 428, and rear frame rail 430 are assembled together by the processes of welding to form a rigid top frame rail.

Tank Connector Frame

The tank connector frame 440 is comprised of the upper tank connector frame rail 422 of the top frame 420, a lower tank connector frame rail 442, a right tank connector frame rail 462 and a left tank connector frame rail 464. The upper tank connector frame rail 422, lower tank connector frame rail 442, right tank connector frame rail 444 and left tank connector frame rail 446 each have a front, a back, a top, a bottom, and first end and a second end.

The first end of the left tank connector frame rail 446 is attached to the bottom of the left side frame rail 426 such that the front of the left tank connector frame rail 446 is flush with the first end of the left side frame rail 426 and the front of the upper tank connector frame rail 422. The first end of the right tank connector frame rail 444 is attached to the bottom of the right side frame rail 424 such that the front of the right tank connector frame rail 462 is flush with the first end of the right side frame rail 424 and the front of the upper tank connector frame rail 422.

The first end of the lower tank connector frame rail 442 is attached to the bottom of the left tank connector frame rail 446 such that the front of the lower tank connector frame rail 442 is flush with the front of the left tank connector frame rail 446. The second end of the lower tank connector frame rail 442 is attached to the bottom of the right tank connector frame rail 444 such that the front of the lower tank connector frame rail 442 is flush with the front of the right tank connector frame rail 444.

In a preferred embodiment, the upper tank connector frame rail 422, lower tank connector frame rail 442, right tank connector frame rail 444 and left tank connector frame rail 446 are assembled together by the processes of welding to form a rigid tank connector frame rail.

Reservoir Frame

In a preferred embodiment, the dolly chassis is completed by the addition includes a reservoir frame 460 made up of a first reservoir frame member 462 and a second reservoir frame member 464. The first reservoir frame member 462 and the second reservoir frame member 464 have a front, a back, a top, a bottom and a first end and a second end. The first ends of the first and second reservoir frame members 462 and 464 are attached to the front of the middle frame rail 428 of the top frame 420. The second ends of the first and second reservoir frame members 462 and 464 are attached to the back of the lower tank connector frame rail 442 of the tank connector frame 440.

The first and second reservoir frame members 462 and 464 also reinforce the dolly chassis 410 by ensuring that the tank connector frame 440 is braced against top frame 420 through the reservoir frame 460.

Brackets

Figure 14:
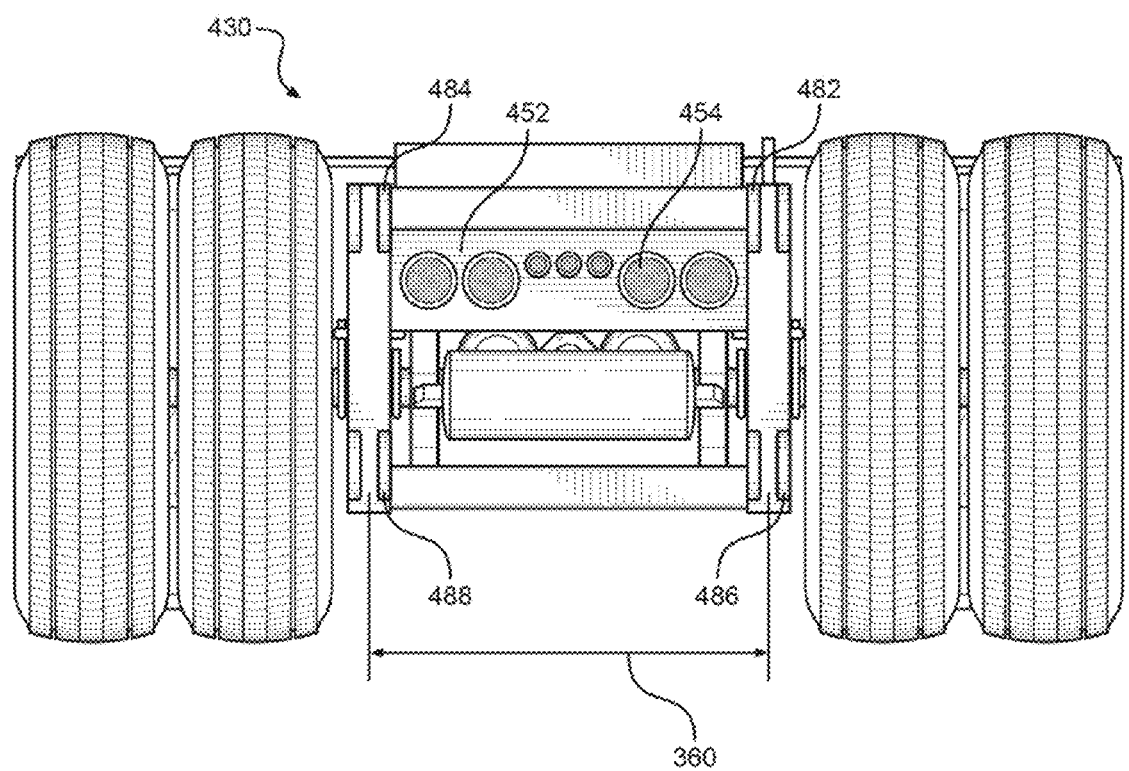
FIG. 14 is a front view of the dolly showing the air brake reservoir and rear-facing light assembly, along with the dolly upper brackets and dolly lower brackets.
Figures 1, 14:
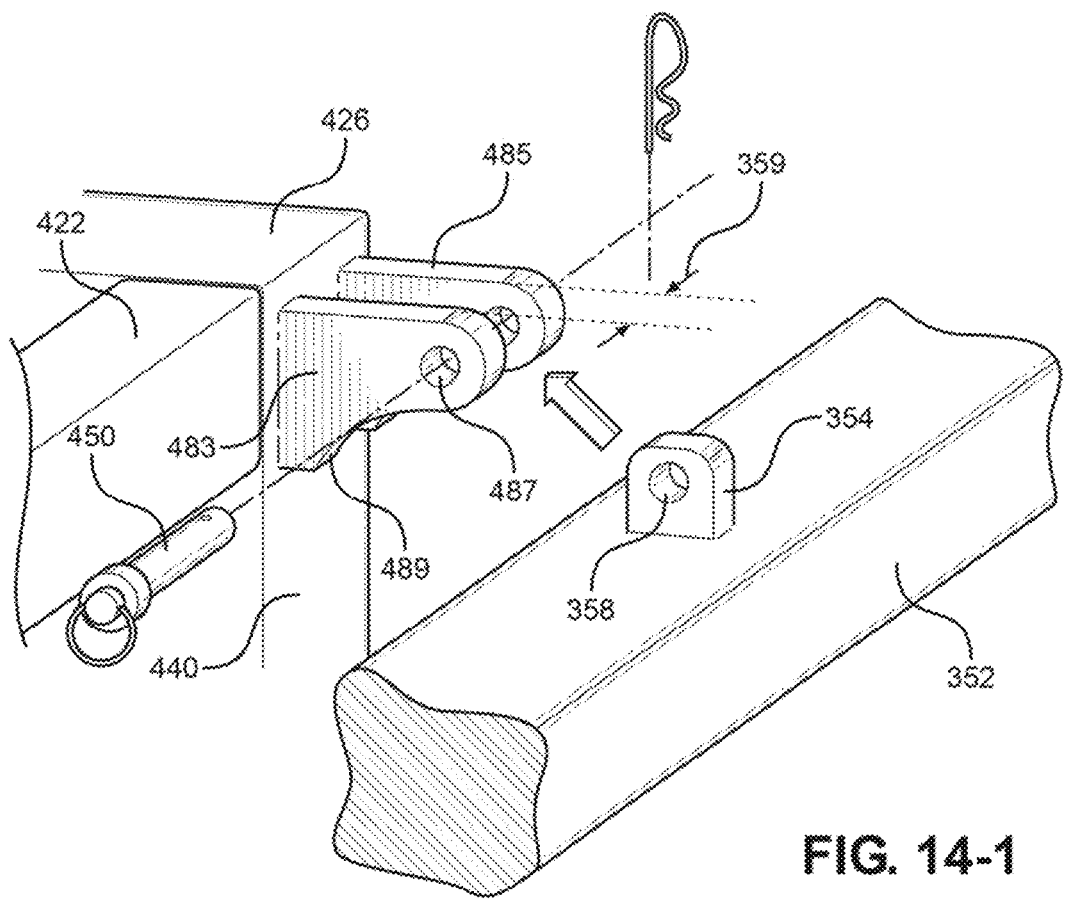
Figures 2, 14:
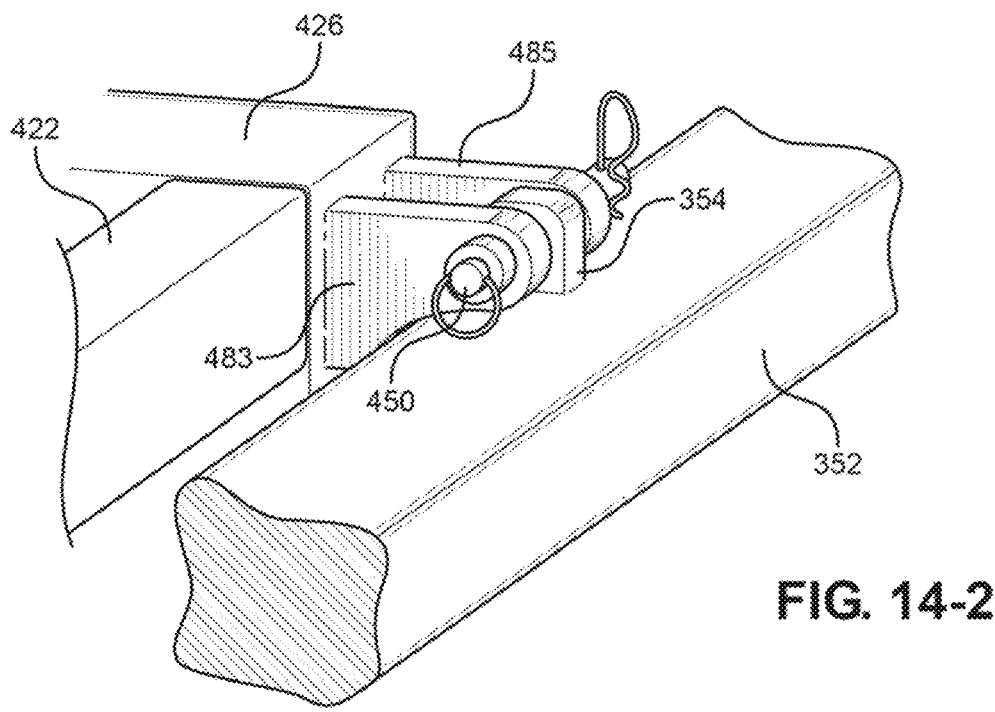
Figures 3, 14:
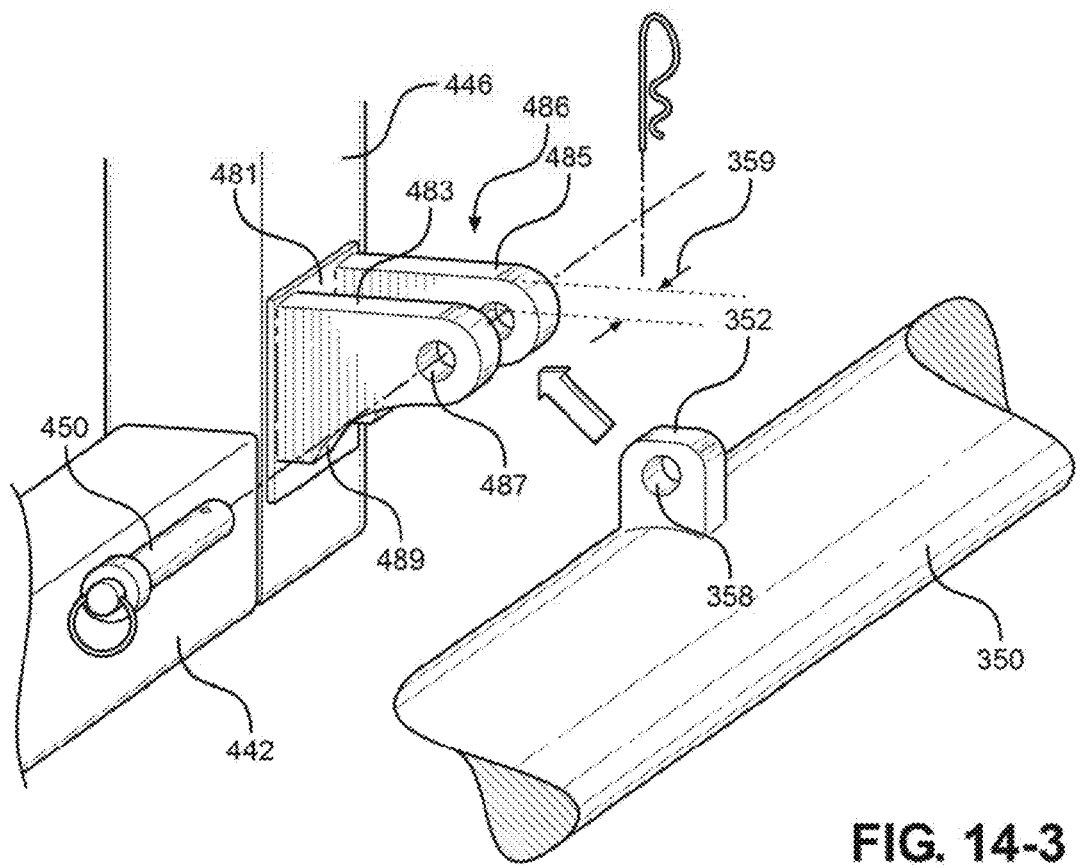
Figures 4, 14:
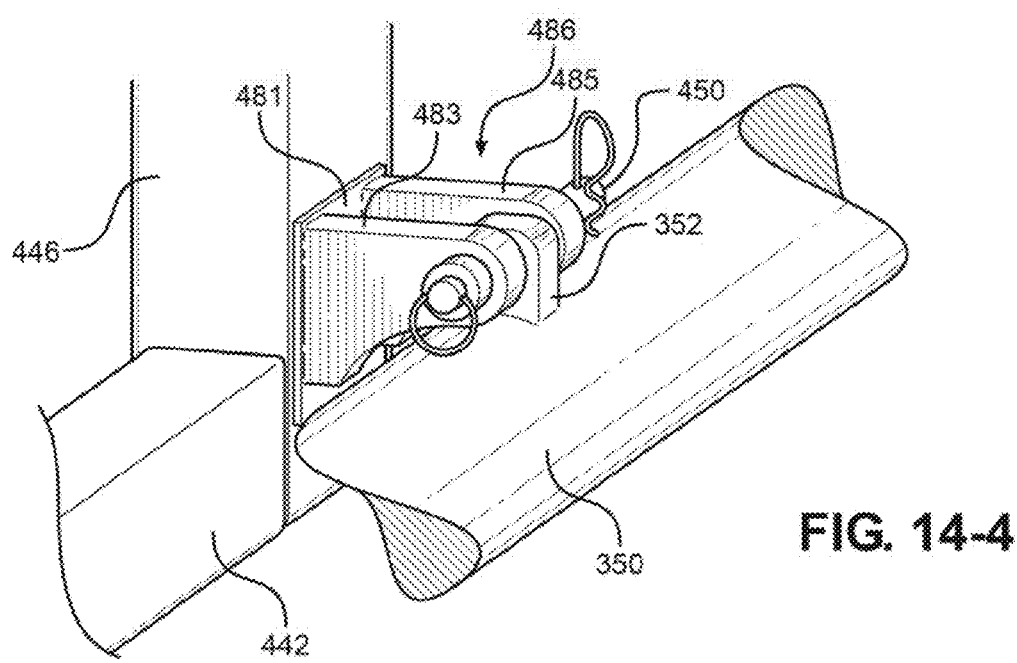

Referring next to FIG. 14, a front view of the dolly 400 is generally shown and described with a plurality of dolly brackets 480. In a preferred embodiment, the dolly brackets 480 consist of a first upper dolly bracket 482, a second upper dolly bracket 484, a first lower dolly bracket 486 and a second lower dolly bracket 488. A first dolly upper bracket 482 is attached to the first edge of the left frame rail 426 and part of the front of the left tank connector frame rail 446 of the tank connector frame 440 of the dolly chassis 410. A second dolly upper bracket 484 is attached to the first edge of the right frame rail 424 and part of the front of the right tank connector frame rail 444 of the tank connector frame 440 of the dolly chassis 410. Also shown in FIG. 14 are a signal light support plate 452 housing signal lights 454. The front signal light support plate is mounted on the back of the upper tank connector frame rail 422, right tank connector frame rail 444 and left tank connector frame rail 446.

As can be seen in FIG. 14-1, the first and second dolly upper brackets 482 and 484 have a first plate 483 and a second plate 485 separated by a distance corresponding to the tank base bracket thickness 359 of the tank base first upper bracket 354 and the tank base second upper bracket 355 respectively. The first dolly upper bracket 482 and second dolly upper bracket 484 each have a curved surface 489 designed to rest flush on the tank base second bar 352 of a tank. The first and second dolly upper brackets 482 and 484 each have a through hole 487 sized to receive a fastener 450 such as a bolt or pin. In a preferred embodiment, the first and second dolly upper brackets 482 and 484 are connected to the dolly by welds.

As can be seen in FIGS. 14-1 and 14-2, the dolly 400 contemplated in the present invention can be attached to a vertical tank 300 by slidably inserting the first plate 483 and second plate 485 of the first and second upper dolly brackets 482 and 484 over first and second tank base upper brackets 354 and 355 respectively such that the through holes 358 of the tank base upper brackets 354 and 355 are each aligned with the through holes 487 of the first plates 483 and second plates 485 of the first and second upper dolly brackets 482 and 484. The curved surface 489 then rests flush on the surface of the tank base second bar 352, and secured with fastener 450 and secured in place with retaining clip 451.

As can be seen in FIG. 14-3, a first dolly lower bracket 486 is attached to the front of the left tank connector frame rail 446 adjacent the front of the lower tank connector frame rail 442. A second dolly lower bracket 488 is attached to the front of the right tank connector frame rail 444 adjacent the lower tank connector frame rail 442. The first and second dolly lower brackets 486 and 488 have a first plate 483 and a second plate 485. The first plate 483 and the second plate 485 of the dolly lower brackets are separated by a distance 359 corresponding to the thickness of the tank base first lower bracket 356 and the tank base second lower bracket 357 respectively. For additional strength, in an alternative embodiment, the first plate 483 and second plate 485 have a support plate 481 rigidly connecting the first plate 483 and second plate 485 together. The first dolly lower bracket and the second dolly lower bracket each have a curved surface 489 to rest on the tank base first bar 350 of a tank. The first and second dolly lower brackets 486 and 488 each have a through hole 487 sized to receive a fastener 450 such as a bolt or pin. In a preferred embodiment the first and second doily upper brackets 486 and 488 are connected to the dolly by welds.

As can be seen in FIGS. 14-3 and 14-4, the dolly 400 contemplated in the present invention can be further attached to vertical tank 300 by slidably inserting the first plate 483 and second plate 485 of the first and second lower dolly brackets 486 and 488 over first and second tank base lower brackets 356 and 357 respectively such that the through holes 358 of the tank base lower brackets 356 and 357 are each aligned with the through holes 487 of the first plates 483 and second plates 485 of the first and second lower dolly brackets 486 and 488. The curved surface 489 then rests flush on the surface of the tank base first bar 350.

Boom Lift Guides

Figure 15:
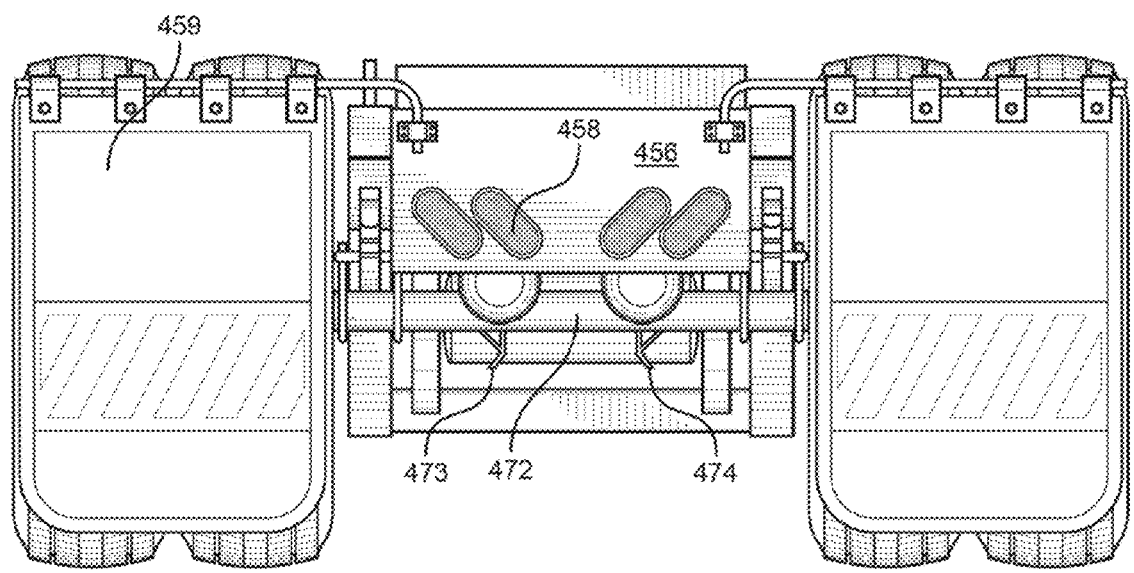
FIG. 15 is a rear view of the dolly chassis showing axle with left and right boom guides, mud flaps extending over the wheels and rear signal lights extending housed in a rear signal light support plate.

Referring to FIG. 15, a rear view of the dolly is shown. Mounted to the bottom of the axle housing 472 is a boom guide made up of a right boom guide 474 and a left boom guide 473. As set forth more fully below, the left and right boom guides 473 and 474 help facilitate the centering of the extendable boom lift 285 underneath the dolly 400 for purposes of transporting the dolly 400 without a tank 300 and prevents the dolly 400 from shifting during transport.

Also shown in FIG. 15 are a rear signal support plate 456 mounted to the rear frame rail 430 (not shown). The rear signal support plate 456 houses rear signal lights 458. Mud flap bars 457 also extend from the rear signal support plate 456. Mud flaps 459 hang from the mid flap bars 457.

Brakes

Figure 16:
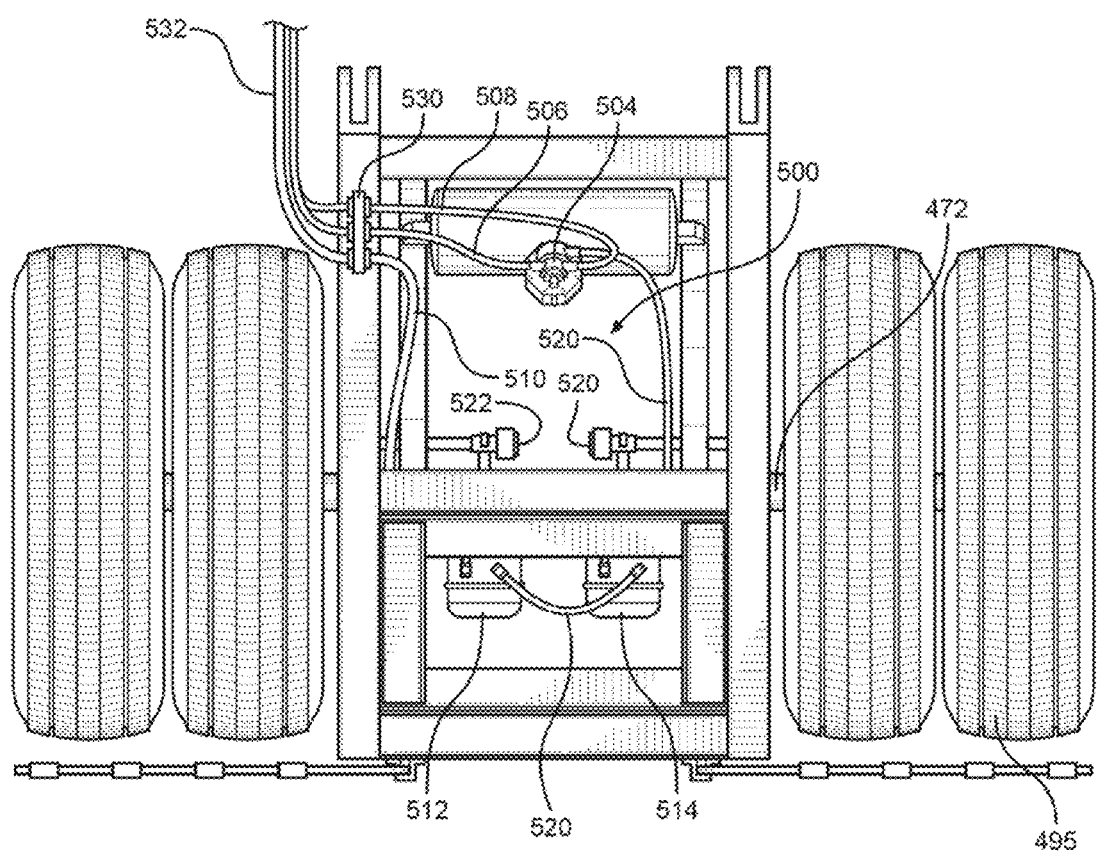
FIG. 16 is a top view of the dolly chassis showing the upper frame and wheel pairs, the air brake drums, air relay, supply line, control line, signal line and air line used to connect the air brakes and lights to the truck.

Referring now to FIG. 16, a top view of the dolly 400 is generally shown. Air brakes are commonly used in large semi-tractor trailer truck rigs. In the present invention, it is advantageous to utilize an air brake system on the dolly 400 because of the weight of the tank 300 itself. It is common for semi-tractor trucks to be equipped with air brakes and to have service lines connecting compressed air to an air brake system for the trailer. Therefore, in a preferred embodiment, the dolly 400 is equipped with an air brake system 500 comprising an air reservoir 502, an air relay 504, a supply line 506, a control line 508, a left brake chamber 512 and a right brake chamber 514, and a left air brake 516 (not show) and a right air brake 518 (not shown). Compressed air is delivered from the supply line 506 and control line 508 to the air relay 504. From the air relay 504, compressed air is delivered to the air reservoir 502 and to the left and right brake chambers 512 and 514 when needed. The air relay 504 is mounted to the air reservoir 502, which in turn is mounted on the first and second reservoir frame members 462 and 464. The air relay 504 is connected by air hoses 520 to the left and right brake chambers 512 and 514.

The left and right air brakes 516 and 518 are applied when the left and right brake chambers 512 and 514 are void of compressed air. In the absence of compressed air, springs housed within the left and right brake chambers 512 and 514 act on push rods 520 and 522, which in turn act on the left and right brakes, respectively.

When the dolly 400 is connected to a tank 300 in order to transport the tank 300, utility lines 532 run from the rear service panel 295 of the removable lift system 200 to the dolly service line panel 530.

When the parking brake is released by the operator of the truck, compressed air is delivered through the supply line 506 to the relay 504, which in turn releases pressurized air from the air reservoir 502 to the left and right brake chambers 512 and 514, pressurizing the chambers and compressing the springs thereby moving the pushrods 522 away from the left and right brakes 516 and 518 causing the brakes to disengage allowing the wheels to rotate freely.

In order to apply the brakes during use, compressed air is delivered through the control line 508 to the relay 504, which in turn causes compressed air to be slowly released from the left and right brake chambers 512 and 514, thereby allowing the springs to act on the pushrods 522, which in turn cause the left and right air brakes 516 and 518 to slowly engage, causing the brakes 516 and 518 to be applied to reduce the wheel 495 rotation speed.

There are a variety of brake systems known in the art for semi-tractor trailer rigs. The braking system disclosed herein is only one such set up for an air brake trailer system and other systems are contemplated without departing from the spirit and scope of the present invention.

Suspension

Figure 17:
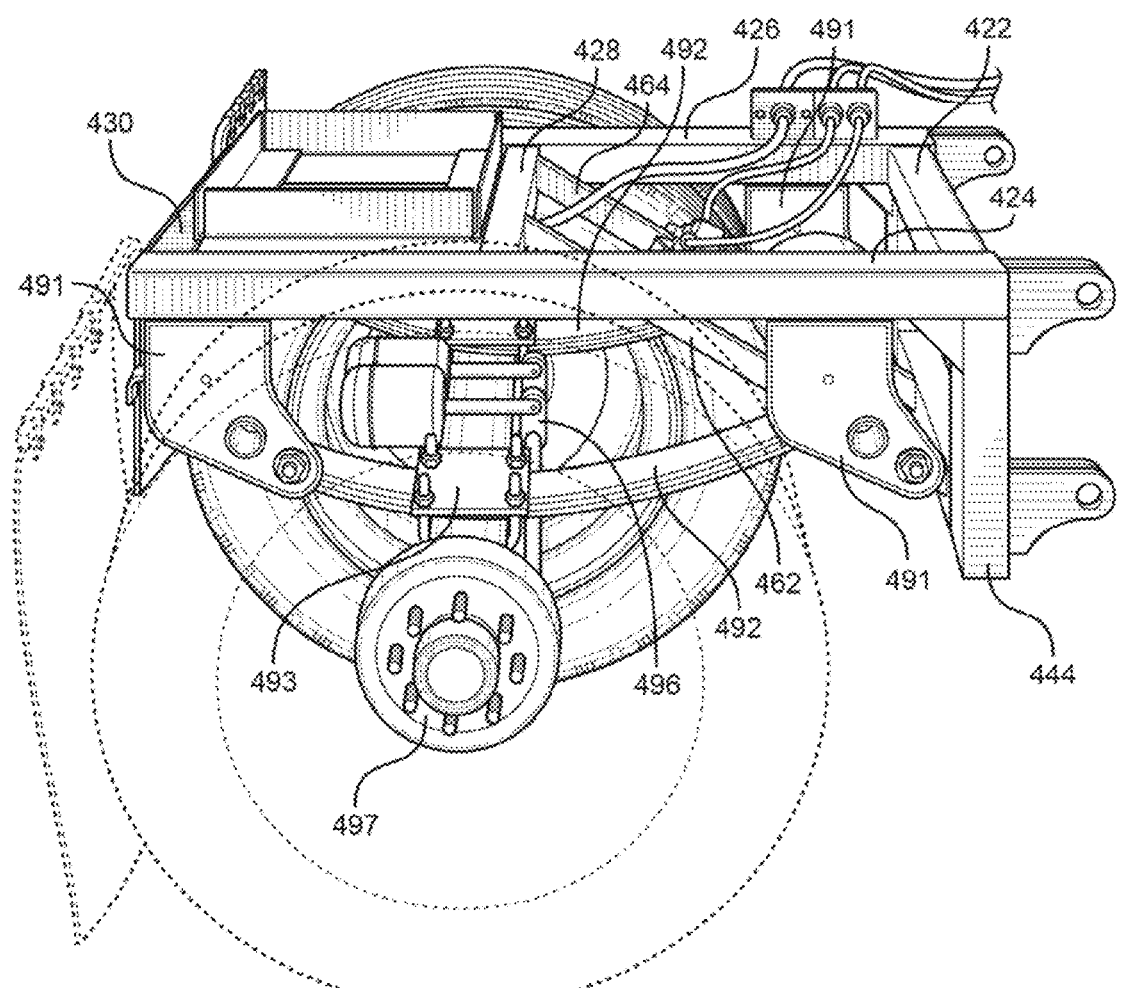
FIG. 17 is an isometric view of the dolly, with the tires removed for clarity, and showing the axle supported by a leaf spring assembly, and the top frame, tank connector frame, and reservoir frame, and the air brake drums, air relay, supply line, control line, signal line and air line used to connect the air brakes and lights to the truck.

Referring to FIG. 17, a plurality of suspension brackets are shown mounted on the bottom of the left and right frame rails. Leaf spring suspensions 492 are mounted on the suspension brackets 491 on the left and right frame rails 426 and 424. The axle housing 472 is mounted directly to the leaf spring suspension 492 by way of axle brackets 493. Within the axle housing 472 is a rotating axle 470 terminating in a left wheel hub 496 and a right wheel hub 497. Enclosed within the left and right wheel hubs 496 and 497 are the left and right air brakes 516 and 518 and the left and right wheels 495.

The use of leaf spring suspension in the preferred embodiment is not meant to be limiting and various other vehicle suspensions are considered without departing from the scope and spirit of the present invention. The use of a spring and shocks suspension, air bag suspension, or any other type, of suspension system known in the art is contemplated.

Method of Removing Dolly from Tank Using Removable Lift System

Figure 18A:
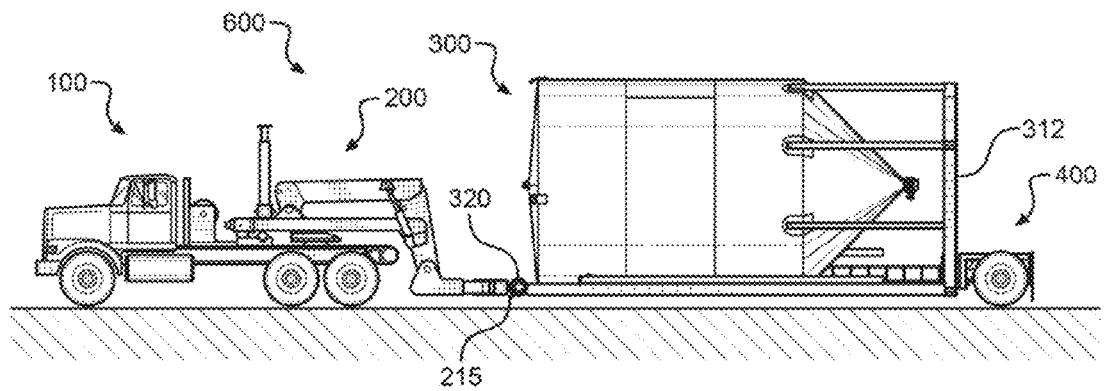
FIGS. 18A-18F shows the method to travel with a vertical tank, deliver the tank to a location, and to remove an attached dolly from the tank.

FIGS. 18A-18F shows the method of removing an attached dolly 400 from a tank 300 using the removable lift system 200. FIG. 18A depicts a semi-tractor truck 100 transporting a tank 300 using the industrial tank transport system of the present invention. As can be seen in FIG. 18, the dolly 400 is attached to the base frame 312 of the tank 300 and the removable lift system 200 is attached to the semi-tractor truck 100 via the fifth wheel 158 and to the tank lifting bar 320 of the tank via the tank grapplers 215, thereby creating the industrial tank transport system, able to transport a tank 300 without a trailer. As can be seen in FIG. 18A, the tank 300 is oriented in a transport position 600 such that the sled frame 314 of the tank 300 is generally parallel to and above the ground. The transport position 600 allows sufficient clearance 603 between the sled frame 314 and the ground 30 to allow the semi-tractor truck 100 to transport the tank 300 using the dolly 200 and removable lift system 200 on roads and highways. Once in the transportation position, the removable lift system 200, tank 300 and dolly 400 are effectively converted into a functional semi-tractor trailer where the tank 300 has a height 611 from the ground 30 In an embodiment, a tank 300 is sized to maximize the height 611 to just under maximum clearance limits of major roadways.

Upon arriving at a work site, the semi-tractor truck 100 with attached tank 300 is driven to where the tank 300 is to be located. Once at the desired location, the semi-tractor truck 100 backs up the tank 300 to the location.

Figure 18B:
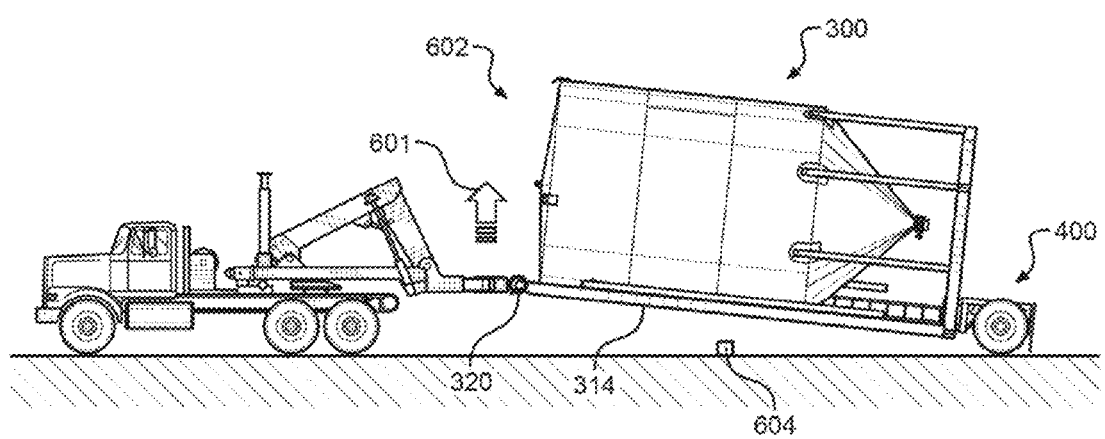

As can be seen in FIG. 18B, the removable lift system 200 then lifts the tank 300 in an upward direction 601 from the transport position 600 to a first inclined position 602. After the tank 300 has been lifted to the first inclined position 602, the sufficient clearance 603 is increased to a second sufficient clearance 607 in order to allow a pivot block 604 to be placed directly under the sled frame 314 of the tank 300.

Figure 18C:
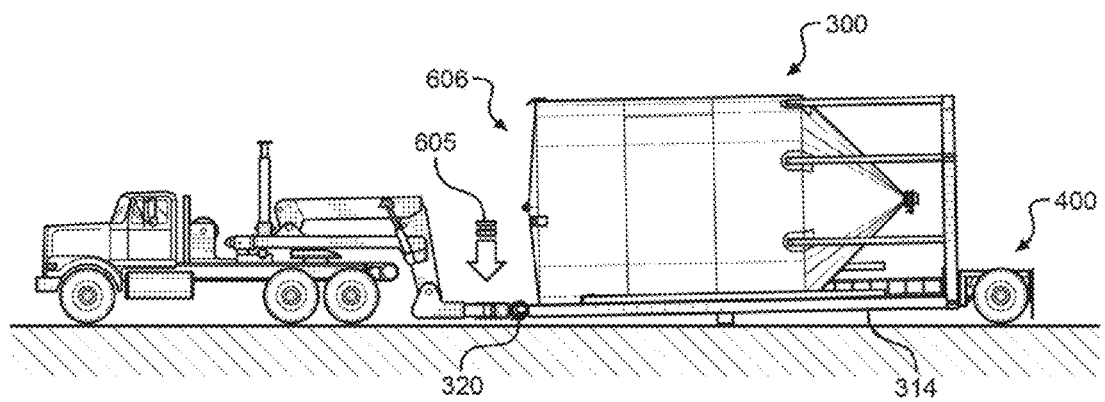

As can be seen in FIG. 18C, the tank 300 is then lowered in direction 605 from the first inclined position 602 to the first declined position 606 such that the tank 300 rotates about the pivot block 604 and the weight of the tank 300 rests on the pivot block 604 instead of the fasteners 450 connecting the dolly brackets 482, 484, 486 and 488 to the tank brackets 354, 355, 356 and 357 respectively. In the first declined position 606, the vertical lift bar 320 is near the ground and the base of the tank 300 and the attached dolly 400 is in contact with the ground such that the first and second dolly lower brackets 486 and 488 secured to the tank base first and second lower brackets 356 and 357 with fasteners 450 is easily removed to disengage the first and second dolly lower brackets 486 and 488 from the tank base first and second lower brackets 356 and 357.

Figure 18D:
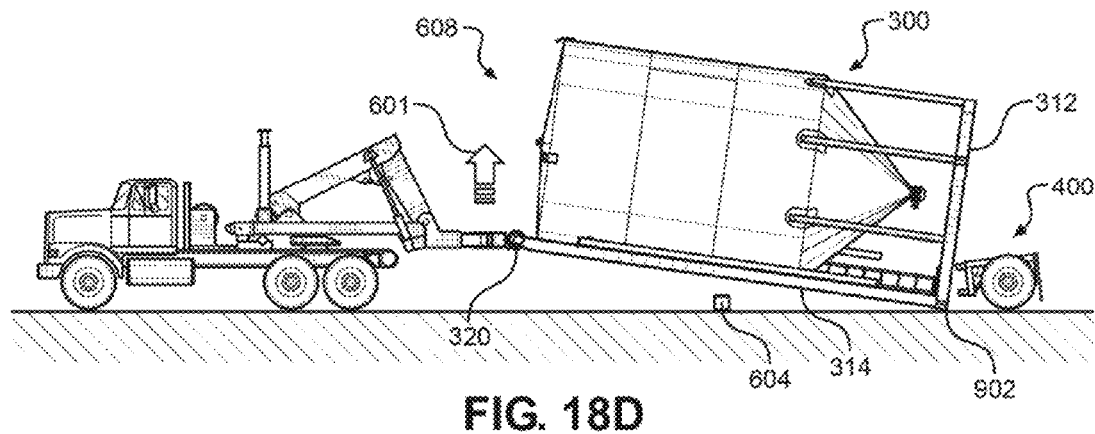

As can be seen in FIG. 18D, after removing the fasteners 450 securing the first and second dolly lower brackets 486 and 488 to the tank base first and second lower brackets 356 and 357, the tank 300 is raised in direction 601 by the removable lift system 200 to a second inclined position 608 which is reached when the tank base 312 is in contact with the ground at a point of contact 912. As the tank base moves towards the ground, the first and second dolly lower brackets 486 and 488 disengage and separate from the tank base first and second lower brackets 356 and 357.

Figure 18E:
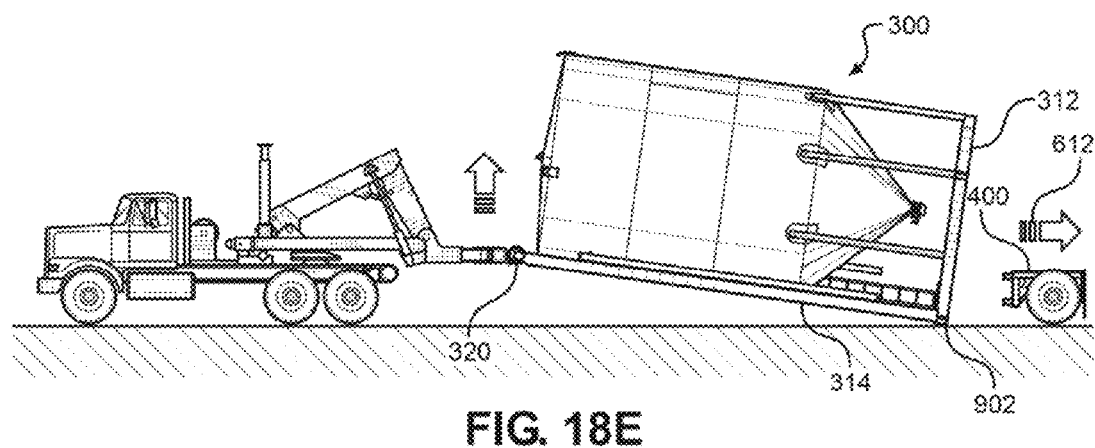

As can be seen in FIG. 18E, once the tank base is in contact with the ground, the fasteners 450 attaching the first and second dolly upper brackets 482 and 484 to the tank base first and second upper brackets 354 and 355 are easily removed. Removing the fasteners 450 from the first and second dolly upper brackets 482 and 484 and the tank base first and second upper brackets 354 and 355 allows the dolly 400 to completely detach from the tank 300. The dolly 400 is then manually rolled away from the tank 300 in an away direction 612 and the pivot block 604 is removed.

Figure 18F:
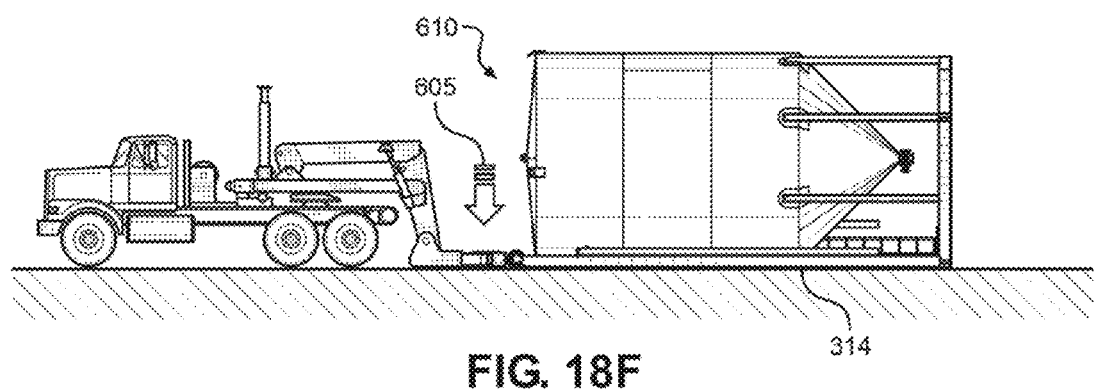

Finally, as can be seen in FIG. 18F, after the dolly is removed from the tank 300, the tank 300 is lowered by the removable lift system 200 to a resting position 610 such that the sled frame 314 of the tank 300 rests on the ground.

Figure 19A:
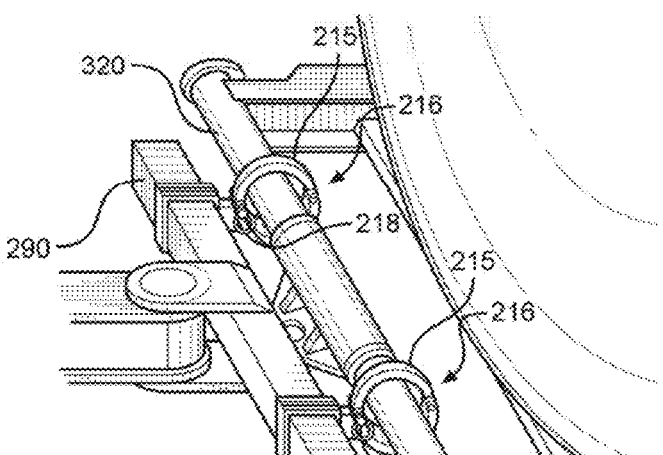
FIG. 19A-19C shows the method to remove the vertical tank from the removable lift system by opening the tank grapplers and moving the lifting assembly away from the tank.
Figure 19B:
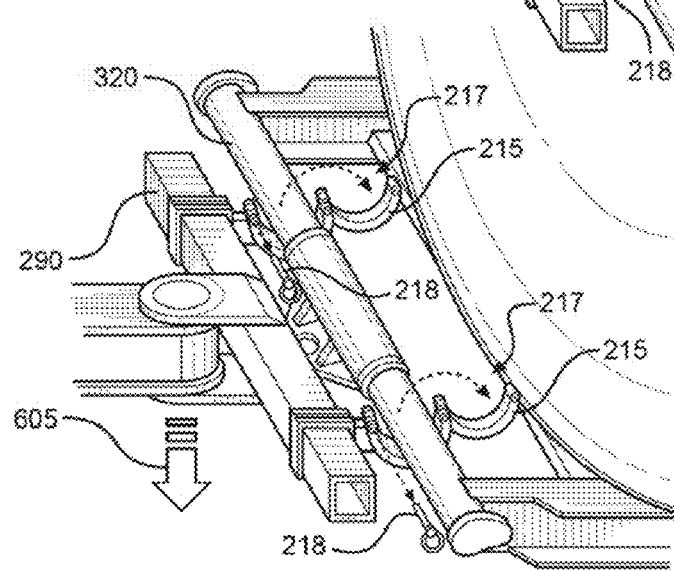
Figure 19C:
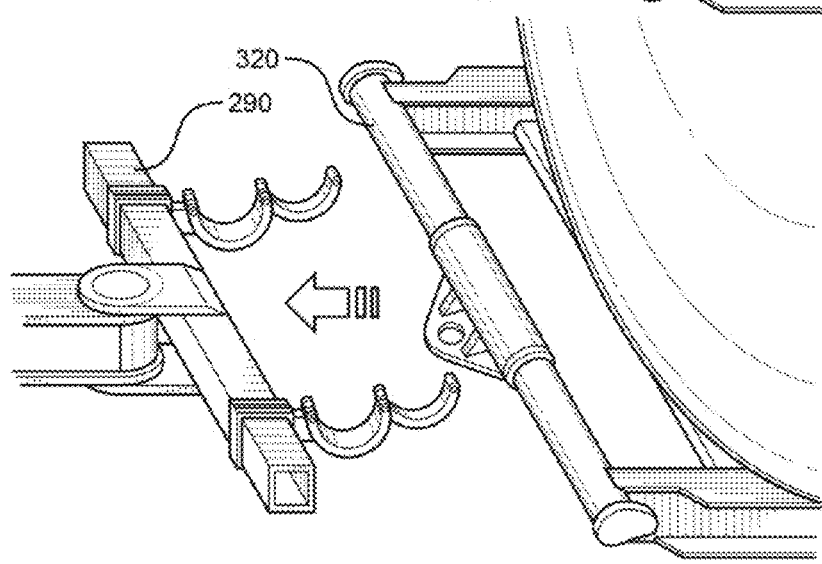

As can be seen in FIGS. 19A through 19C, the tank grapplers 215 are then detached from the tank lifting bar 320 of the tank 300. FIG. 19A shows tank grapplers 215 in the closed position 216 and held in place by grappler fasteners 218. It is appreciated that grappler fasteners 218 can be any fasteners known in the art such as pins or bolts.

As next seen in FIG. 19B, grappler fasteners 218 are removed from the tank grapplers 215. Next, the grapplers 215 are moved from a closed position 216 to an open position 217. This allows the transverse lifting bar 290 to be moved downward in direction 605.

Finally, as can be seen in FIGS. 19B and 19C, the transverse lifting bar 290 of the removable lift system 200 is then lowered in a downward direction 605 and then moved away in a retract direction 614 from the tank lifting bar 320 of the tank 300. Once complete, the semi-tractor truck 100 and removable lift system 200 are completely detached from the tank 300 and the tank 300 is ready to be lifted into a vertical position.

Method of Mounting the Dolly to the Removable Lift System for Transportation

Figure 20A:
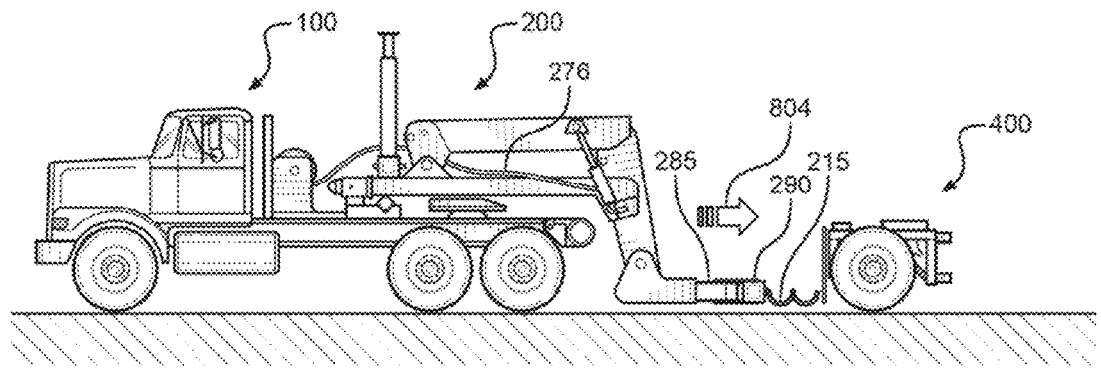
FIG. 20A-20C shows the dolly being installed on the removable lift system for storage and transport.
Figure 20B:
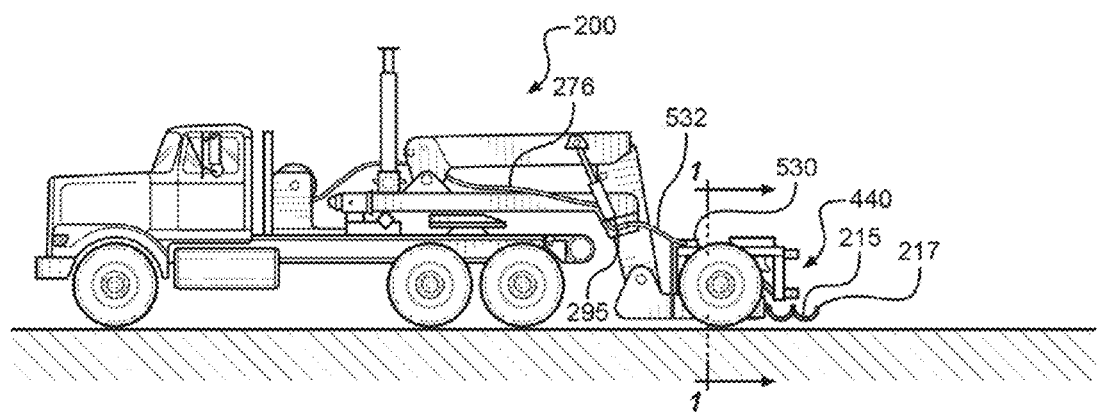
Figure 20C:
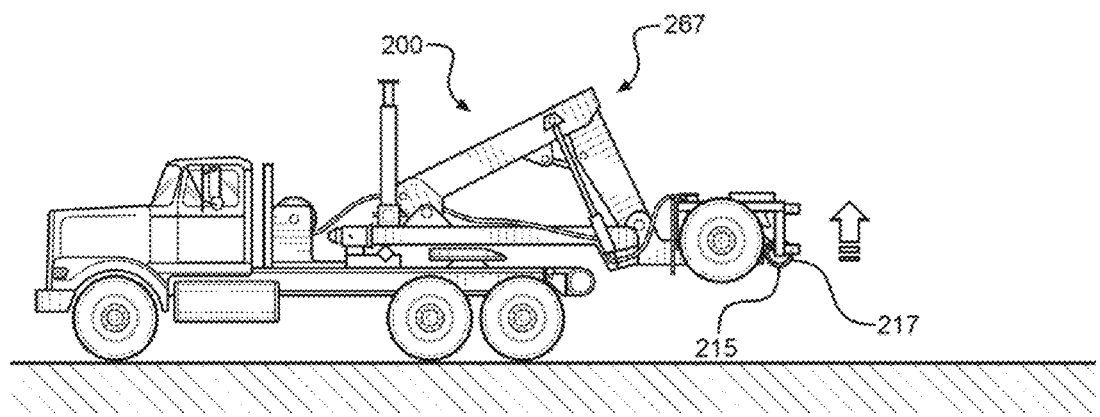

FIGS. 20A-20C depicts the method of mounting the dolly 400 to the removable lift system 200 for transport.

After the tank 300 is detached from the dolly 400 and the removable lift system 200, the dolly 400 and the removable lift system 200 are not needed to lift the vertical tank from a horizontal position 900 to a vertical position 902. If another lifting device is on site to lift the tank 300, then the dolly 400 simply needs to be mounted to the removable lift system 200 for transport. First, as seen in FIG. 20A the truck 100 moves in a reverse direction 804 with the tank grapplers 215 of the removable lift system 200 in the open position 217. As can be seen in FIG. 20A, the lifting device has a utility lines 532 that include a service line supply line 274, a control line 275 and a signal line 276 running from the front service panel 270 (not visible from view) to a rear service panel 295.

Figure 20D:
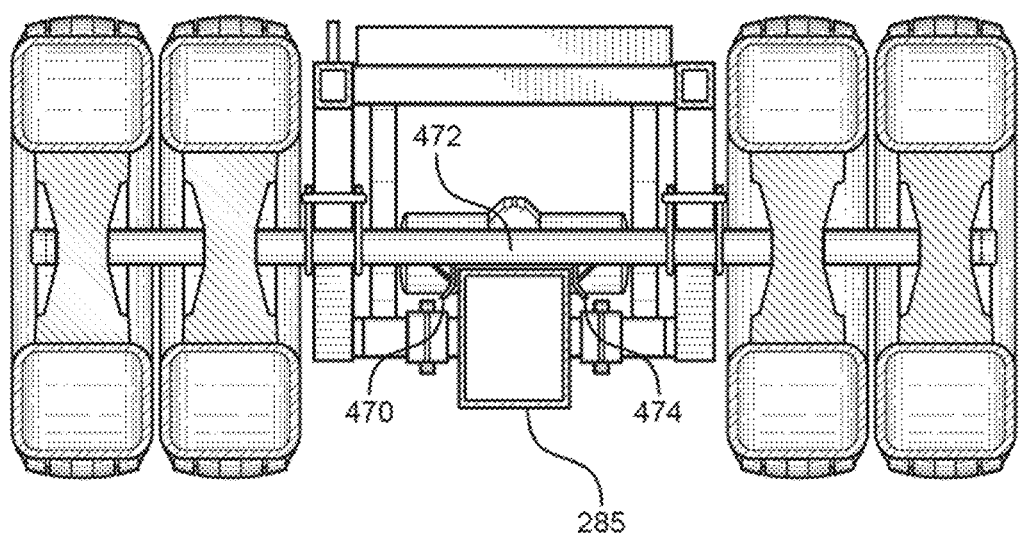
FIG. 20D is a cross section of the dolly installed on the removable lift system showing the left and right boom guides aligning and centering the dolly on the boom lift extendable arm.

Next, as seen in FIG. 20B, the transverse lifting bar 290 is extended underneath the dolly 400 by the extendable boom lift 285 of the removable lift system 200 with the tank grapplers 215 in the open position 217 until the tank grapplers 215 are directly underneath the tank connector frame 440 of the dolly 400. First cross section taken along the lines 1-1 in FIG. 20B can be seen in FIG. 20D. In FIG. 20D, the extendable boom lift 285 is guided by the left and right boom guides 473 and 474 such that the extendable boom lift 285 will be centered on the axle housing 472 of the dolly 400.

A supply line 532 can be connected between the dolly service line panel 530 and the rear service panel 295 of the lifting device 200 such that the front signal lights 454 of the dolly are operational.

As seen in FIG. 20C, the tank grapplers 215 are then moved from the open position 217 to the closed position 216 such that the tank grapplers 215 secure the lower tank connector frame rail 444 of the tank connector frame 440 of the dolly 400. The tank grapplers 215 and the left and right boom guides 473 and 474 serve to securely connect the dolly 400 to the removable lift system 200 and allow for transport. Finally, the doily 400 then can be raised in direction 601 by the removable lift system 200 to transportation position 267 such that the dolly 400 can be transported.

Method of Removing the Removable Lift System from the Semi-Tractor Truck

FIGS. 21A through 21H generally depict the method of removing the removable lift system 200 form the semi-tractor truck 100.

Figure 21A:
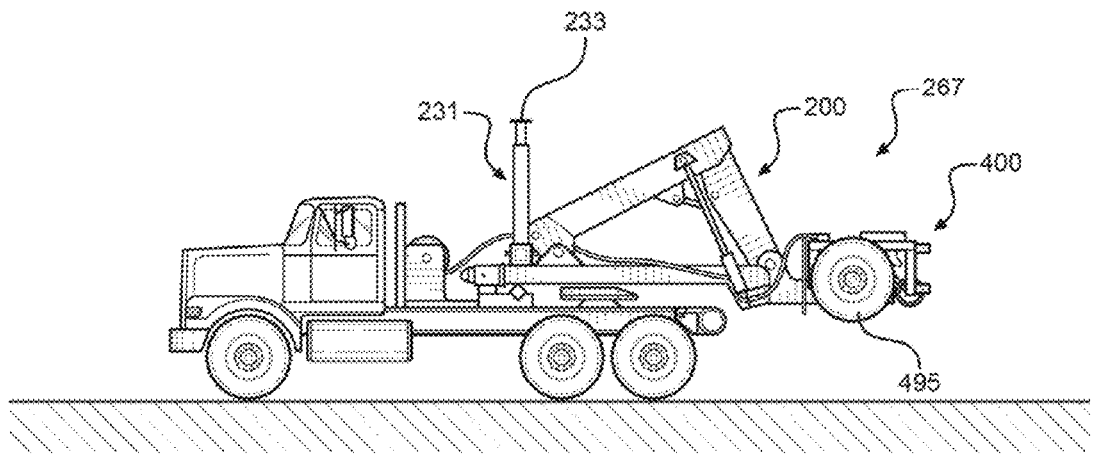
FIGS. 21A-21H shows the removable lift system configured in the stored position and being removed from the winch truck by installing left and right stands to extend downwards to the ground, lifting the boom arms, disengaging the fifth wheel, and then the truck driving off with the removable lift system detached.
Figure 21B:
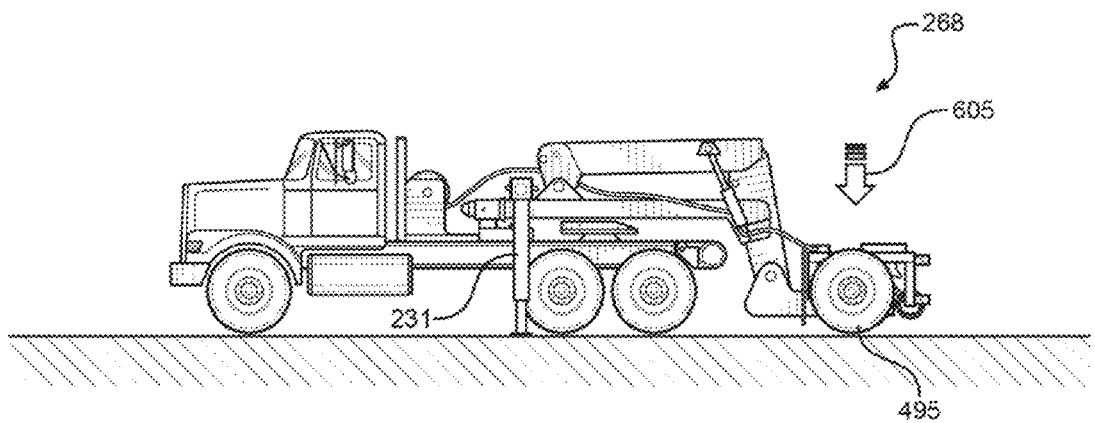

FIG. 21A depicts the removable lift system 200 in a transportation position 267. First, the removable lift system 200 needs to be configured from a transportation position 267 to a storage position 268. As depicted in FIG. 21B, the dolly 400 is lowered in a downward direction 605 by the removable lift system 200 until the wheels 495 of the dolly 400 are in contact with the ground.

Figure 21C:
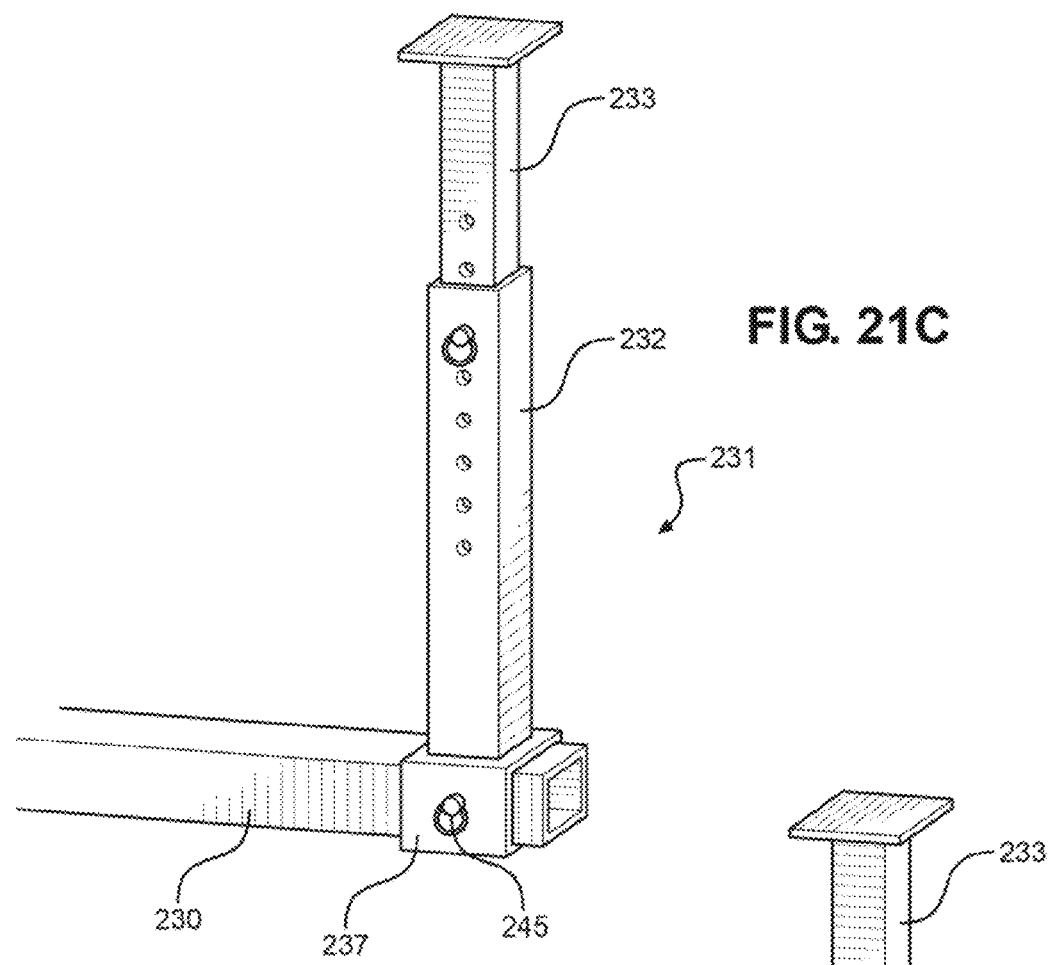
Figure 21D:
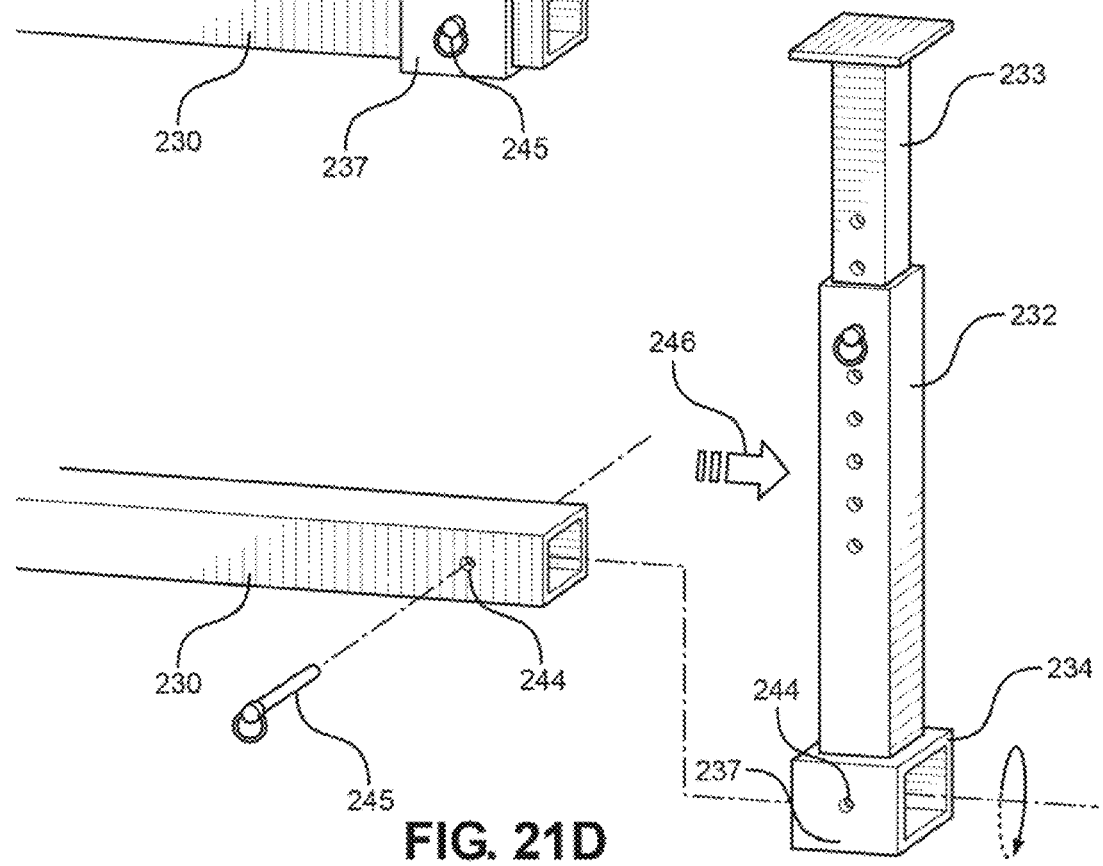

Next, the boom lift stands 231 are reconfigured such that the boom lift stand feet 233 are in contact with the ground. As depicted in FIG. 21C, the process for configuring the boom lift stands 231 from the transportation position 267 to the storage position 268 is shown in greater detail. In the transportation position 267, the adjustable boom lift stand foot 233 faces upwards. In the storage position 268, the adjustable boom lift stand foot 233 is adjusted toward the ground such that when the removable lift system 200 is removed from the semi-truck 100, the adjustable boom lift stand foot 233 will rest on the ground.

Figure 21E:
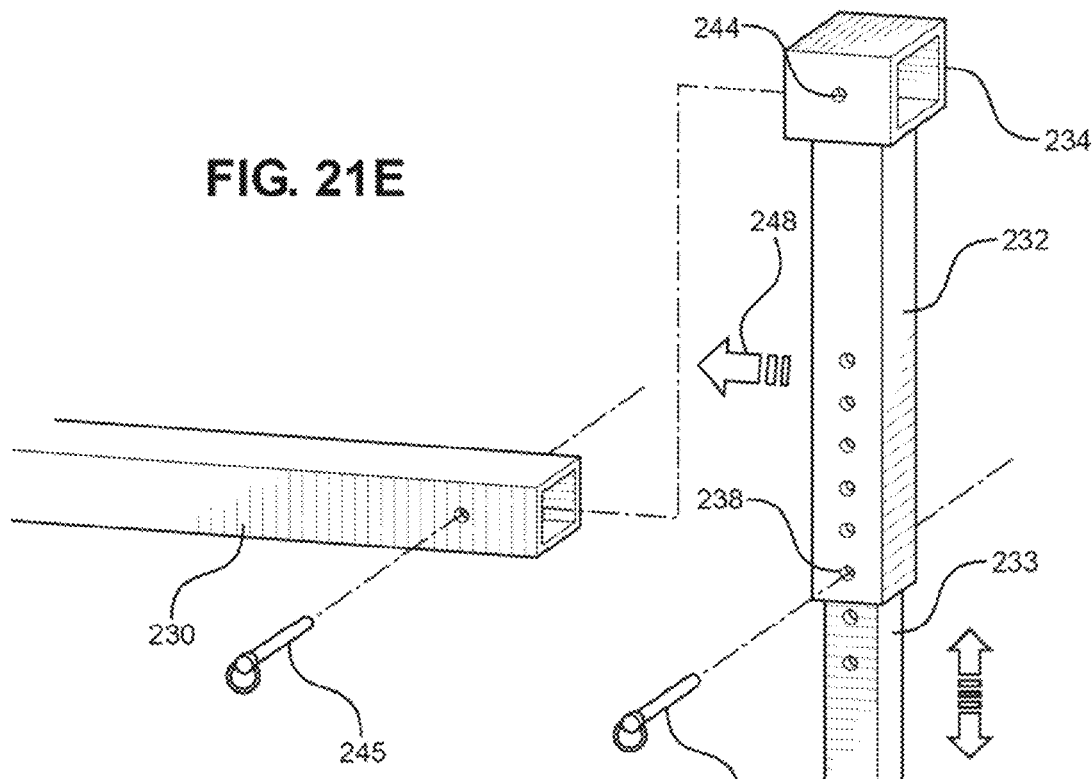
Figure 21F:
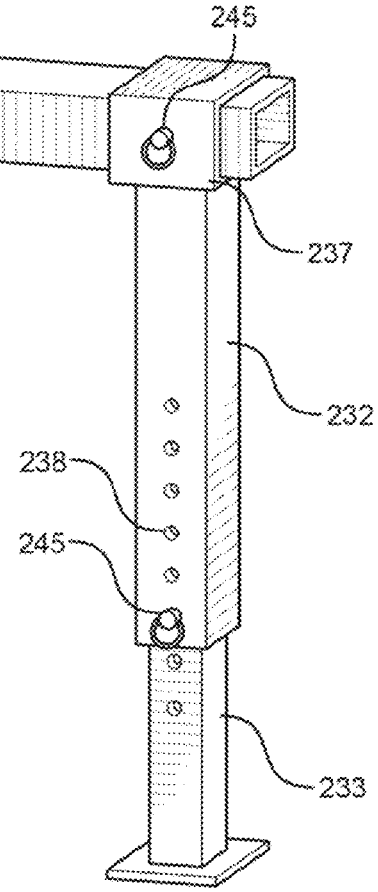

To convert the removable lift system 200 from a transportation position 267 to a storage position 268, first, the boom lift stand pin 245 is removed from the boom lift hole 244 of the boom lift stand collar 234 and transverse stay beam 230. Second, the boom lift stand collar 234 is slid in an off direction 246 until the boom lift stand collar 234 is free from the transverse stay beam 230. Third, the boom lift stand 231 is rotated 180 degrees, as shown in FIG. 21E such that the adjustable boom lift stand foot 233 faces the ground. Fourth, as shown in FIG. 21F, the boom lift stand collar 234 is slid in an on direction 248 until the boom lift stand collar 234 is back on the transverse stay beam 230. Fifth, a boom lift stand pin 245 is placed back through the boom lift hole 244 of the boom lift stand collar 234 and transverse stay beam 230 in order to secure the adjustable boom lift stand collar 234 in place. Sixth, the boom lift stand foot 233 is adjusted by pulling a boom lift stand pin 245 from the boom lift stand hole 238 and lower the boom lift foot 233 until it nearly touches the ground. Finally, the boom lift stand pin 245 is passed through the boom lift stand hole 238 securing the boom lift stand foot 233 in place. The process is repeated for the adjustable boom lift stand 231 on the opposite side of the transverse stay beam 230.

Once the boom lift left stands 231 are in the storage position 268 and the wheels 495 are in contact with the ground, the stay collar pins 192 are pulled from the stay collar holes 190 which had secured the left frame rail 222 and the right frame rail 224 of the removable lift system 200 to the left and right stay collars 150 and 151 respectively. Next the truck air supply line 174, truck air control line 176, truck electrical signal line 178 and truck hydraulic lines 179 are all disconnected from the front service panel 270 of the removable lift system 200.

Figure 21G:
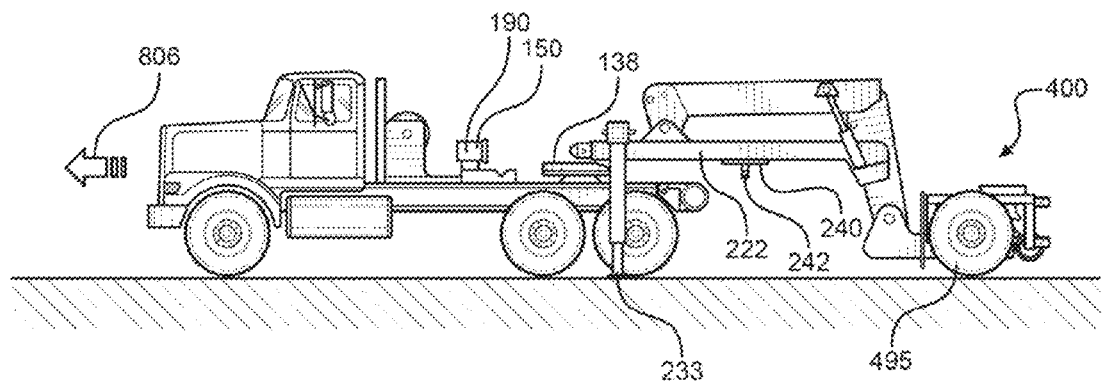

Referring next to FIG. 21G, the semi-tractor truck 100 then drives in a forward direction 806 away from the removable lift system 200 causing the fifth wheel 158 of the truck 100 to release the kingpin 242 of the removable lift system 200. As the truck 100 drives away from the removable lift system, the left and right frame rails 222 and 224 of the removable lift system slide free of the left and right stay collars 150 and 151 of the semi tractor truck 100 and the kingpin plate 240 of the removable lift system 200 slides free of the fifth wheel 158 of the semi-tractor truck 100.

Figure 21H:
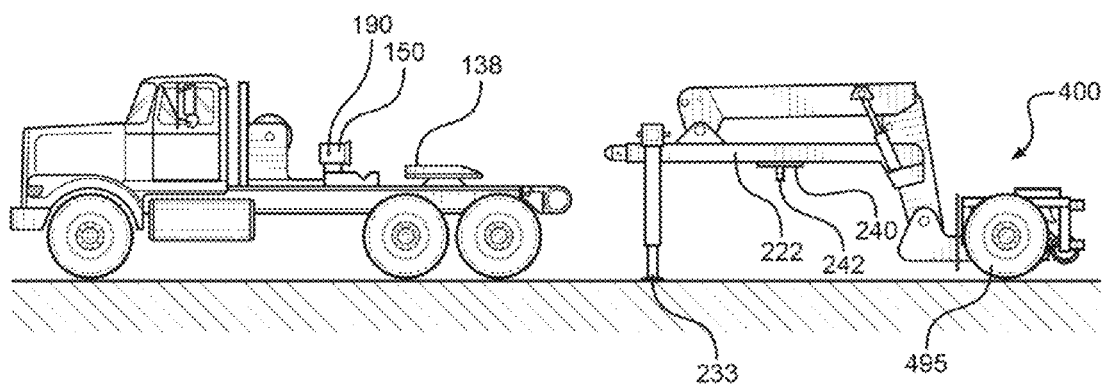

As depicted in FIG. 21H, the semi-tractor truck 100 is now fully detached from the removable lift system 200, which in turn rests on the ground via the boom lift feet 233 and the wheels 495 of the dolly 400. The semi-tractor truck 100 is now ready to be used to raise or lower a tank 300 as set forth more fully below.

Figure 22A:
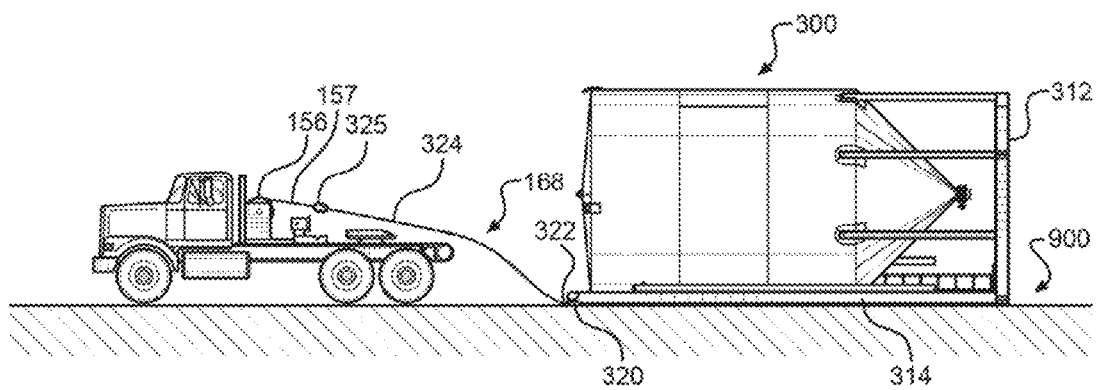
FIGS. 22A-22E shows a vertical tank in the horizontal position and then being lifted to the upright, vertical position using the truck and the winch for a controlled lifting and tilting of the tank into a vertical position.

Method of Raising a Vertical Tank from a Horizontal Position to a Vertical Position As seen in FIG. 22A, winch cable end loop 194 of winch cable 157 of the semi-tractor truck 100 is connected to the lifting line fastener 325 of the lifting line 324 of the tank 300 in order to allow the winch 156 to act on the lifting line 324 of the tank 300.

FIGS. 22A through 22E generally depict the method of raising the tank 300 from a horizontal position 900 to a vertical position 902 using the semi-tractor truck 100 of the present invention.

After removing the removable lift system 200 from the semi-tractor truck 100 as set forth more fully above, the semi-tractor truck 100 is ready to lift tank 300 from a horizontal position 900 to a vertical position 902. When the removable lift system 200 is first removed from the semi-tractor truck 100, the adjustable tail roller 160 of the semi-tractor truck 100 is in the flush position 164.

In a preferred embodiment, winch cable 157 of the semi-tractor truck 100 terminates in winch cable end loop 194 and lifting line 324 of the tank 300 terminates in lifting line fastener 325. The lifting line fastener 325 can be any number of cable fasteners known in the art. In one embodiment, the lifting line faster is simply a loop at the end of the lifting line 325 that passes through a carabiner or other easily removable cable fastener.

As seen in FIG. 22A, winch cable end loop 194 of winch cable 157 of the semi-tractor truck 100 is connected to the lifting line fastener 325 of the lifting line 324 of the tank 300 in order to allow the winch 156 to act on the lifting line 324 of the tank 300.

Figure 22B:
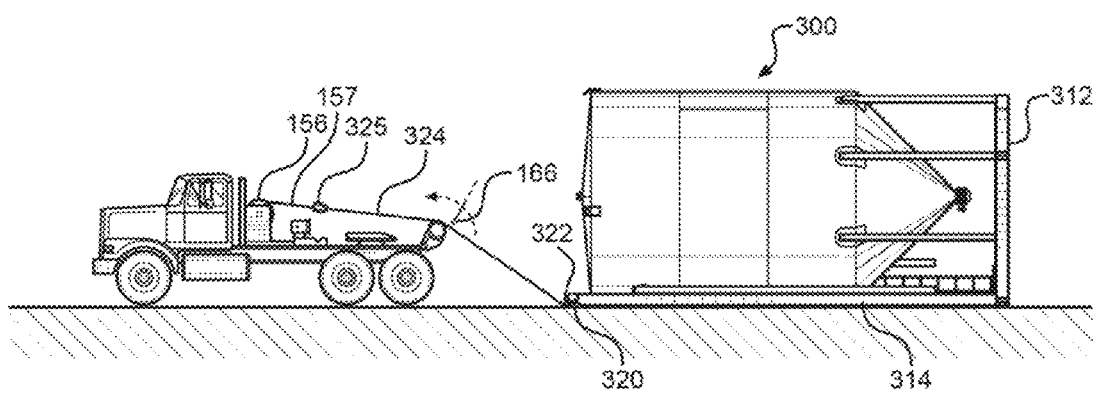

As seen in FIG. 22B, the adjustable tail roller 160 is then rotated from the flush position 164 to an angled position 166. The adjustable tail roller 160 can be moved from the flush position 164 to the angled position 166 either manually or through hydraulic assist.

Figure 22C:
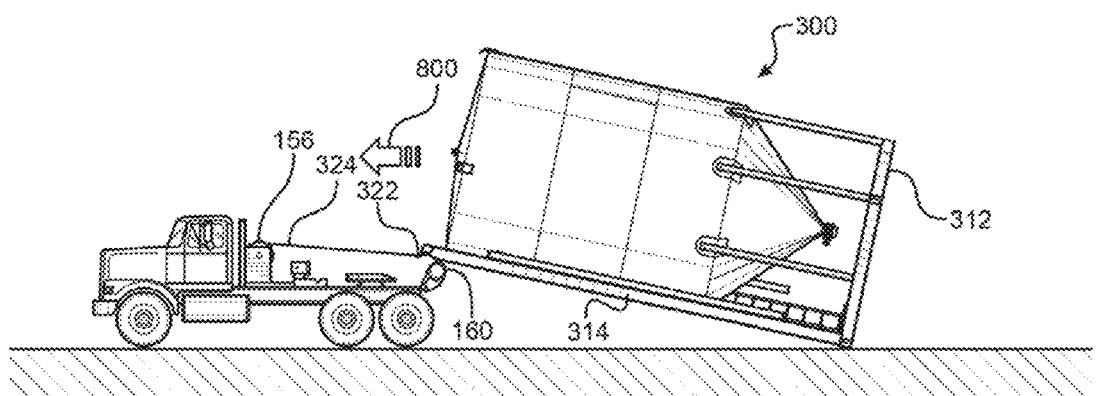

Next, as seen in FIG. 22C, winch cable 157 is wound by winch 156 in winding direction 800, which in turn pulls on the lifting line 324, which in turn pulls on the lifting line panel 322 allowing the lifting line 324 to be wound on the winch 156. As the lifting line 324 is wound by the winch 156, the tank 300 is pulled up and over the adjustable tail roller 160 such that the sled frame 314 of the tank 300 is in contact with the adjustable rail roller 160. It is important to adjust the adjustable tail roller 160 to the angled position 166 such that when the adjustable tail roller 160 is placed in contact with the tank 300 the semi-tractor truck 100 will be able to raise the tank 300 to a controllable tipping position 904. If the adjustable tail roller 160 was not adjusted to the angled position 166, the act of lifting the tank 300 could cause the tank 100 to improperly come into contact with various components of the semi-tractor truck, such as the fifth wheel 158. The angled position 166 also allows the semi-tractor truck to move the tank to a controllable tipping position 904.

Figure 22D:
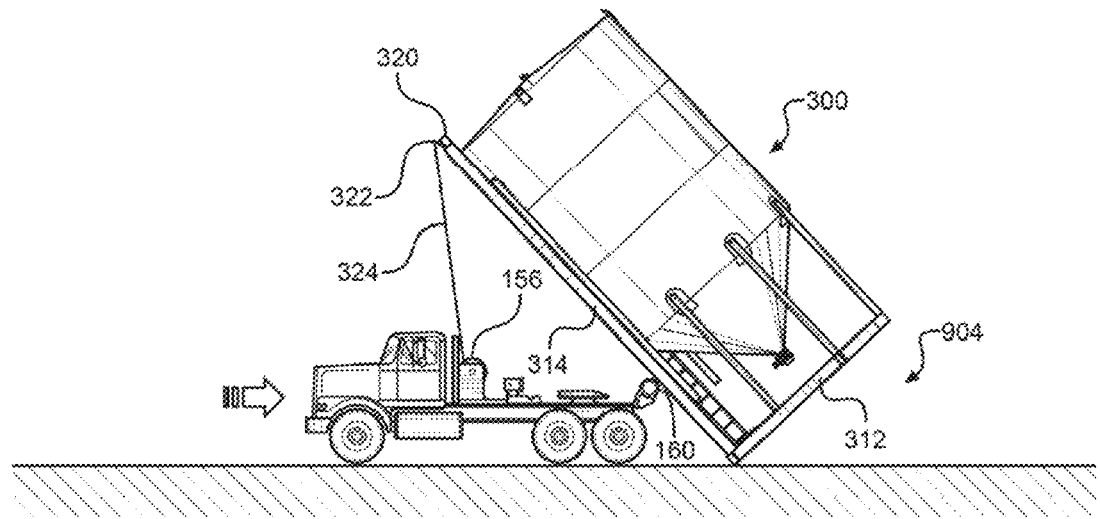

As seen in FIG. 22D, the semi-tractor truck 100 then moves in reverse direction 804 causing the adjustable tail roller 160 to push the tank 100 into a controllable tipping position 904. As the semi-tractor truck 100 moves in a reverse direction 804, the lifting line 324 is moved in an unwinding direction 802 to maintain tension in the lifting line 324, but allow the tank to continue to rise up to the controllable tipping position 904.

Figure 22E:
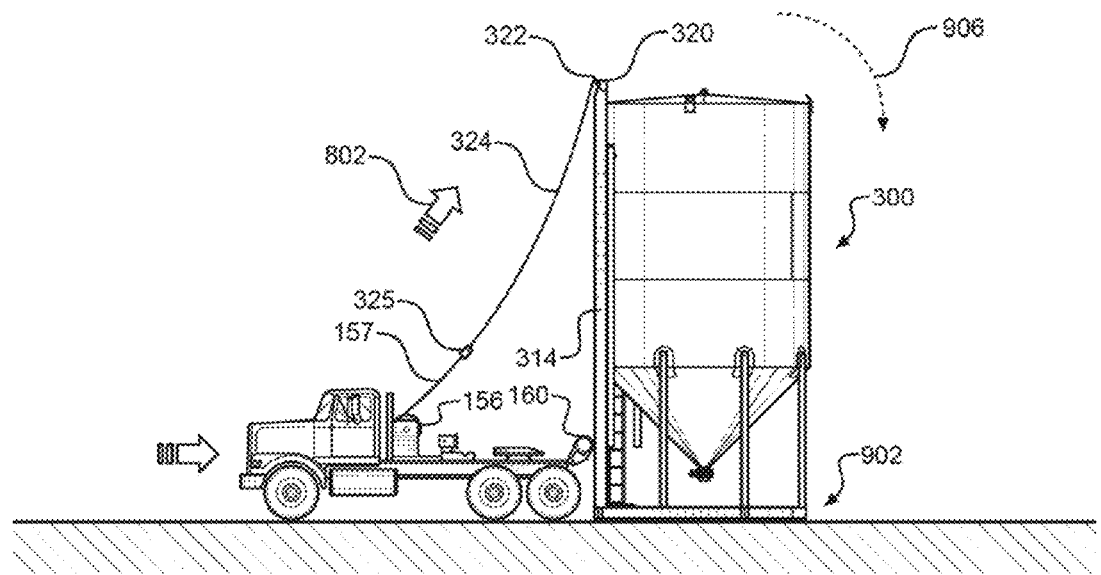

Finally, as seen in FIG. 22E, once in the controllable tipping position 904, gravity acts on the tank 300 and causes it to rotate in direction 906 from the controllable tipping position 904 until the tank base frame 312 comes into contact with the ground and the tank is in the vertical position 902. As the tank 300 rotates from the controllable tipping position 904 to the vertical position 902, the winch 156 is reversed causing the lifting line 324 to move in an unwinding direction 802 thereby controlling the rotation of the tank 300 as gravity pulls the tank 300 towards the vertical position 902. Once the tank 300 is in the vertical position 902, the winch cable 157 is disconnected from the lifting line 324. The semi-tractor truck 100 can then be re-attached to the removable lift system 200 and dolly 400.

Method of Lowering a Vertical Tank from a Vertical Position to a Horizontal Position FIGS. 23A through 23F generally depict the method of lowering the tank 300 from a vertical position 902 to a horizontal position 900 using the semi-tractor truck 100 of the present invention.

After removing the removable lift system 200 from the semi-tractor truck 100 as set forth more fully above, the semi-tractor truck 100 is ready to lower tank 300 from a vertical position 902 to a horizontal position 900. When the removable lift system 200 is first removed from the semi-tractor truck 100, the adjustable tail roller 160 of the semi-tractor truck 100 is in the flush position 164.

The adjustable tail roller 160 is rotated from the flush position 164 to an angled position 166. The adjustable tail roller 160 can be moved from the flush position 164 to the angled position 166 either manually or through hydraulic assist.

Figure 23A:
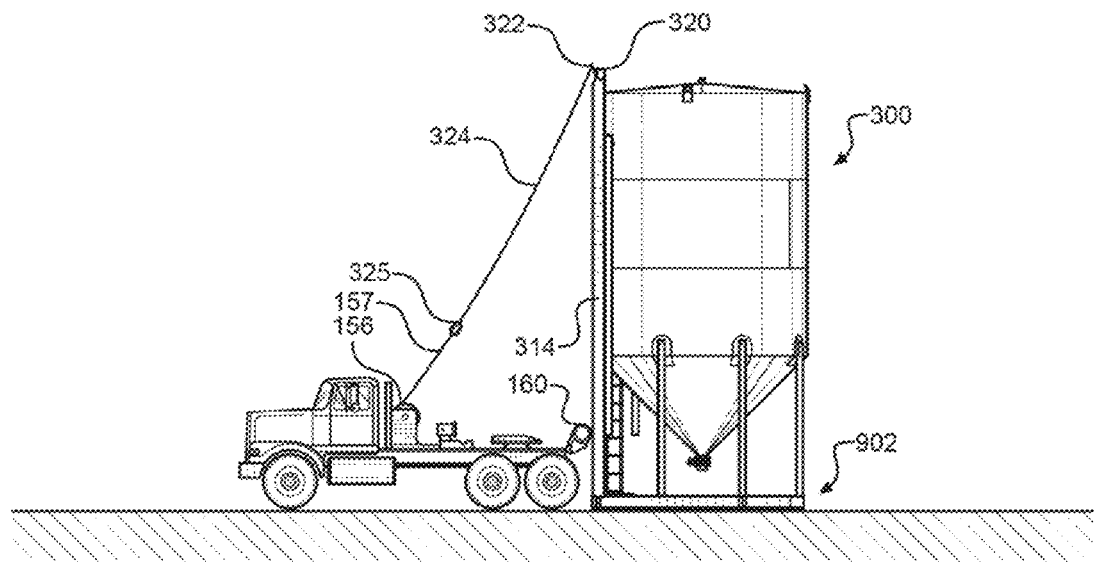
FIGS. 23A-23F shows the upright vertical tank being lowered to a horizontal position using the truck and winch for a controlled lowering and tilting of the tank into a horizontal position on the ground.

As seen in FIG. 23A, the semi-tractor truck 100 is then positioned with respect to the tank 300 such that the adjustable tail roller 160 in the angled position 166 comes into contact with the sled frame 314 of the tank 300.

The winch cable end loop 194 of the winch cable 157 of the semi-tractor truck 100 is then connected to the lifting line fastener 325 of the lifting line 324 of the tank 300.

Figure 23B:
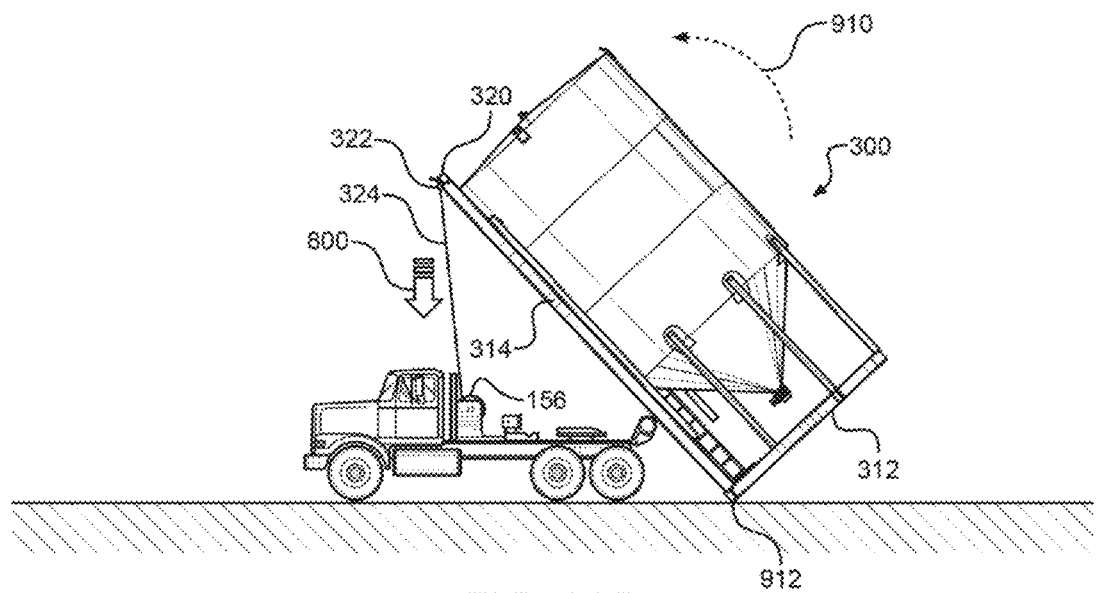

As seen in FIG. 23B, the winch cable 157 and lifting line 324 are wound by winch 156 in winding direction 800, causing the base frame 312 of the tank to rotate off of the ground in rotation direction 910 about the point of contact 912 between the based frame 312 and the sled frame 314.

Figure 23C:
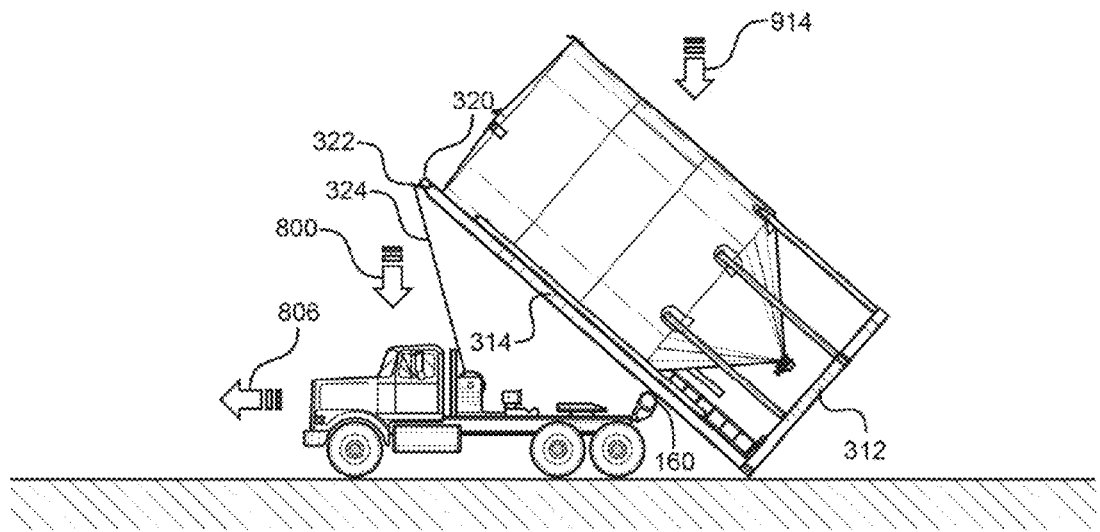
Figure 23D:
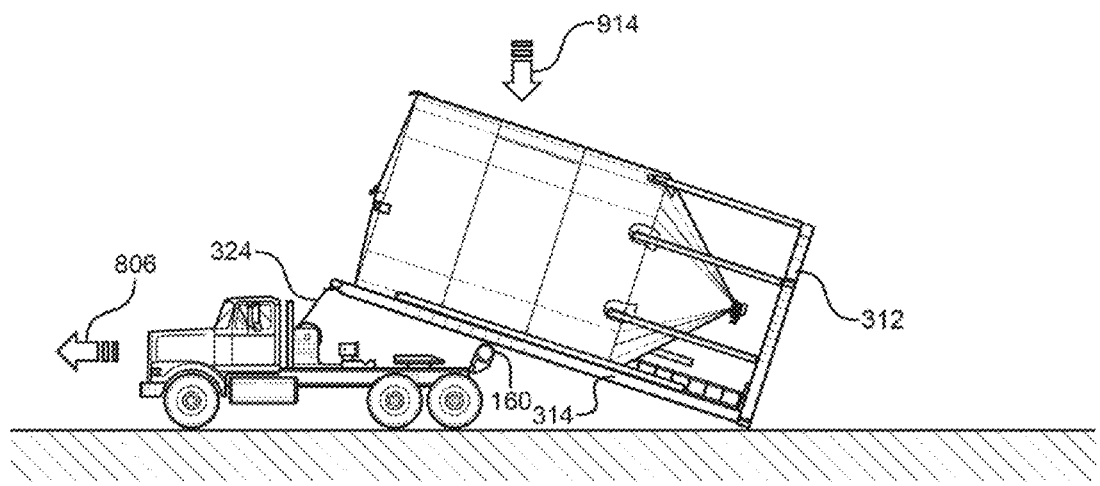
Figure 23E:
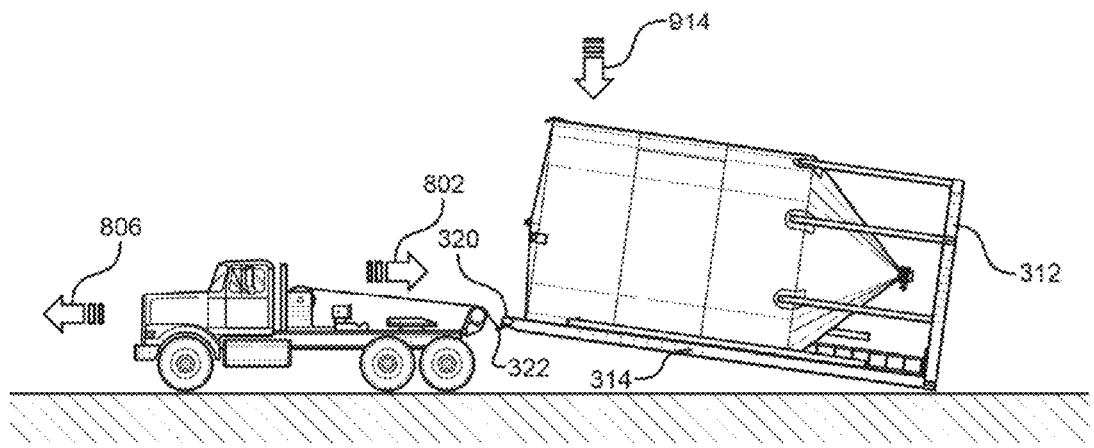
Figure 23F:
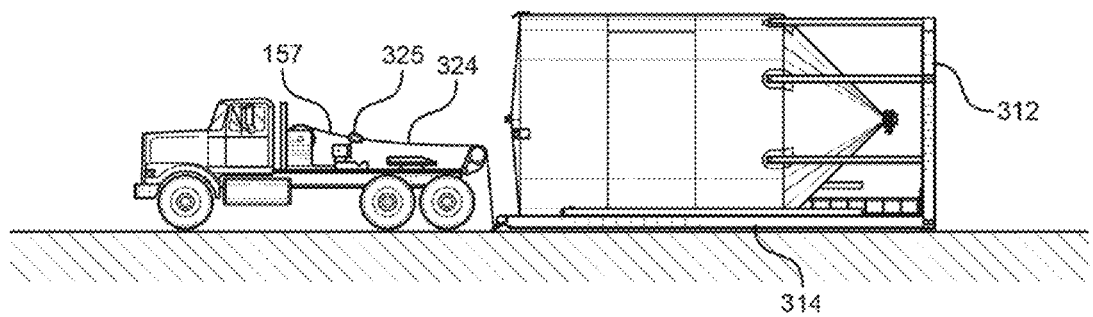

As seen in FIGS. 23C and 23D, the semi-tractor truck 100 then begins to move in a forward direction 806 causing the adjustable tail roller 160 to roll along the sled frame 314 which controls the tank 300 as it continues to rotate in a downward direction 914. The semi-tractor truck 100 continues moving in forward direction 806 until the winch 156 is reversed to an unwinding direction 802 allowing the adjustable tail roller 160 to continue to roll along the sled frame 314 until the tank lifting bar 320 is past the adjustable tail roller 160 as seen in FIG. 23E. Once the tank lifting bar 320 has passed over the adjustable tail roller 160, the tank 300 can be easily lowered in downward direction 914 until the tank sled frame 314 is in contact with the ground and the tank 300 is in the horizontal position 900, as shown in FIG. 23F.

Method of Attaching the Removable Lift System to the Semi-Tractor Truck

FIGS. 24A through 24D generally depict the method of attaching the removable lift system 200 to the semi-tractor truck 100.

Figure 24A:
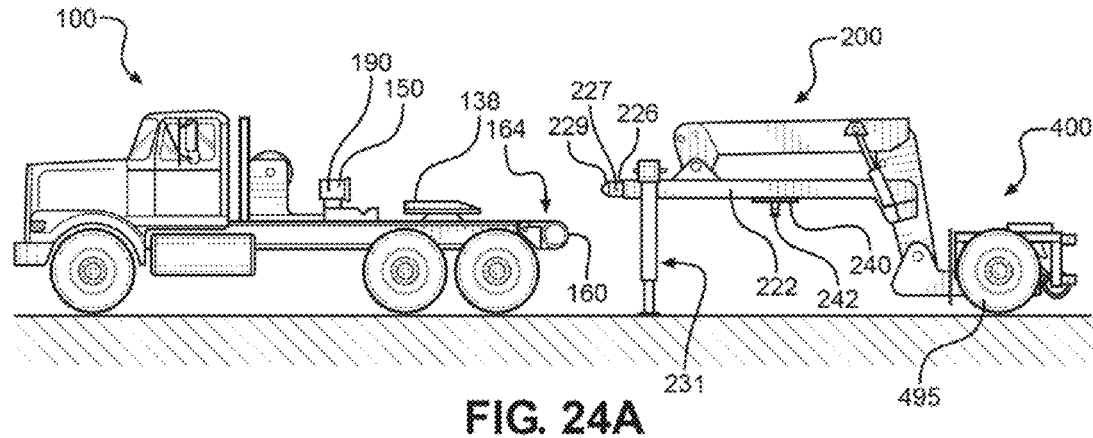
FIGS. 24A-24D shows the removable lift system being installed on the winch truck by reversing the truck under the removable lift system to engage the kingpin into the fifth wheel, and the stay beams into the stay collar.

FIG. 24A is a left side view of the semi-tractor truck 100 and removable lift system 200. As depicted in FIG. 24A, the semi-tractor truck 100 is shown fully detached from the removable lift system 200, which is shown resting on the ground via the boom lift feet 233 and the wheels 495 of the dolly 400. The semi-tractor truck 100 has the adjustable tail roller 160 in the flush position 164 and is oriented such that left and right stay collars 150 and 151 are generally aligned with the pyramidal tips 229 of the left and right aligning rails 226 and 228. The right stay collar 151 and right aligning rail 228 are not visible from the left side view.

Figure 24B:
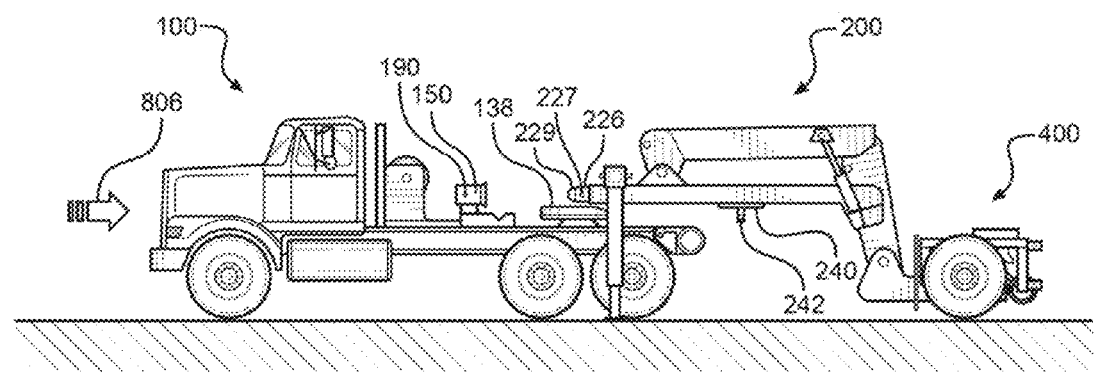

As seen in FIG. 24B, the semi-tractor truck 100 then begins to move in a reverse direction 804 in order to allow the pyramidal tips 229 of the left and right aligning rails 226 and 228 of the removable lift system 200 to slidably insert into the left and right stay collars 150 and 151 respectively of the semi-tractor truck 100. As the pyramidal tips 229 come into contact with the stay collars 150 and 151, the pyramidal tips 229 guide the left and right aligning rails 226 and 228 through the left and right stay collars 150 and 151. As the semi-tractor truck 100 continues to move in reverse direction 804, the kingpin plate 240 of the removable lift system 200 comes into contact with the fifth wheel 158 of the semi-tractor truck 100 and the kingpin 242 is slidably inserted into the fifth wheel slot 159 (not shown in this Figure).

Figure 24C:
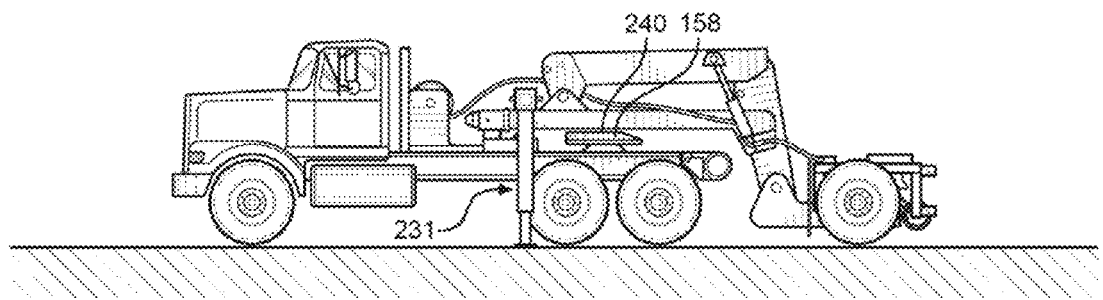

As seen in FIG. 24C, the semi-tractor truck 100 stops moving in reverse direction 804 when the kingpin 242 of the removable lift system 200 is properly seated in the fifth wheel 158 and the left and right aligning rails 226 and 228 are within the left and right stay collars 150 and 151 such that the alignment holes 227 of the left and right alignment rails 226 and 228 are in alignment with the stay collar holes 190, and stay collar pin 192 is inserted through stay collar holes 190 and alignment rails 226 and 228. The removable lift system 200 is now securely mounted to the truck 100.

Figure 24D:
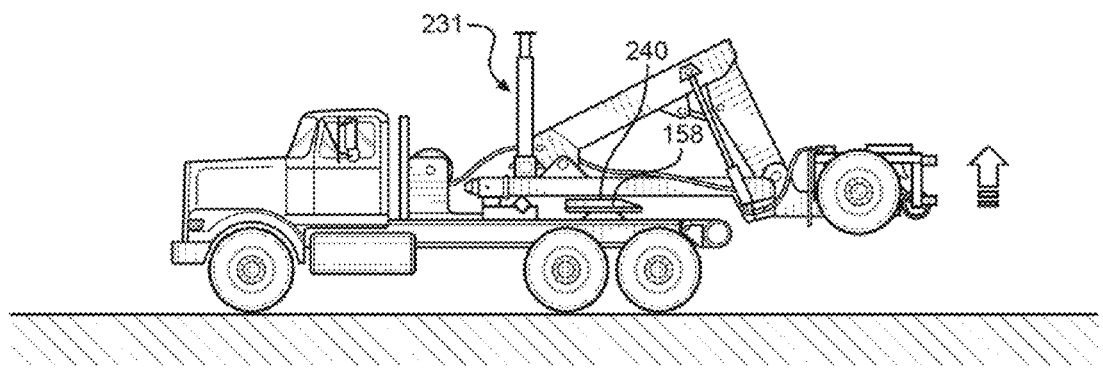

As seen in FIG. 24D, and with reference back to FIGS. 21A-21C for clarity, the adjustable boom lift stands 231 are moved from a storage position 268 to a transportation position 267.

First, the boom lift stand foot 233 is adjusted until it is off the ground and is then secured with a boom lift stand pin 245. Second, the boom lift stand pin 239 is removed from the boom lift stand collar 234 and transverse stay beam 230. Third, the boom lift stand collar 234 is slid off of the transverse stay beam 230. Fourth, the boom lift stand 231 is rotated 180 degrees such that the adjustable boom lift stand foot 233 faces away from the ground. Fifth, the boom lift stand collar 234 is slid back on the transverse stay beam 230. Sixth, a boom lift stand pin 239 is placed back through the boom lift stand collar 234 and transverse stay beam 230 in order to secure the adjustable boom lift stand collar 234 in place.

Next the truck air supply line 174, truck air control line 176, truck electrical signal line 178 and truck hydraulic lines 179 are all connected to the front service panel 270 of the removable lift system 200. Once lines 174, 176, 178 and 179 have all been connected, the removable lift system 200 is operable.

Finally, the dolly 400 is raised by the removable lift system 200 in direction 601 until the wheels 495 of the dolly 400 are sufficiently off the ground enabling the semi-tractor truck 100 to transport the dolly 400. Alternatively, the dolly 400 is not raised, but is instead removed such that the semi-tractor truck 100 and attached removable lift system 200 can be used in combination to attached the dolly 400 to the tank 300 as set forth more fully below.

Method of Attaching Dolly to Tank Using Removable Lift System

FIGS. 25A through 25E illustrate the method of attaching dolly 400 to a tank 300 using the removable lift system 200.

Figure 25A:
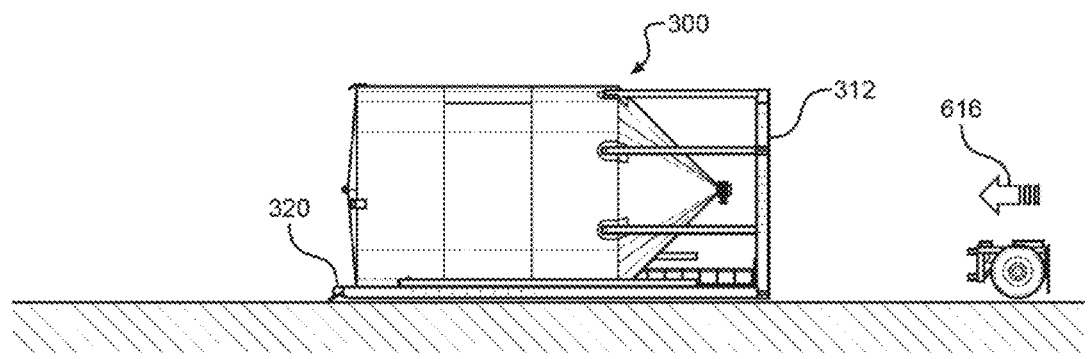
FIG. 25A-25E shows the installation of the doily to a horizontally positioned tank, and the tank transport system configured to transport a vertical tank.

FIG. 25A depicts a tank 300 with its sled frame 314 in contact with the ground 30. First, the dolly 400 is moved in toward direction 616 such the dolly brackets 482, 484, 486, and 488 are generally facing the tank base brackets 354, 355, 356, and 357.

Figure 25B:
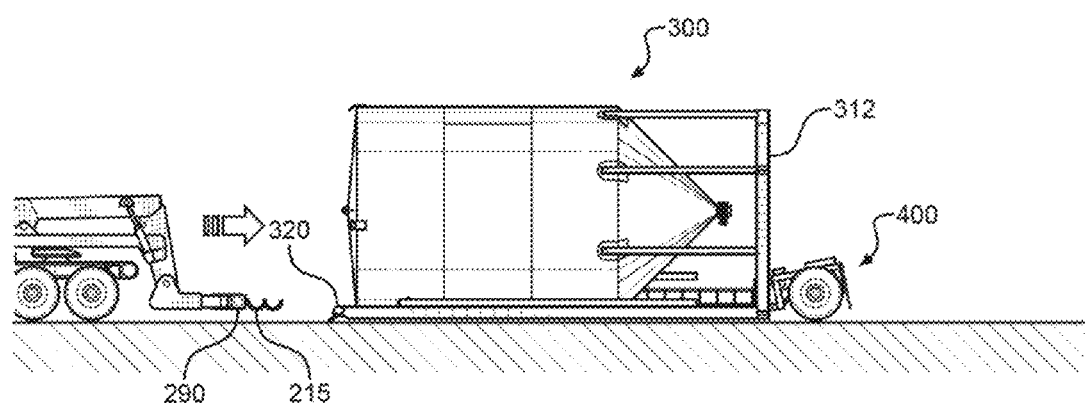

As seen in FIG. 25B, and generally in FIGS. 14-1 and 14-2, the dolly 400 is connected to the tank base frame 312 by way of the first and second upper dolly brackets 482 and 484 with the tank base first and second upper brackets 354 and 355.

Next the truck 100 equipped with a removable lift system 200 is moved in reverse direction 804 toward the tank lifting bar 320 with the tank grapplers 215 in the open position 217.

Returning briefly to FIGS. 19A through 19C, the tank grapplers 215 are connected to the tank lifting bar 320 of the tank 300 by the reverse process depicted in FIGS. 19A through 19C. The removable lift system 200 is then secured to the tank lifting bar 320 of the tank 300 by moving the tank grapplers 215 from an open position 217 to a closed position 216 around the tank lifting bar 320.

Figure 25C:
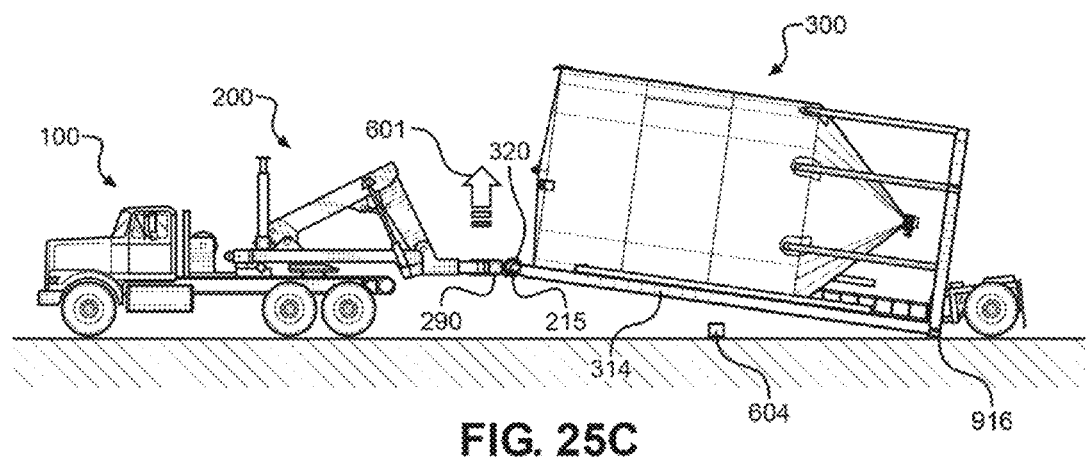
Figure 25D:
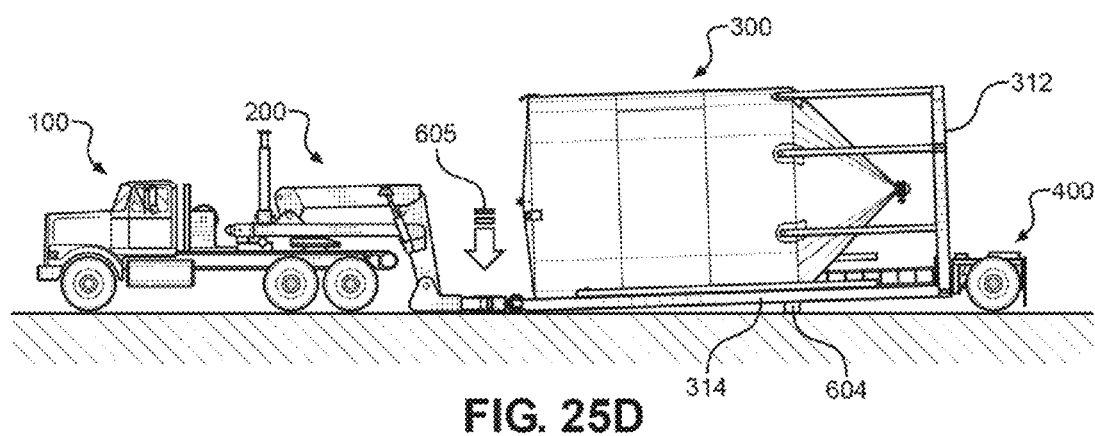

As seen in FIG. 25C, the tank 300 is then lifted in upward direction 601 by the removable lift system 200 such that the tank 300 pivots about pivot point 916 in order to allow the placement of pivot block 604 underneath the sled frame 314 of the tank 300. Next, as depicted in FIG. 25D, the tank is lowered by the removable lift system 200 in direction 605 such that the tank lifting bar 320 is near the ground and the sled frame 314 rests and pivots on the pivot block 604. As the tank lifting bar 320 is lowered near the ground, the sled frame 314 of the tank 300 pivots about the pivot block 604 causing the first and second lower dolly brackets 486 and 488 to come into contact with the tank base first and second lower brackets 356 and 357.

As seen in FIGS. 14-3 and 14-4, the first and second lower dolly brackets 486 and 488 are connected to the tank base first and second lower brackets 356 and 357 using fasteners 450. Once the fasteners 450 are installed, the dolly 400 is properly secured to the base frame 312 of the tank 300. Next the tank 300 is raised sufficiently to remove the pivot block 604.

Figure 25E:
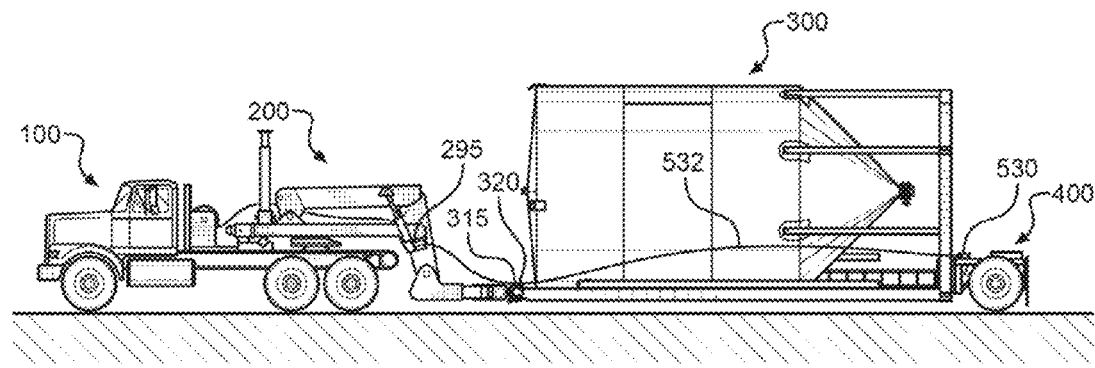

As seen in FIG. 25E, utility lines 532 are connected between the rear service panel 295 of the removable lift system 200 and the dolly service line panel 530, enabling the air braking and electrical signals of the dolly 400 to be controlled by the operator of the semi-tractor truck 100 from the cab portion 180 of the truck 100. The utility lines 532 include a supply line 274, a control line 275 and a single line 276. Once so connected, the tank 300 is now ready for transportation by the truck 100 without the use of a conventional semi-tractor trailer.

Closing

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

While there have been shown what are presently considered to be preferred embodiments of the present invention, it will be apparent to those skilled in the art that various changes and modifications can be made herein without departing from the scope and spirit of the invention. Accordingly, the invention is not to be limited as except by the appended claims.

We claim:

1. A dolly comprising:
   a frame;
   a suspension connected to said frame;
   an axle housing connected to said suspension with an axle
      capable of rotation within said axle housing wherein
      said axle terminates in a left wheel hub and a right
      wheel hub;

at least one left wheel connected to said left wheel hub and at least one right wheel connected to said right wheel hub;

a means for connecting said dolly to a frame of a vertical tank; and a boom lift guide connected to said axle housing.

2. The dolly of claim 1 further comprising a dolly service panel connected to said frame and capable of receiving one or more service lines from a semi-tractor truck.

3. The dolly of claim 1 further comprising an air brake system.

4. The dolly of claim 3 wherein said brake system comprises an air reservoir, an air relay, a supply line, a control line, a left brake chamber, a right brake chamber, a left air brake and a right air brake, said supply line and said control line are connected to said air relay, said air relay is mounted to said air reservoir, said air reservoir is mounted to said frame, said air relay is connected to said left brake chamber and said right brake chamber by one or more air hoses wherein compressed air can pass through said control line to said air relay to said air reservoir and wherein compressed air can pass through said air relay to said air hoses to said left brake chamber and said right brake chamber.

5. The dolly of claim 1 further comprising a signal support plate connected to said frame and housing signal lights.

6. The dolly of claim 5 further comprising a rear signal support plate housing rear signal lights wherein said rear signal support plate is connected to said frame opposite said signal support plate.

7. A dolly comprising:
a frame having a top frame and a tank connector frame wherein said top frame is connected to said tank connector frame such that said tank connector frame is perpendicular to said top frame;
a suspension connected to said top frame;
an axle housing connected to said suspension with an axle capable of rotation within said axle housing wherein said axle terminates in a left wheel hub and a right wheel hub;
at least one wheel connected to said left wheel hub and at least one right wheel connected to said right wheel hub; and
at least one upper dolly bracket and at least one lower dolly bracket, each connected to said tank connector frame wherein said at least one upper dolly bracket and said at least one lower dolly bracket are each sized to receive a tank base upper bracket and a tank base lower bracket respectively, wherein said tank base upper bracket and said tank base lower bracket are connected to a base frame of a vertical tank.

8. The dolly of claim 7 further comprising a boom lift guide connected to said axle housing.

9. The dolly of claim 7 further comprising a dolly service panel connected to said top frame and capable of receiving one or more service lines from a semi-tractor truck.

10. The dolly of claim 7 further comprising an air brake system.

11. The dolly of claim 10 wherein said brake system comprises an air reservoir, an air relay, a supply line, a control line, a left brake chamber, a right brake chamber, a left air brake and a right air brake, said supply line and said control line are connected to said air relay, said air relay is mounted to said air reservoir, said air reservoir is mounted to said frame, said air relay is connected to said left brake chamber and said right brake chamber by one or more air hoses wherein compressed air can pass through said control line to said air relay to said air reservoir and wherein compressed air can pass through said air relay to said air hoses to said left brake chamber and said right brake chamber.

12. The dolly of claim 7 further comprising a signal support plate connected to said frame and housing signal lights.

13. The dolly of claim 12 further comprising a rear signal support plate housing rear signal lights wherein said rear signal support plate is connected to said frame opposite said signal support plate.

14. A dolly comprising;
a frame having
a tank connector frame having
a tank connector frame rail, a left side frame rail, a right side frame rail, a middle frame rail and a rear frame rail, each having a front, a back, a top, a bottom, a first end and a second end wherein said first end of said upper tank connector frame rail is attached to said back of said left side frame rail, said second end of said upper tank connector frame rail is attached to said back of said right side frame rail, said first end of said middle frame rail is attached to said back of said left side frame rail approximately midway between said first end and said second end of said
left side frame rail, said second end of said middle frame rail is attached to said back of said right side frame rail approximately midway between said first end and said second end of said right side frame rail, said first end of said rear frame rail is attached to said back of said left side frame rail, said second end of said rear frame rail is attached to said back of said right side frame rail,
a top frame having
said tank connector frame rail of said tank connector frame, a lower tank connector frame rail, a right tank connector frame rail and a left tank connector frame rail each having a front, a back, a top, a bottom, a first end and a second end wherein said first end of said left tank connector frame rail is attached to said bottom of said left side frame rail of said top frame such that said front of said left tank connector frame rail is flush with said first end of said left side frame rail and said front of said upper tank connector frame rail, said first end of said right tank connector frame rail is attached to said bottom of said right side frame rail such that said front of said right tank connector frame rail is flush with said first end of said right side frame rail and said front of said upper tank connector frame rail, said first end of said lower tank connector frame rail is attached to said bottom of said right tank connector frame rail such that said front of said lower tank connector frame rail is flush with said front of said right tank connector frame rail, and
a reservoir frame having
a first reservoir frame member and a second reservoir frame member, each having a front, a back, a top, a bottom a first end and a second end wherein said first ends of first reservoir frame member and said second reservoir frame member are attached to said front of said middle frame rail of said top frame and are said second ends of said first reservoir frame member and said second reservoir frame member are attached to said back of said lower tank connector frame rail;

a first leaf spring suspension connected to said bottom of said left frame rail and a second leaf spring suspension connected to said bottom of said right frame rail;

an axle housing mounted to said first leaf spring suspension and said second leaf spring suspension by way of axle brackets wherein a rotating axle is housed within said axle housing, said rotating axle terminating in a left wheel hub and a right wheel hub;

at least one left wheel connected to said left wheel hub and at least one right wheel connected to said right wheel hub; and at least one upper dolly bracket and at least one lower dolly bracket, each connected to said tank connector frame wherein said at least one upper dolly bracket and said at least one lower dolly bracket are each sized to receive a tank base upper bracket and a tank base lower bracket respectively, wherein said tank base upper bracket and said tank base lower bracket are connected to a base frame of a vertical tank.

15. The dolly of claim 14 further comprising a boom lift guide connected to said axle housing and having a left boom guide and a right boom guide spaced sufficiently apart to center an extendable boom lift on said axle housing.

16. The dolly of claim 14 further comprising a dolly service panel connected to said top frame and capable of receiving one or more service lines from a semi-tractor truck.

17. The dolly of claim 14 further comprising an air brake system having an air reservoir, an air relay, a supply line, a control line, a left brake chamber, a right brake chamber, a left air brake and a right air brake, said supply line and said control line are connected to said air relay, said air relay is mounted to said air reservoir, said air reservoir is mounted to said frame, said air relay is connected to said left brake chamber and said right brake chamber by one or more air hoses wherein compressed air can pass through said control line to said air relay to said air reservoir and wherein compressed air can pass through said air relay to said air hoses to said left brake chamber and said right brake chamber.

18. The dolly of claim 14 further comprising a signal support plate connected to said frame and housing signal lights.

19. The dolly of claim 18 further comprising a rear signal support plate housing rear signal lights wherein said rear signal support plate is connected to said frame opposite said signal support plate.

* * * * *